July 14, 1953

T. F. ESERKALN 2,645,163

MILLING AND THE LIKE MACHINE TOOL

Filed Aug. 30, 1948

Inventor
Theodore F. Eserkaln
By Peck & Peck
Attorneys.

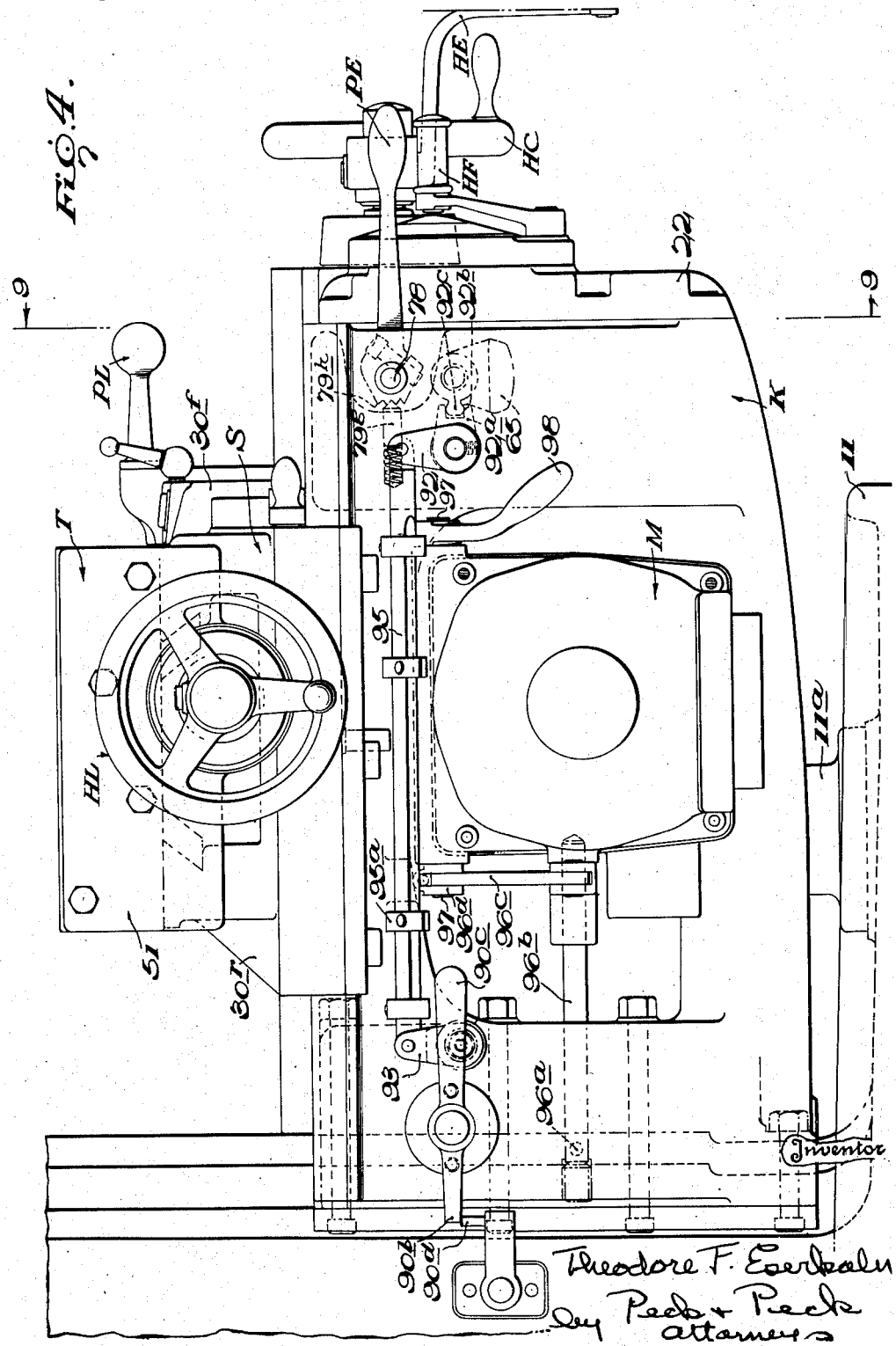

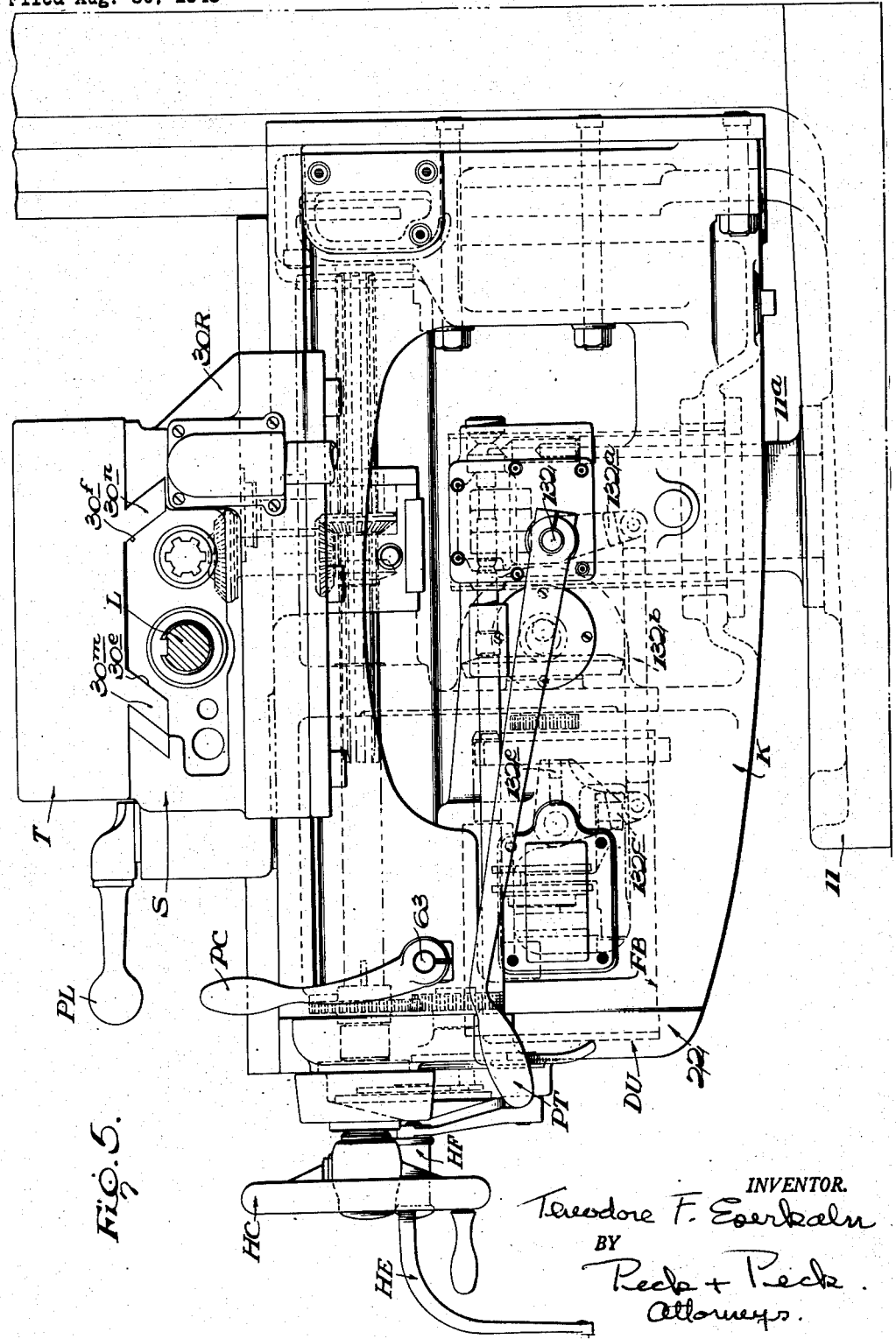

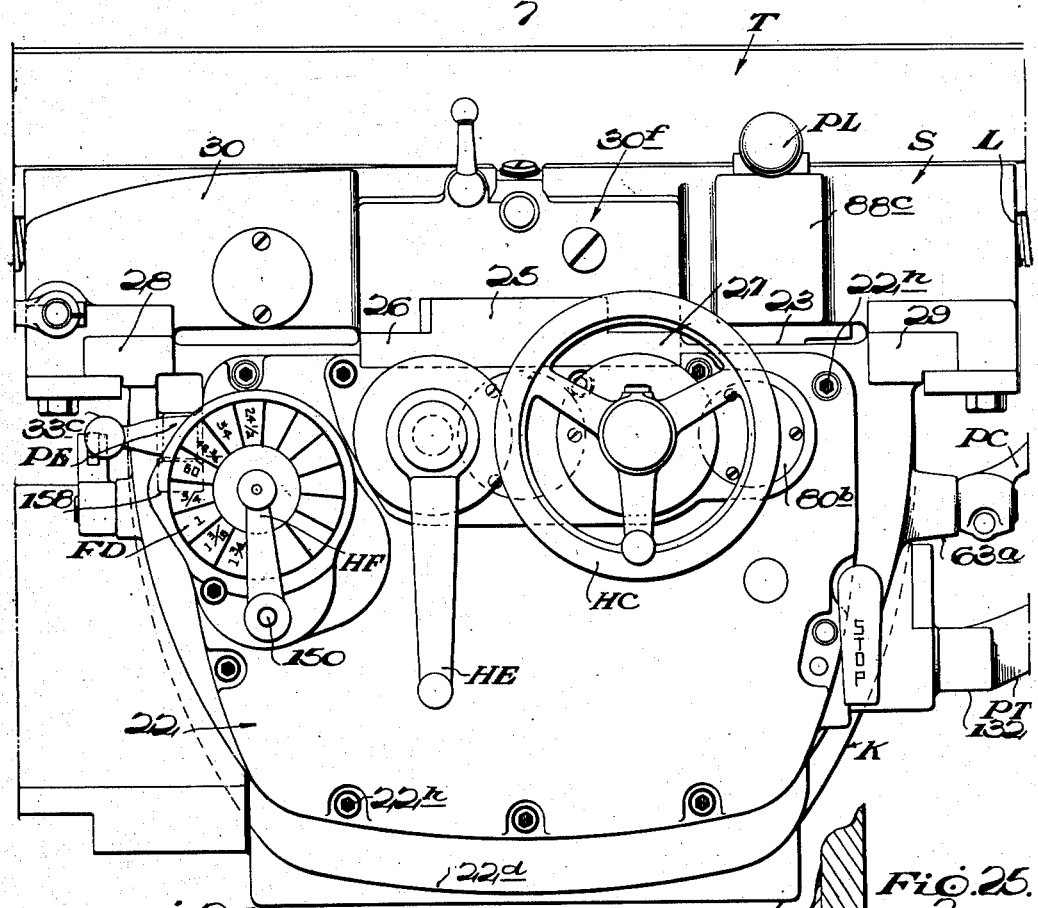
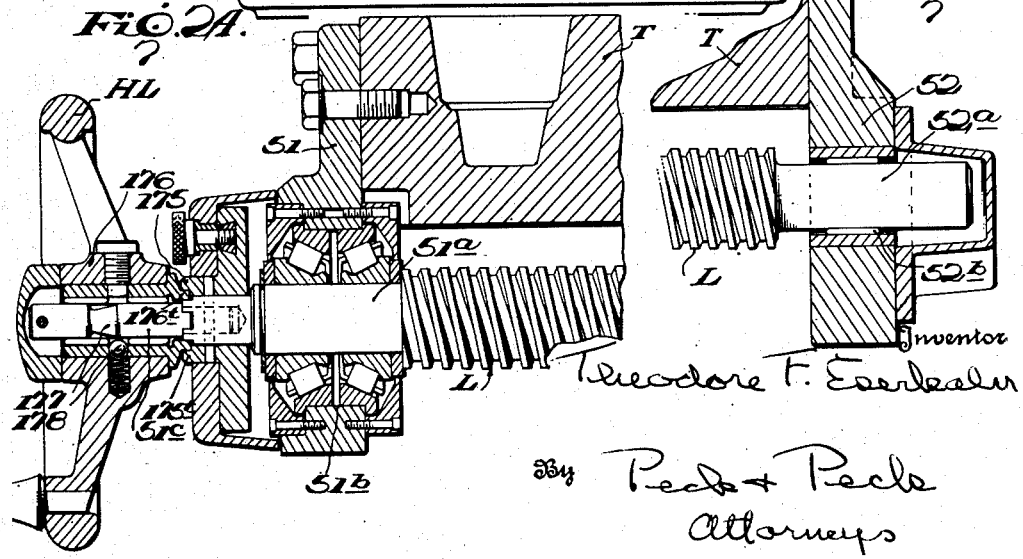

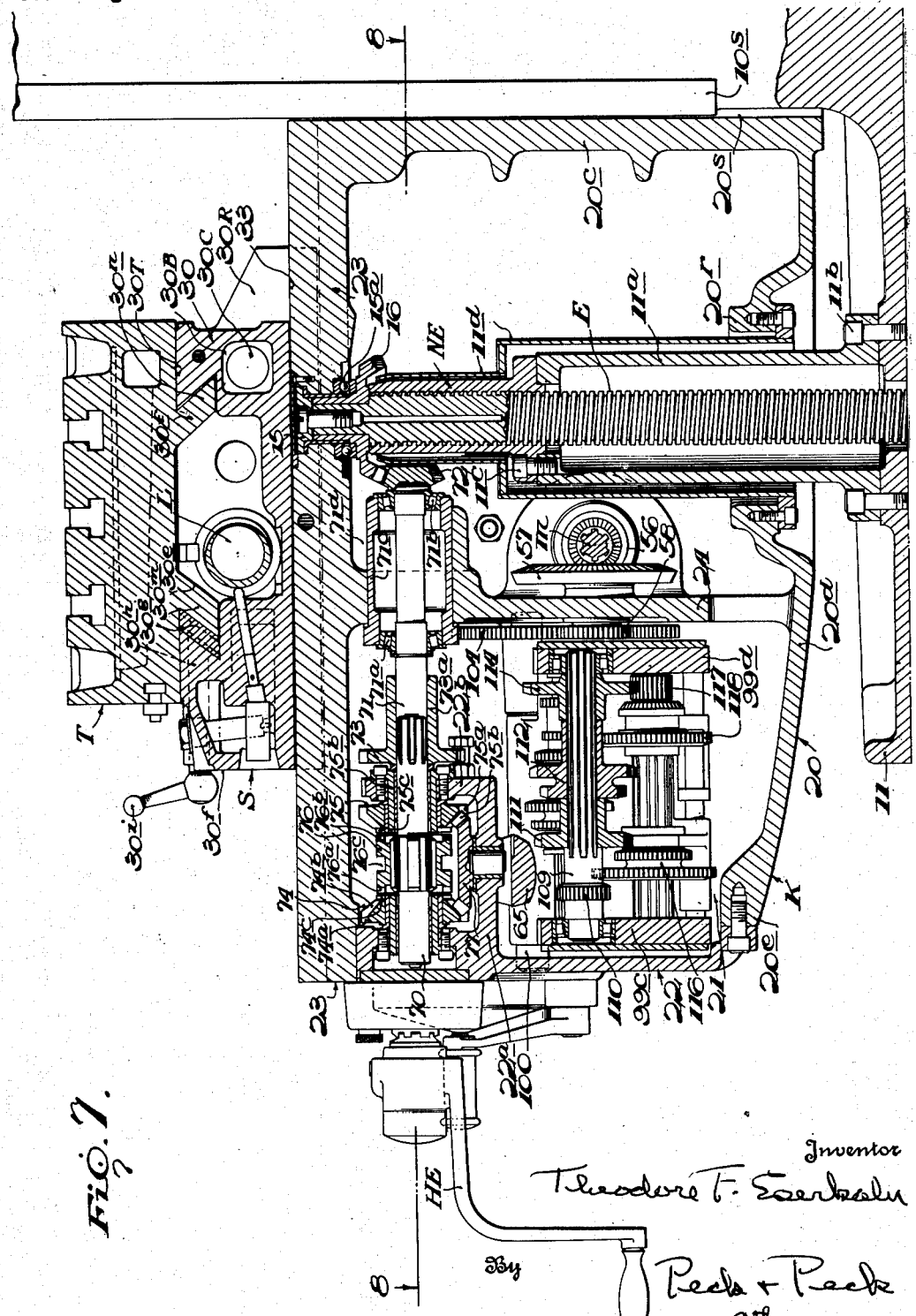

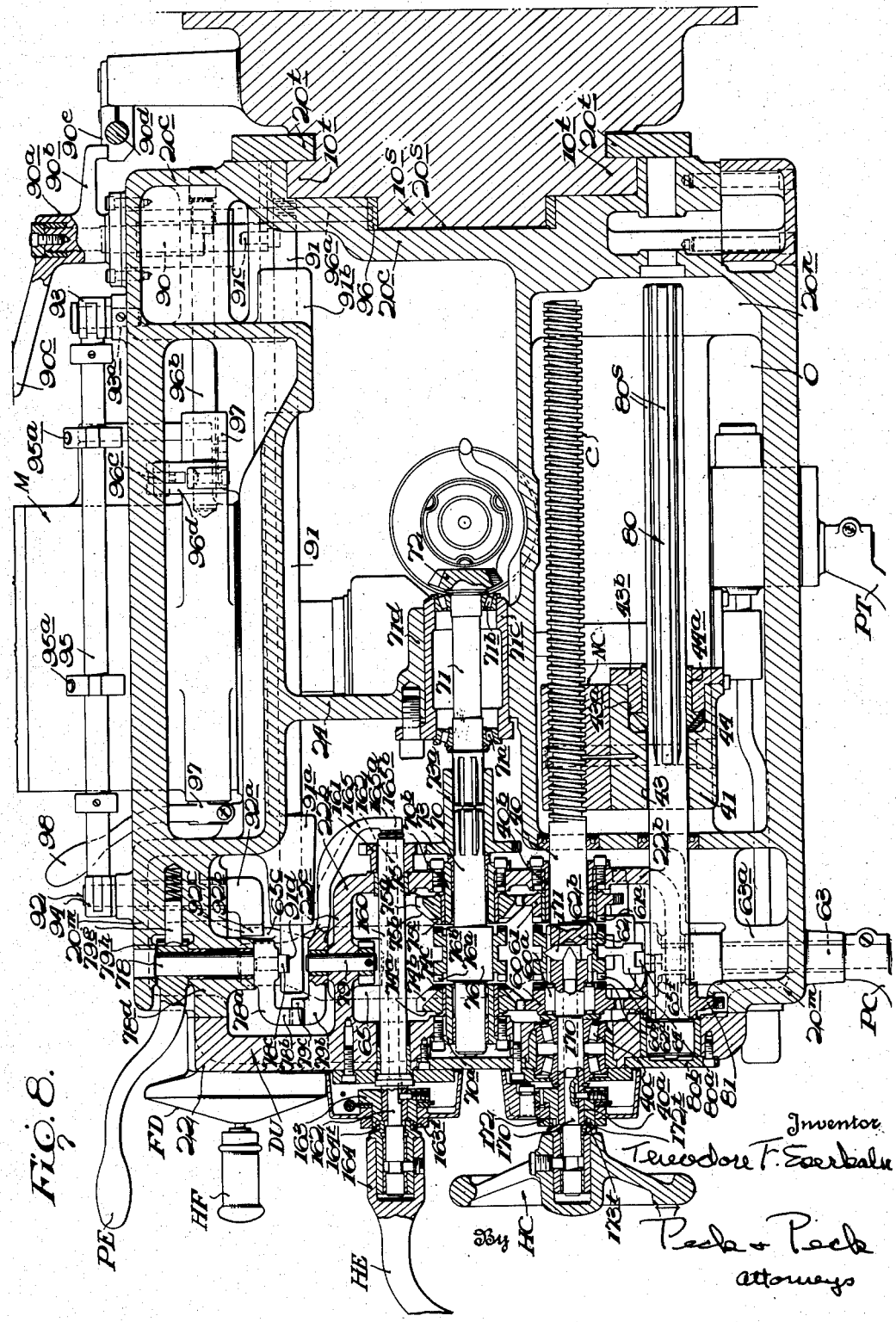

July 14, 1953

T. F. ESERKALN 2,645,163

MILLING AND THE LIKE MACHINE TOOL

Filed Aug. 30, 1948

Inventor
Theodore F. Eserkaln
By Peck + Peck
Attorneys

Inventor
Theodore F. Eserkaln
By Peck & Peck
Attorneys

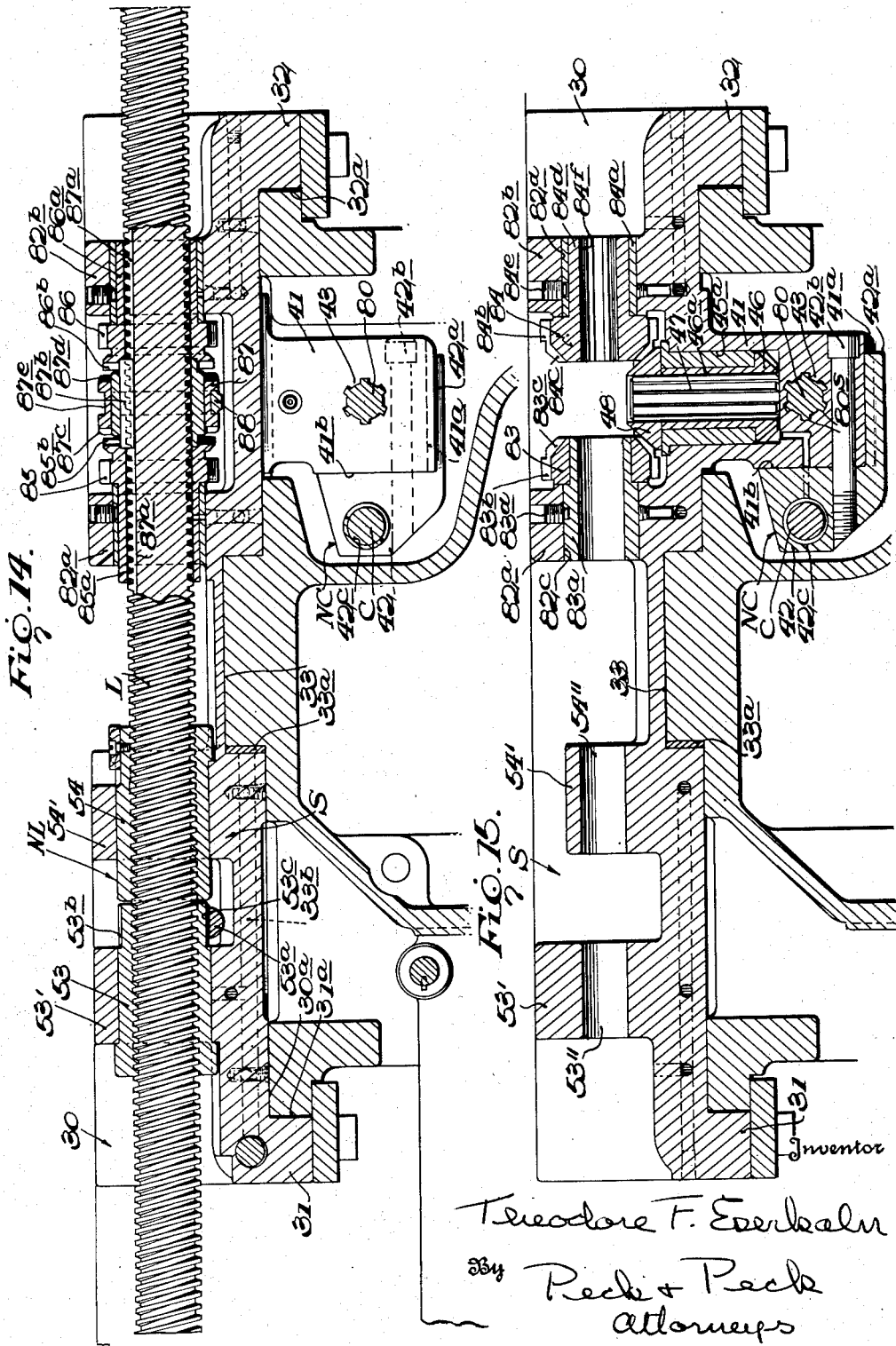

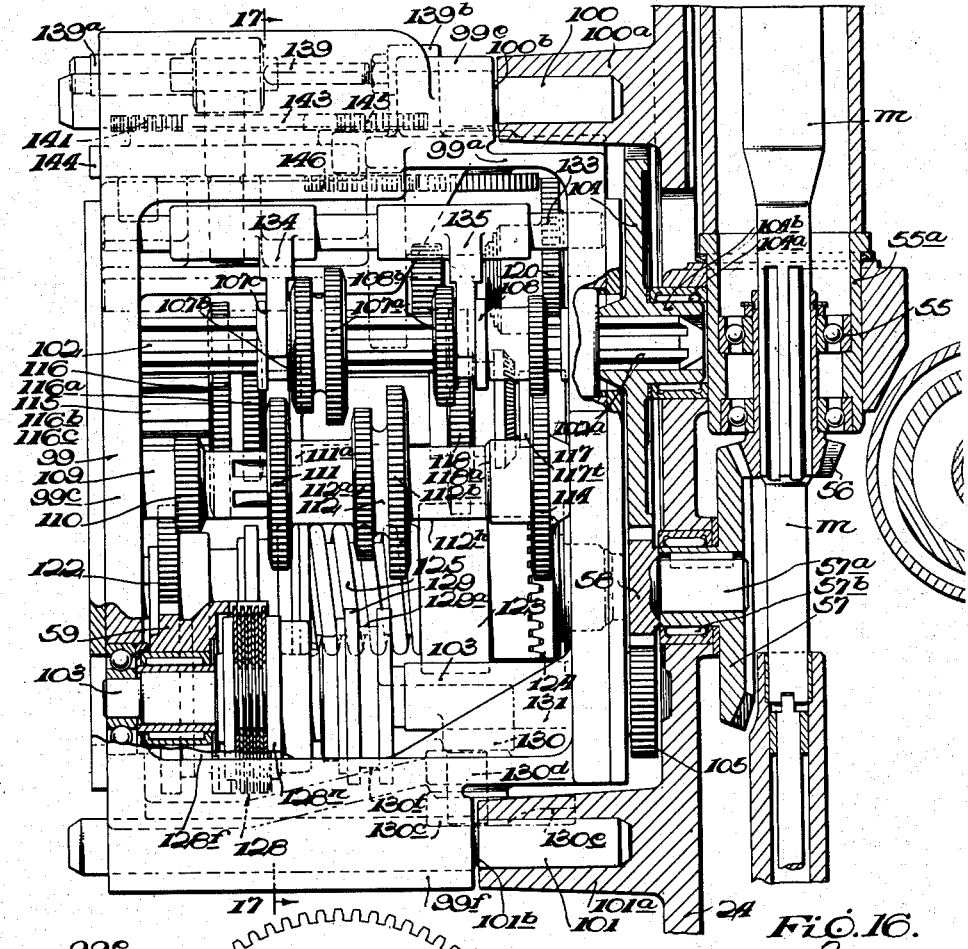
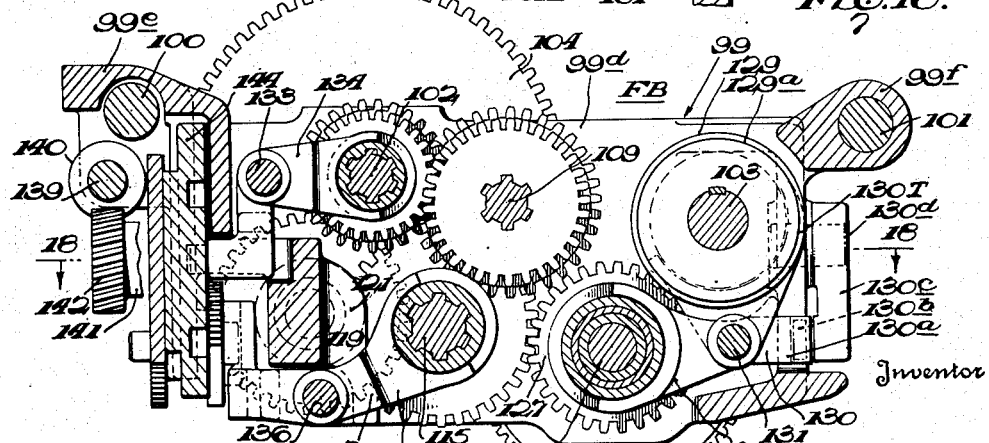

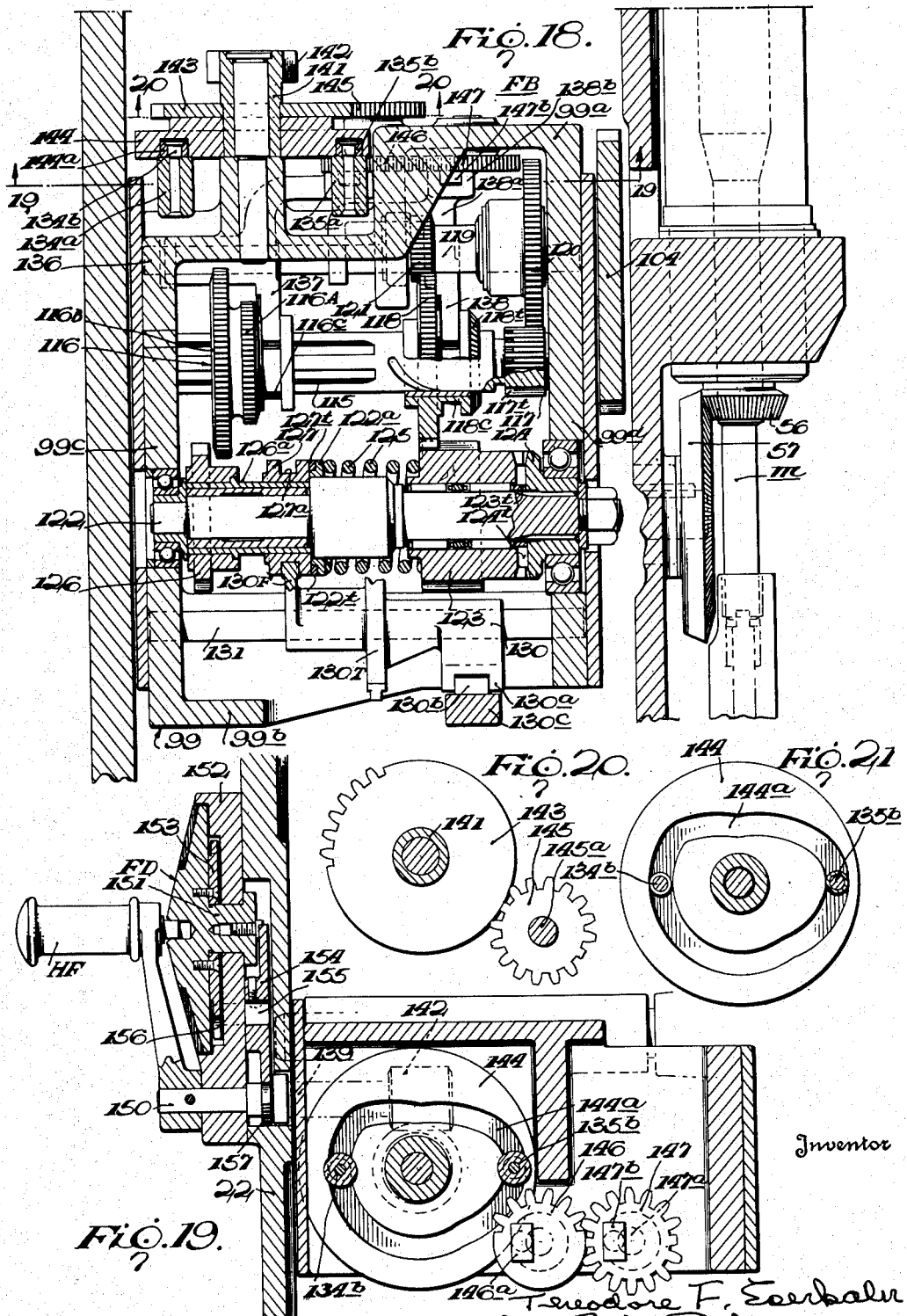

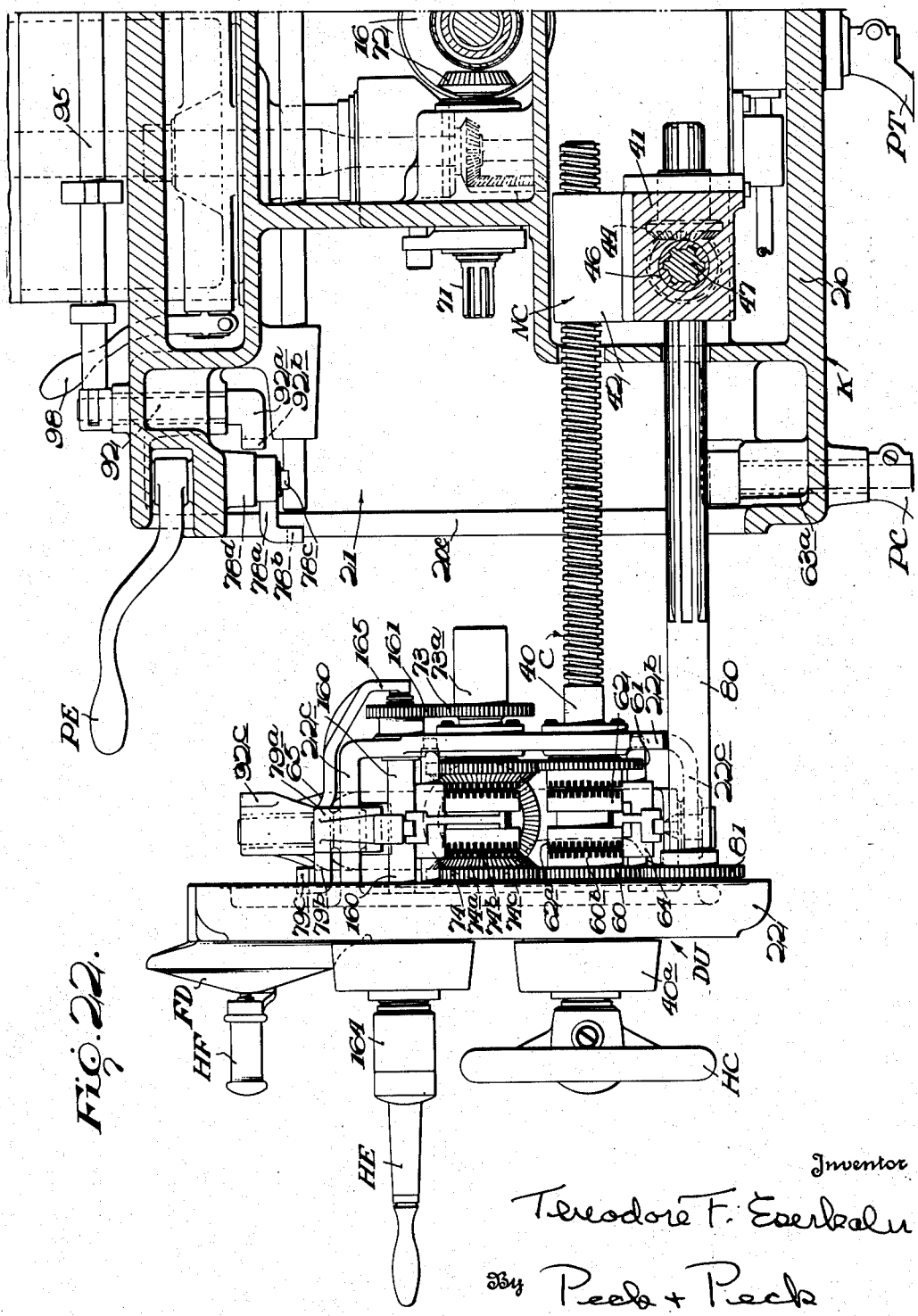

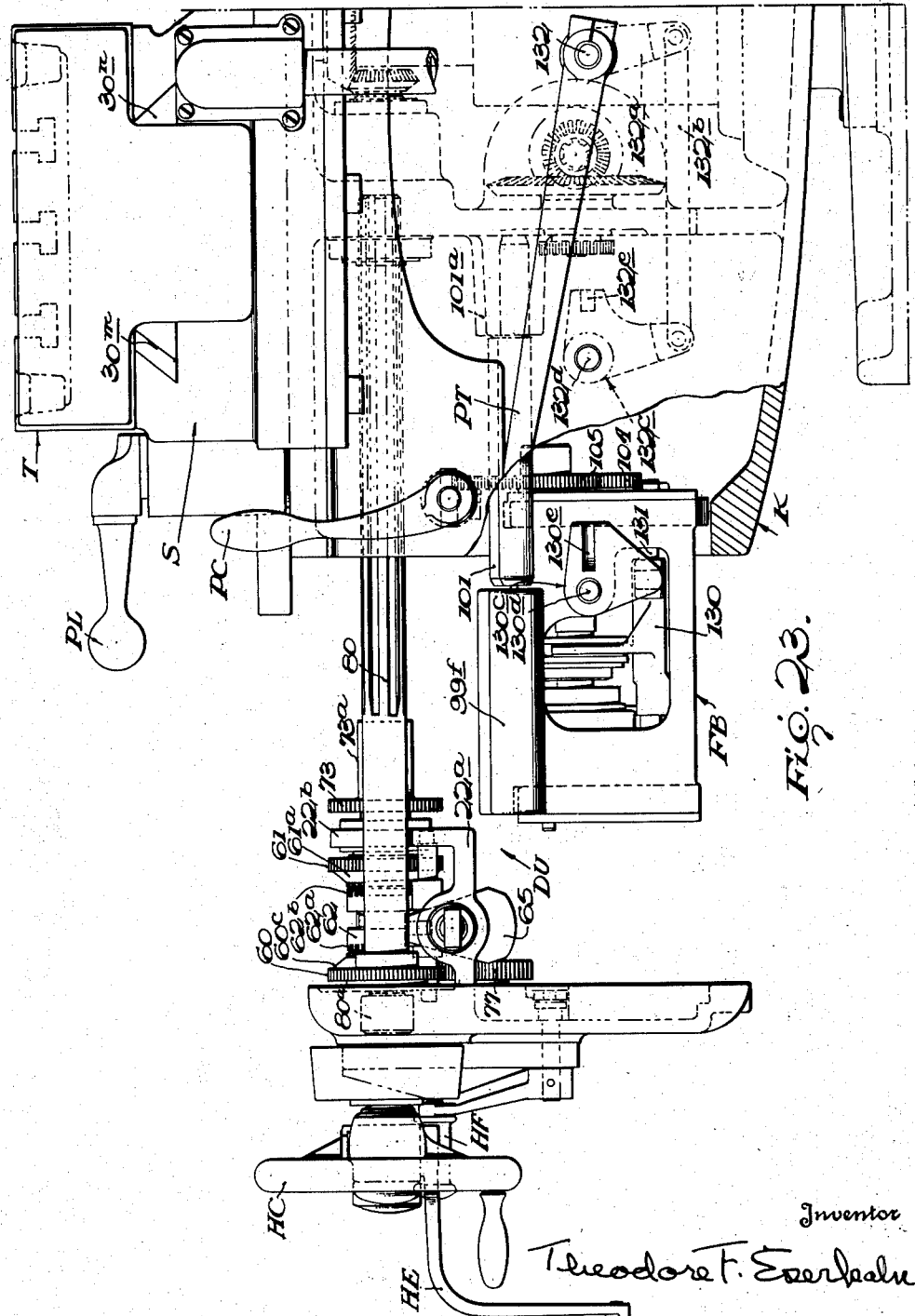

Patented July 14, 1953

2,645,163

UNITED STATES PATENT OFFICE 2,645,163

MILLING AND THE LIKE MACHINE TOOL

Theodore F. Eserkaln, Wauwatosa, Wis., assignor to George Gorton Machine Co., Racine, Wis., a corporation of Wisconsin Application August 30, 1948, Serial No. 46,808

14 Claims. (Cl. 90—21)

This invention relates to machine tools and particularly to such tools as exemplified by the general milling machine types; and the nature and objects of the invention will be readily recognized and understood by those skilled in the arts involved in the light of the following explanation and detailed description of the accompanying drawings illustrating what I now believe to be the preferred embodiments or mechanical expressions of my invention and of the various features thereof, from among numerous other forms, expressions, embodiments, arrangements, designs, constructions, combinations and modifications of which the invention and its various features are capable within the broad spirit and scope thereof as defined by the hereinafter appended claims.

My invention is directed primarily to machine tools of the so called "knee" types in which a vertically movable knee mounts thereon a slide or saddle for horizontal cross movements transversely or "in" and "out" relative to the machine, and such saddle mounts a work table for horizontal movements thereon longitudinally or "left" and "right" of the machine along a path perpendicular to the path of cross or "in" and "out" movement of the saddle with the work table, so that, the work table is movable vertically and is also movable universally laterally in a horizontal plane; and the invention is particularly concerned with such knee types of machine tools in which the knee, saddle and table are power fed or driven by selectively operable, variable speed drives.

A general object of the invention is to substantially improve the design, construction and arrangement of such a knee, saddle and work table assembly and of the various components thereof, and particularly such an assembly of the power fed or driven types, in order to increase operating efficiency as well as to increase efficiency from the standpoints of construction, assembly and maintenance.

Another general object is to provide such a power fed knee, saddle and work table assembly, with improved designs and constructions of hand feeds for selectively manually feeding the knee, saddle and table when the power feeds are disengaged or inactive; and further to provide efficient and positive acting interlocking mechanisms between the power feeds and the hand feeds to insure against operatively engaging the hand feeds when the power feeds are engaged.

A further general object is to provide a power fed knee, saddle and table assembly of extreme compactness, and of such a design and arrangement that major components of the feeds are removable and replaceable independently as units without requiring major "take down" of the knee, saddle and table assembly; and further to provide self-acting coupling connections for such removable components by which they are coupled and uncoupled from operative engagement with their associated mechanisms automatically and solely by the acts of positioning such components in or removing them from mounted operative position in the knee, saddle and table assembly.

One particular object of the invention is to provide an improved design, construction and arrangement of a machine tool knee of the "wide" type which will be capable of efficiently mounting and substantially enclosing therewithin power driven feeds and change speed components thereof for the knee, saddle and table, and will also provide for the efficient location and mounting thereon of a motor for such power driven feeds so as to form an assembly of such knee and feeds with the motor as a self-contained unit.

Another object is to design and construct such a "wide" type of knee with the top or upper side structure formed to provide an efficient arrangement of widely spaced, horizontally disposed supporting and bearing surfaces for slidably mounting a work table carrying saddle on the knee in such a manner as to give maximum rigidity and stability to the saddle and to the table carried thereby, while constraining the saddle to a precise path of cross or "in" and "out" movements on the knee with minimum possibility in operation of deflection or deviation of the knee from such path.

A further object is to provide in an arrangement of widely spaced, longitudinal bearing surfaces for a slide member, for lateral or side bearing surfaces at opposite sides of one of the longitudinal bearing surfaces spaced apart a small distance relative to the length thereof to form with the longitudinal surface a narrow guide and obtain a bearing for the slide member having a high degree of stability.

And a further object is to obtain a stable bearing for slidably mounting a slide member by utilizing a bearing surface arrangement designed and arranged to form a narrow guide for the slide member.

Another object of the invention is to provide improved knee mounted and contained power and manual drives for selectively feeding the knee, saddle and table, respectively, and further to provide an improved mounting and arrangement of such drives on and within the knee so as to form with the knee a vertically movable self-contained unit.

Another object is to provide an improved design and construction of saddle and of the slidable mounting thereof for cross or "in" and "out" feeding of the saddle on the knee.

A further object is to provide an improved and efficient design and construction of work table and of the slidable mounting thereof for longitudinal feeding of the work table on and independently of the saddle.

Another object is to improve the design, construction and mounting of the cross or saddle feed screw on the knee and of the construction and mounting of the cross feed screw nut on the saddle.

Another object is to improve the design, construction and mounting of the longitudinal or table feed screw on the work table and of the construction of the adjustable feed screw engaging nut and the mounting thereof on the saddle, for causing longitudinal feed of the work table on and independently of the saddle by rotation of the table feed screw.

Another object is to provide an improved arrangement and mounting on such a power fed knee, saddle and table assembly, of the manually operable controls for selective operation of the power feeds and of the speed changing components thereof, which will locate such controls at conveniently accessible and readily visible points to the operator on the knee, saddle and table assembly, and which will permit of duplication of certain of such controls at remote points convenient to certain positions taken by an operator in performing work with a machine.

A further object is to provide a change speed and rapid traverse gear organization as a component of the knee, saddle and table feeds or drives and through which the knee, saddle and table may be fed at selected speeds, together with operator controlled selector mechanism, with such change speed gear organization and selector mechanism formed as a self-contained assembly or unit which may be mounted in and removed from operative position within the knee as a unit.

Another object is to provide a design and arrangement of such a change speed gear organization and selector mechanism unit for removable mounting in a knee as a component of the knee, saddle and feed drives or feeds, by which the unit can be removed from and replaced into operative position in the knee through the front or forward side of the knee without requiring the removal from the knee of those of the manual controls for the feeds which are located at a side or sides of the knee.

A further object is to provide a design and arrangement of knee and a change speed gear and selector mechanism unit removably mounted therein for removal and replacement through the front or forward side of the knee, in which a removable front plate forms the forward closing wall of the knee and mounts the feed selector mechanism operating hand crank and associated feed selection dial; a portion of the manually operable hand feed for the knee drive; the transverse or cross feed screw for the saddle and the manual operating member therefor; and the drive shaft of the longitudinal or table feed, with such above identified elements and certain associated structure, removable and replaceable with said front plate as a unit assembly from and to operative position mounted on and closing the forward side of the knee.

Another object is to provide an efficient design and arrangement of change speed gear organization to include a rapid traverse gear train and controlling clutches for the longitudinal or table feed screw together with simple and positive acting selective gear shifting mechanisms under the control of a selector mechanism for setting up the organization for a selected speed.

A further object is to provide an improved and efficient selector mechanism for the change speed gear organization together with a simple and efficient feed dial and selector hand crank arrangement for selectively operating the selector mechanism and visually indicating by said dial the selected feed.

A further object is to provide an interlock between the rapid traverse gear train and the change speed gear trains of the knee, saddle and table in such a change speed gear organization, so that the feed trains are automatically disengaged when the rapid traverse clutch is operated to engage the rapid traverse gear train and are re-engaged when the rapid traverse clutch is disengaged.

Another object is to provide a design and arrangement of a knee, saddle and table assembly with power and manual drives or feeds therefor, in which the cross feed or saddle actuating screw and the primary drive shaft of the longitudinal or table feed screw can be readily removed from and replaced through the front wall of the knee without removing such front wall and independently of other mechanism directly associated with said cross and longitudinal feed screws and/or mounted in the knee, in order that the saddle may be removed from the knee without opening the knee proper and/or removing knee mounted and associated mechanisms.

A further object is to provide an improved construction, mounting and arrangement of the longitudinal or work table feed screw and a saddle mounted drive shaft adjacent and parallel with the feed screw by which no caps are required for the mounting of the feed screw in this drive shaft.

A further object is to provide an improved design and construction of and mounting arrangement for the cross feed screw nut in order to eliminate or reduce to a minimum, shear stress on the cross feed nut hand screw.

Another object is to so design and mount the cross feed or saddle screw nut that such nut can be dropped from the saddle in such a manner that it will not be necessary to remove the cross feed screw from the knee when it is desired to remove the saddle from the knee.

A further object is to so design, construct and mount the cross feed screw nut on the saddle, that difficulties caused by the eccentric thrust of the cross feed screw are eliminated.

Another object is to provide a design and arrangement of hand lever and operating linkage actuated thereby for operating the rapid traverse gear train clutch of the change speed gear organization unit, by which the clutch is gravity loaded and continuously biased to clutch disengaged position, so that, the operator will be required to hold the rapid traverse lever in clutch engaged position against such gravity loading; and a further object in this connection is to so design the rapid traverse operating clutch linkage that it is unnecessary to remove any of the levers thereof when the change speed and rapid traverse gear unit is removed from mounted operative position in the knee.

With the foregoing objects, features and results as well as certain others in view, which others will be readily apparent from the following detailed description and explanation, my invention consists in certain novel features in design and construction of parts and elements, and in various combinations and sub-combinations thereof, all as will be more fully referred to hereinafter.

Referring to the accompanying drawings in which similar reference characters refer to corresponding parts and elements throughout the several figures thereof:

Fig. 4 is a view in side elevation of the left hand side of the knee, saddle and table assembly of the machine of Fig. 1.

Fig. 5 is a view in side elevation of the right hand side of the knee, saddle and table assembly.

Fig. 6 is a view in front elevation of the knee, the saddle and work table having been removed.

Fig. 7 is a view in vertical section taken along the longitudinal center of the knee, through the knee, saddle and work table.

Fig. 8 is a view in horizontal section through the knee taken as on the line 8—8 of Fig. 7.

Figure 10:
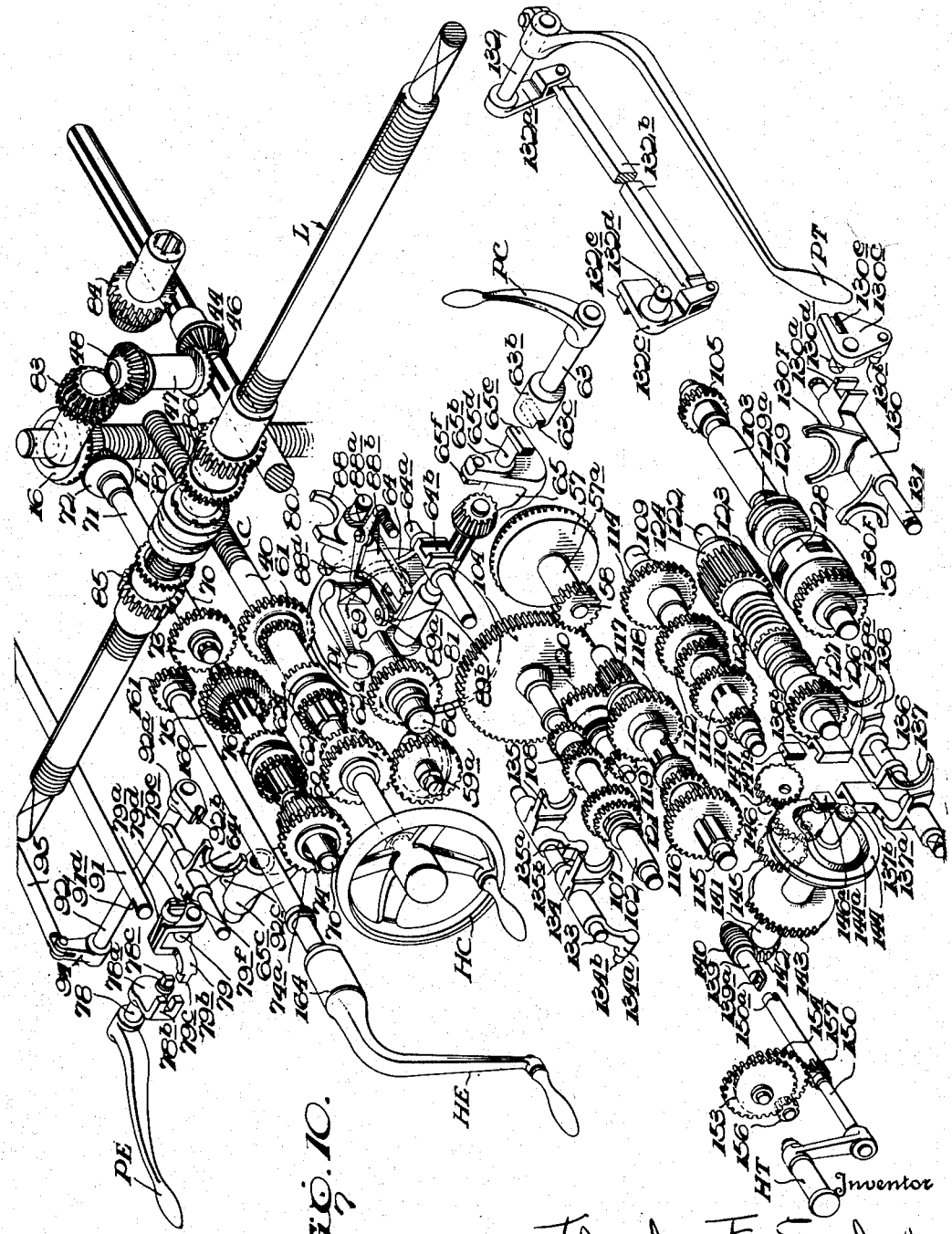

Fig. 10 is a perspective view, more or less diagrammatic of the change speed and rapid traverse gear trains, the speed selection mechanism and the rapid traverse control, the knee, saddle and table feeds driven therefrom, together with the selected controls for such feeds; all of the parts and elements being shown as though separated and pulled apart but maintained in their general positions relative to and for operative association with each other.

Figure 11:
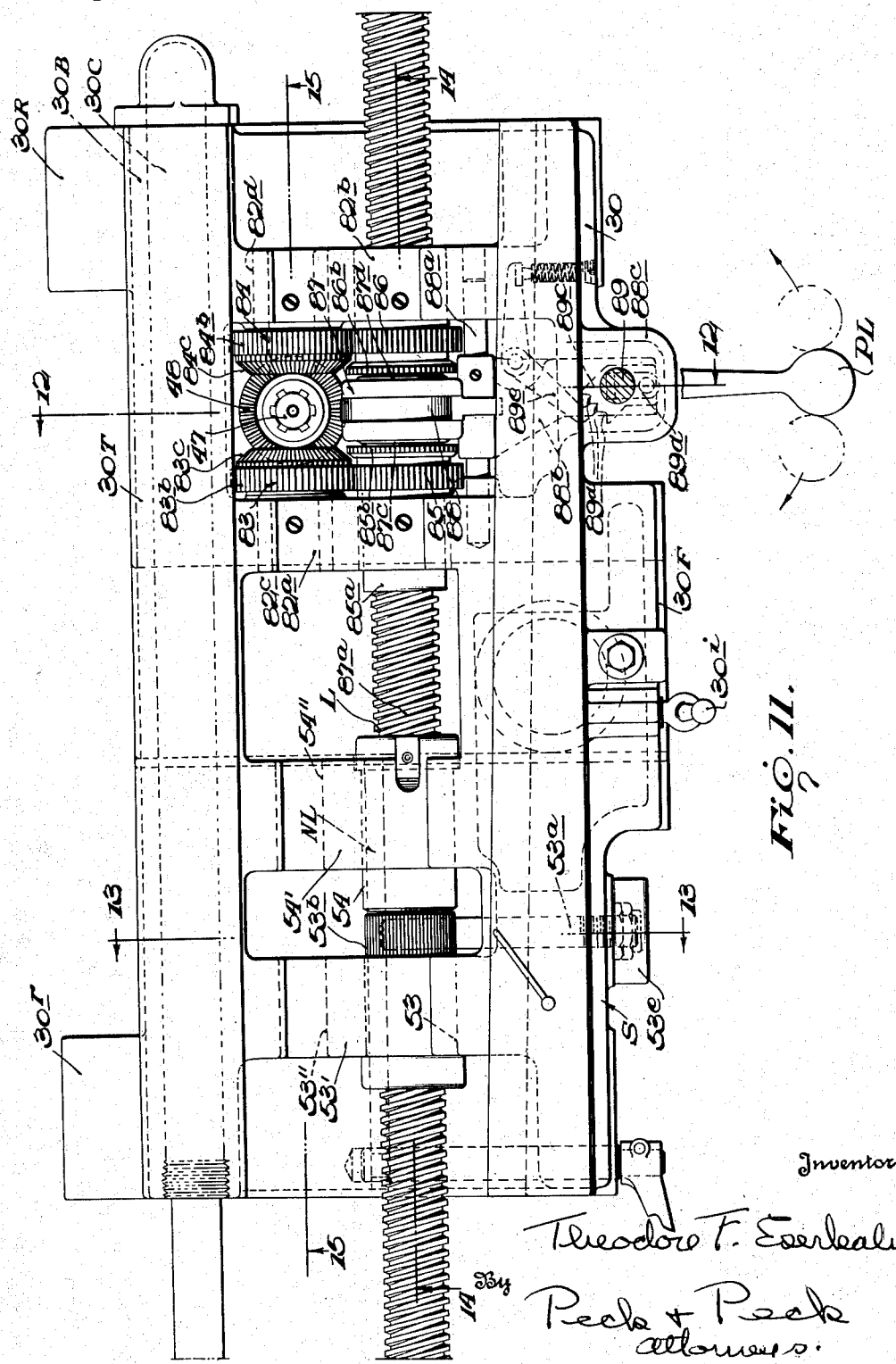

Fig. 11 is a view in top plan of the saddle with the table removed but with the table feed screw being shown.

Figure 12:
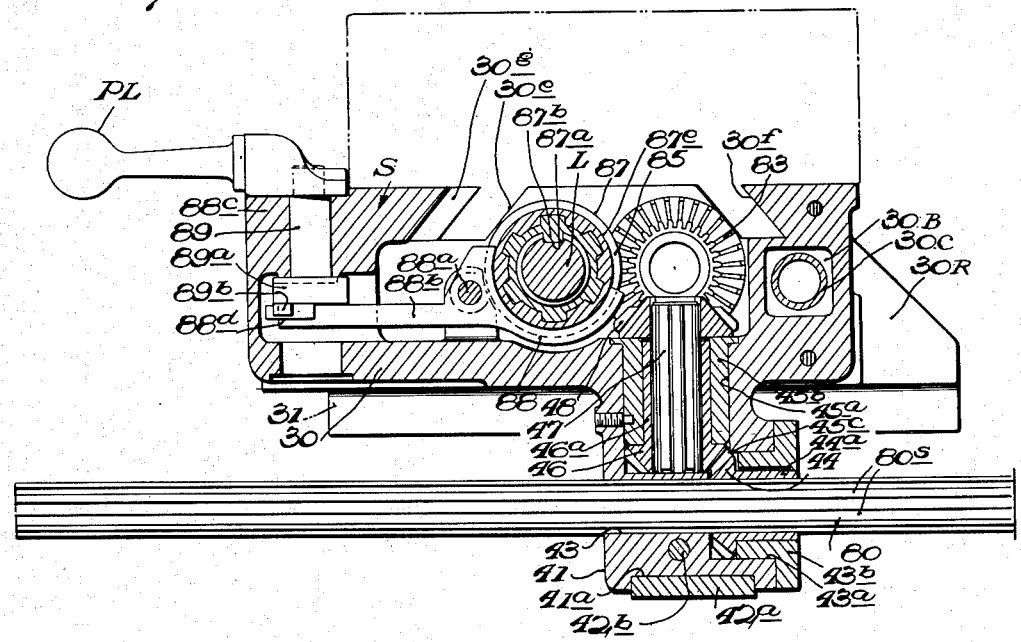

Fig. 12 is a vertical transverse section taken through the saddle as on the line 12—12 of Fig. 11.

Figure 13:
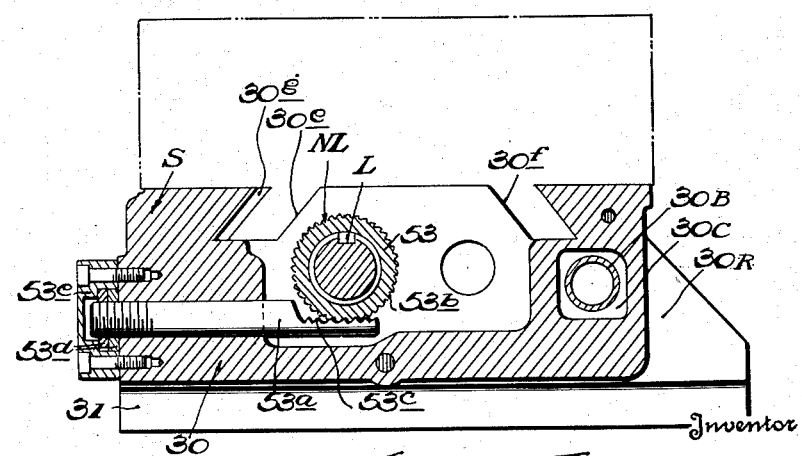

Fig. 13 is a vertical transverse section through the saddle taken as on the line 13—13 of Fig. 11.

Fig. 14 is a longitudinal section through the saddle taken as on the line 14—14 of Fig. 11.

Fig. 15 is a longitudinal section through the saddle taken as on the line 15—15 of Fig. 11.

Fig. 16 is a view in top plan of the removable feed unit and the portion of the power drive thereto, the unit being shown in mounted position in the knee with a portion only of the knee structure being shown.

Fig. 17 is a vertical transverse section through the removable feed unit taken as on the line 17—17 of Fig. 16.

Fig. 18 is a horizontal cross section through the removable feed unit taken as on the line 18—18 of Fig. 17.

Fig. 19 is a vertical section taken as on the line 19—19 of Fig. 18.

Fig. 20 is a detailed vertical section taken as on the line 20—20 of Fig. 18.

Fig. 21 is a detailed view in side elevation of the cam disc with the cam groove therein of the feed selector mechanism, the cam shaft and cam groove followers being shown in vertical transverse section.

Fig. 22 is a view in top plan of the feed distribution unit in position partially removed from the knee, the forward portion only of the knee being shown in horizontal cross section.

Fig. 23 is a view in side elevation of the feed distribution unit and of the change speed feed unit, both in positions partially removed from the knee, the forward portion only of the knee being shown in vertical section.

Fig. 24 is a detailed vertical section through the work table, table feed screw bearing assembly, table feed screw hand wheel and interlock at the left hand end of the table.

Fig. 25 is a detailed vertical section through the right hand end portion of the work table showing the right hand end of the table feed screw and the bearing assembly therefor.

A form of a power fed knee, saddle and table and the associated feeds and controls therefor, providing a self-contained assembly in accordance with and embodying my present invention, has been selected and is illustrated herewith purely by way of example, as applied to and forming components of a milling machine of the horizontal spindle type. However, my invention is in nowise limited or restricted to mechanical and functional expressions in forms or embodiments of a knee, saddle and table assembly designed for and adapted to milling machines of the horizontal spindle type, as the invention has broad and general adaptability for use with milling machines of various types, including the vertical spindle types, as well as to machine tools or similar or analogous machines generally where it is desired to provide a compact knee, saddle and table assembly of the power fed type for effecting movement of a work supporting element or table relative to a cutting tool or equivalent working element. And further attention is here directed to the fact that the invention includes various features in design, arrangement and construction of the knee, saddle and work table components of the assembly which are not limited or restricted to embodiment in such an assembly of the power fed type, but which are adapted to and intended for embodiment in such an assembly where the knee, saddle and table components are hand fed. Certain of the features and characteristics of the knee and its mounting, of the saddle and its mounting, and of the table and its mounting, and of the feeds and controls therefor, are also of independent utility and may be applied to knee, saddles and tables and feeds and controls, respectively, as individual features.

Figure 1:
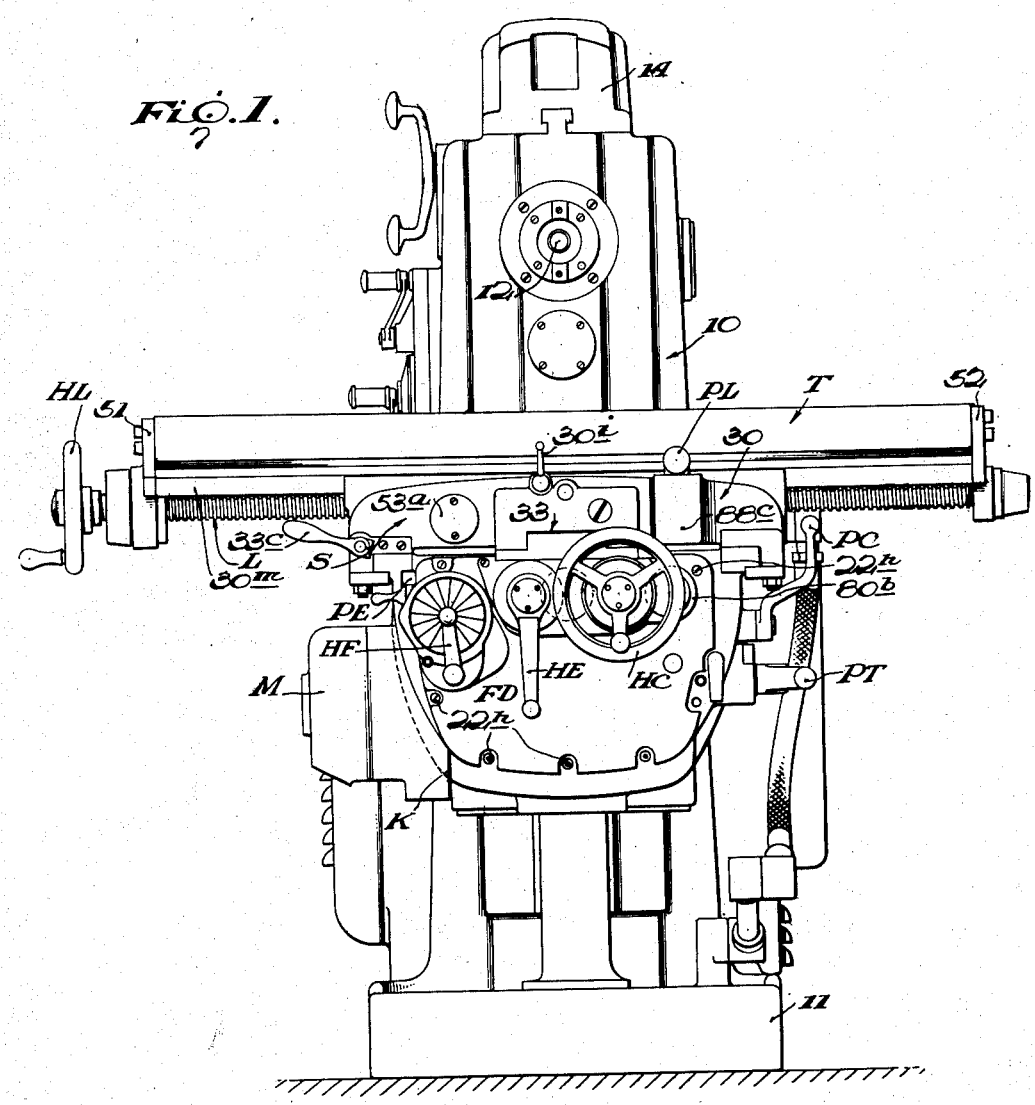
Fig. 1 is a view in front elevation of a knee, saddle and table assembly of my invention embodied in a design of milling machine of the horizontal spindle type.
Figure 2:
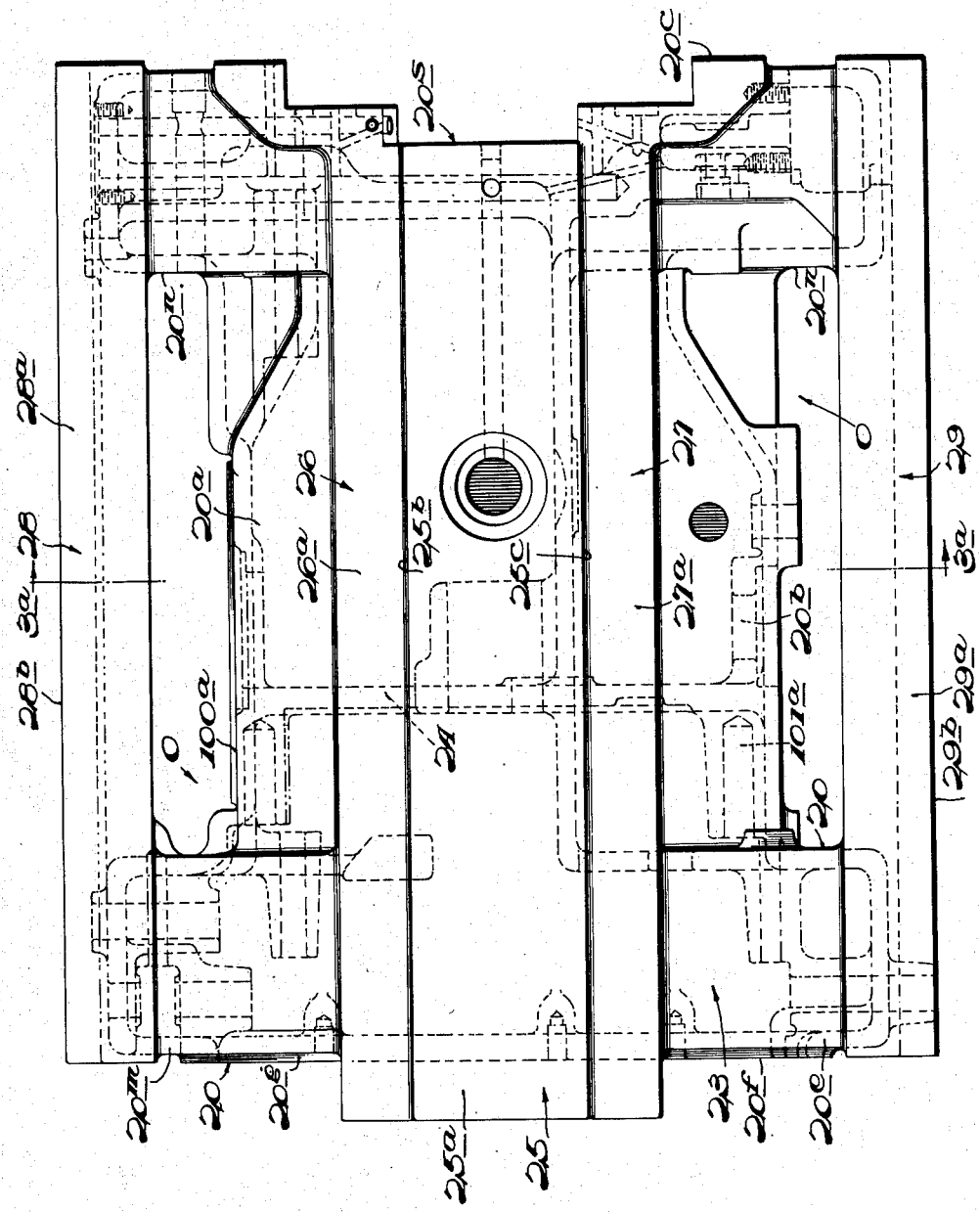
Fig. 2 is a top plan view of the casting constituting the basic structure of the knee, the front plate forming the forward or front wall of the knee having been removed.

The example form and embodiment of the invention and its various features as applied to and incorporated in a milling machine of the horizontal spindle type, is illustrated in Fig. 1 of the drawings. The horizontal spindle milling machine of the selected example, includes a vertical column structure 10 mounted on and being extended upwardly from a horizontal, forwardly extended base 11. The vertical column structure 10 mounts in the upper portion thereof a horizontal spindle 12, which is exposed in the usual manner at the forward side of the column. In this instance, a horizontally adjustable ram 14 is mounted on and extends forwardly from the upper end of column 10 over and above the base 11 in the general manner familiar in the art for this type of milling machine.

The power fed knee, saddle and table constituting the example form of self-contained assembly comprises a knee K mounted in horizontally disposed position supported from base 11 at the forward side of column structure 10 below the horizontal spindle 12 for vertical translation upwardly and downwardly along a straight line perpendicular path toward and from the spindle; a saddle S slidably mounted on the upper side of the knee K for cross or "in" and "out" movements thereon independently thereof in a horizontal plane along a straight line path; and a work table T mounted in horizontally disposed position on and being extended transversely of and across the upper side of saddle S for longitudinal or "right" and "left" movements on and independently of the saddle in a horizontal plane in either direction along a straight line path perpendicular to the straight line path of cross feed movements of the saddle S. The work table T is thus mounted for vertical movements toward and from spindle 12 and for universal lateral movements in a horizontal plane by independent cross feed movements, independent longitudinal feed movements, and compound cross and longitudinal feed movements.

The knee, saddle and work table are in this instance, power fed from a single, common power source constituted by a motor M mounted on the knee K. In this example, motor M is mounted on the left hand side of the knee K when facing the front of the machine. The motor M is thus carried by and forms the power component of the self-contained power fed knee, saddle and table assembly of my present invention.

The knee K, the saddle S and the work table T in addition to being power fed, are in the selected example hereof, also provided with hand feeds, respectively, suitably interlocked with the power feeds so as to be only operable for manual feeding when the power feeds are disengaged and inactive. Such hand feeds include manually operable controls mounted on and forming components of the self-contained assembly, such hand feed controls in this instance taking the form of a hand crank HE mounted and located at the forward side of knee K for manual operation to elevate and lower the knee; a hand wheel HC also mounted and located at the front or forward side of knee K for manually cross feeding saddle S with table T thereon; and a hand wheel HL mounted and located at one end of work table T for manually feeding the work table longitudinally in either direction on saddle S. In this example, hand wheel HL is located at the left hand end of table T when facing the front of the machine, but if desired or found expedient, such a hand wheel may be located at the opposite or right hand end of table T, or a hand wheel HL may be provided at each end of the work table.

The self-contained knee, saddle and table assembly also includes operator controls for selectively controlling the power feeds and the direction of such feeds, for the knee K, the saddle S and the table T, respectively, including an operator control for rapid transverse actuation of the work table T. Referring particularly to Figs. 1 and 5, such power feed operator controls include a hand lever PE for selectively controlling the power feed of the knee K; a hand lever PC for selectively controlling the power cross feed of the saddle S; a hand lever PL for selectively controlling the power feed longitudinally of table T on saddle S; and a hand lever PT for selectively controlling the rapid transverse feed longitudinally of the work table T. In this particular arrangement of the knee, saddle and table assembly of the invention, the elevating power feed control lever PE of knee K is mounted on the knee extending forwardly from the front of the knee adjacent the left hand side thereof when facing the knee; the power cross feed control lever PC is mounted on the right hand side of the knee; the longitudinal power feed for the work table T is mounted at the forward side of the saddle S; and the work table rapid traverse control lever PT is also mounted at the right hand side of the knee, all as will be clear by reference to Fig. 1 of the drawings.

The wide knee

The knee K is of the "wide" type designed to present a horizontally disposed upper side wall structure 23 of considerable width to permit of the provision thereon of widely spaced horizontal slideways disposed longitudinally of the knee, that is from front to rear thereof, or "in" and "out" relative to the machine, for supporting and slidably mounting and constraining thereon the saddle S for cross feed on the knee along a straight line path. The knee K of this example is formed of a casting 20 which provides a main or major frame structure of hollow, box-like form including as primary structure, the opposite main, general side wall structures 20a and 20b, the rear vertical wall 20c, the generally horizontally disposed bottom wall 20d, the vertical front wall 20e, and the horizontally disposed, wide top wall structure 23.

Figure 9:
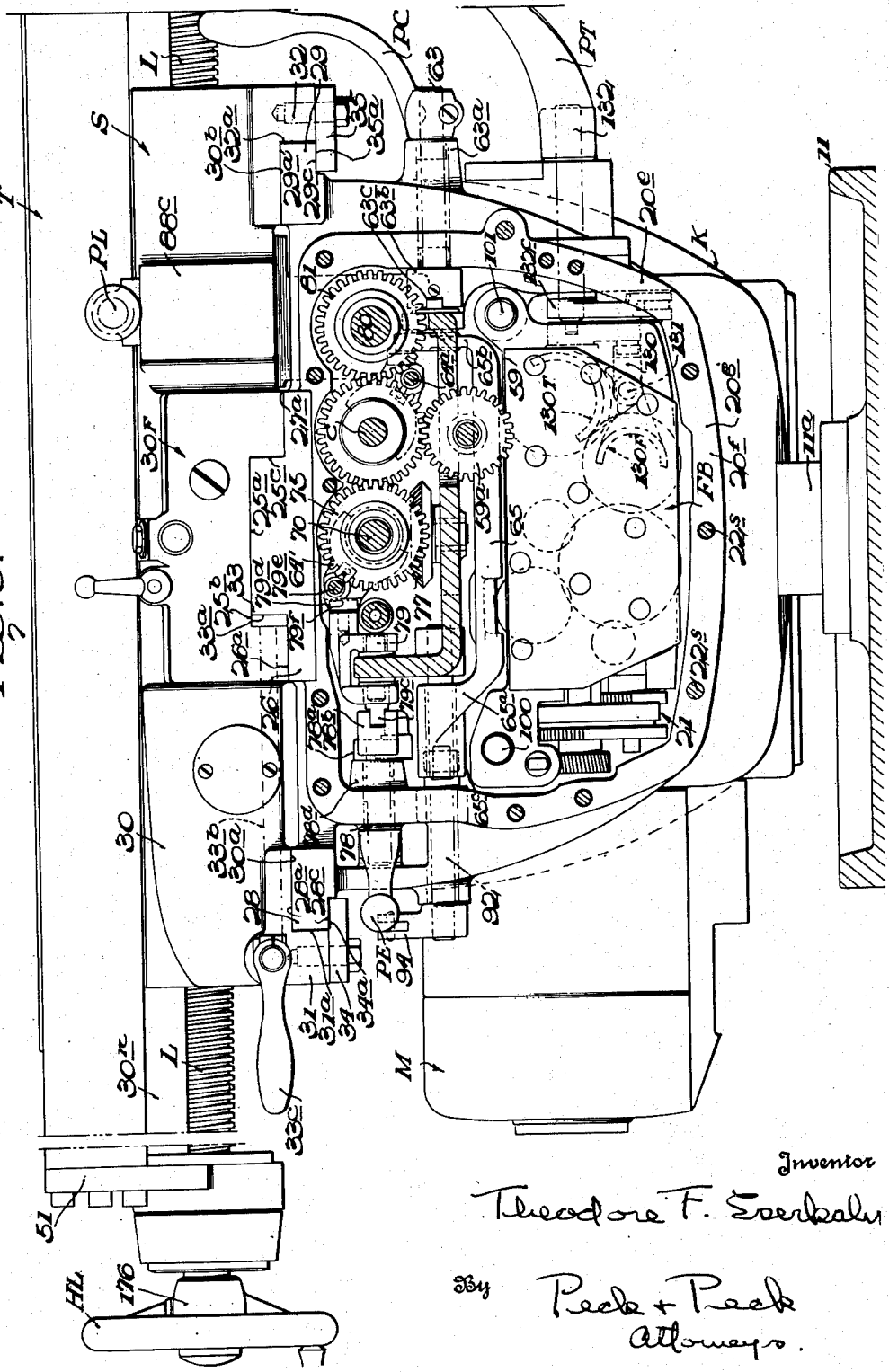
Fig. 9 is a vertical transverse section taken as on the line 9—9 of Fig. 4.

The front of the knee casting 20 is open for the major portion of the front area thereof, so that, the integral front wall 20e of the main frame structure is constituted by a vertically disposed, inwardly extended flange portion which surrounds and defines the knee front opening 21 (see Figs. 7 and 9). This knee front opening 21 has a width and a depth slightly less than the width and depth, respectively, of the casting 20 and is generally centrally located in and with respect to the front of the knee K. Thus, the opening 21 provides for substantially unobstructed access to the interior of the hollow knee casting 20 for substantially the full width and depth thereof at the front or forward side of the casting. The front flange forming wall 20e is provided with a raised rib 20f therearound on the outer face thereof surrounding the opening 21. Rib 20f is suitably machined or otherwise finished to provide the outer face thereof as a seating surface 20g for seating and mounting in vertical position thereon and thereagainst a removable plate structure 22. This front plate structure 22 is removably mounted and attached on seating surface 20g in vertical position extending over and closing the knee opening 21 by means of the machine screws or other suitable fastening elements 20h, located at spaced intervals around the plate structure 22 and being threaded into suitable tapped bores 20i in the front wall seating rib 20f (see Fig. 9).

Figure 3:
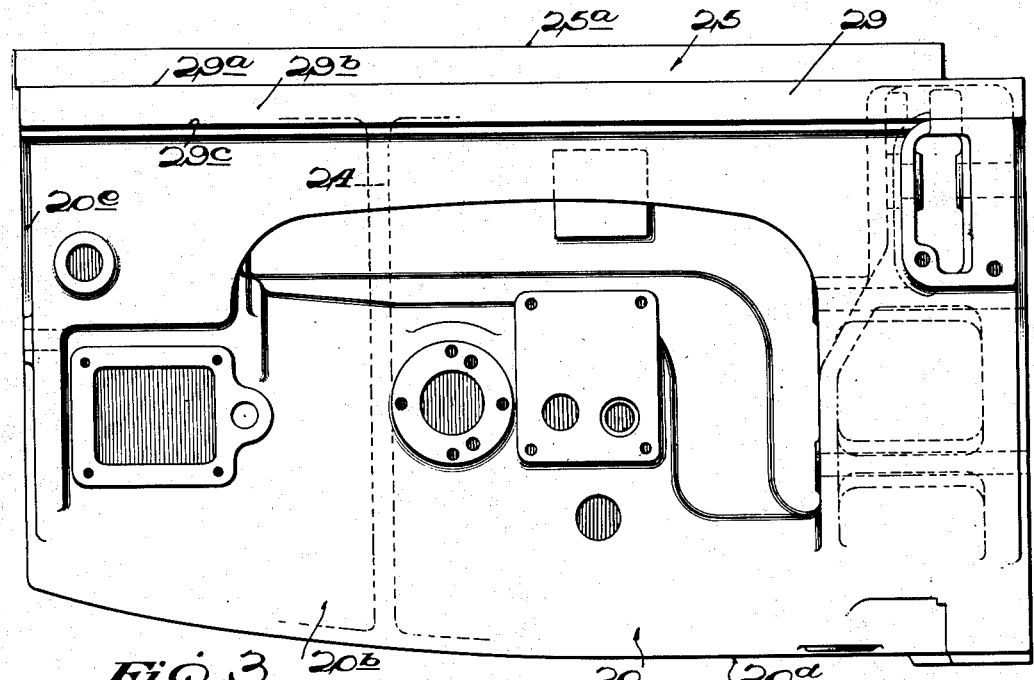
Fig. 3 is a view in side elevation of the right hand side of the knee casting structure of Fig. 2.
Figure 3A:
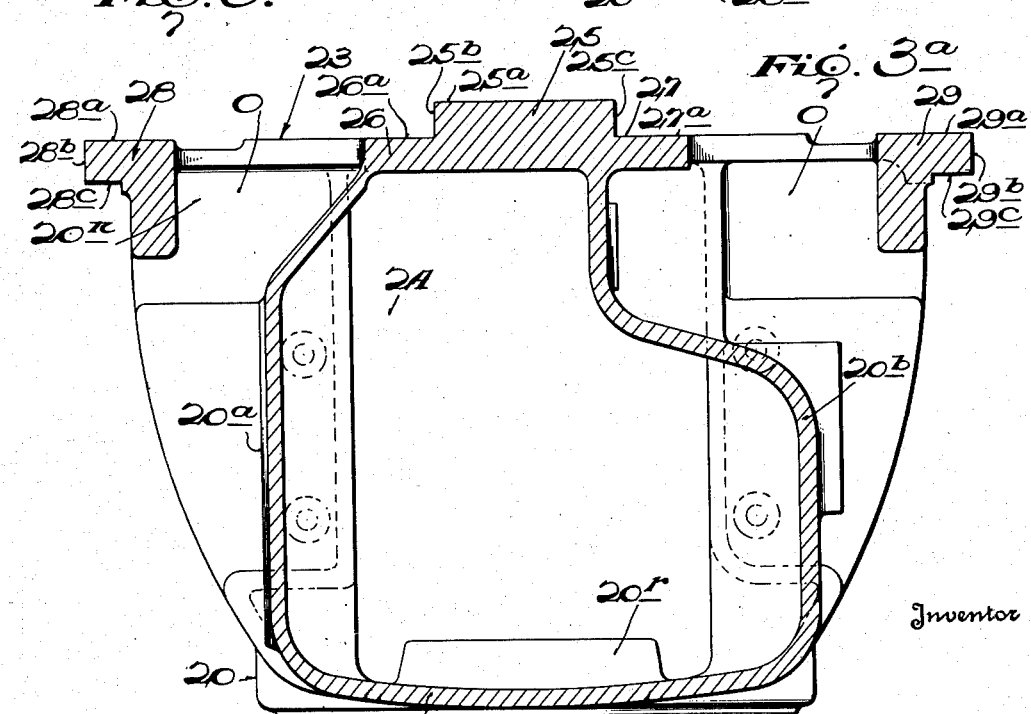
Fig. 3a is a vertical transverse section taken as on the line 3a—3a of Fig. 2.

The main, box-like frame structure of the knee forming casting 20 has the intermediate portion or section thereof formed by the opposite side wall structures 20a and 20b, of less width than the front or rear end portions thereof formed by such general side wall structures, so that, the main frame structure provides the front and rear, vertically transversely disposed bridgeheads 20m and 20n which extend laterally outwardly beyond the opposite, vertical sides, respectively, of the reduced width intermediate portions of the main frame provided by the intermediate sections of the side wall structures 20a and 20b thereof. The opposite, outer vertical sides of each of these bridgeheads 20m and 20n is preferably curved downwardly and inwardly to the bottom wall 20d. See Figs. 1, 3 and 9.

The knee casting 20 includes the top wall structure generally identified by the reference character 23, as an integral part of the casting. This top wall structure 23 extends over and across the upper sides of the general side wall structures 20a and 20b and the front and rear bridgeheads 20m and 20n thereof, to thus form an upper or top wall at the upper side of the hollow knee casting 20 and forming a portion of the major or main frame structure of the knee K. The top wall structure 23 is of greater width than the width of the body of the knee casting for the full length or longitudinal dimension of the casting and main frame thereof therebelow, so that, the top wall structure extends equal distances laterally outwardly beyond the opposite sides, respectively, of the general side wall structures 20a and 20b, including the opposite sides of the front and rear bridgeheads 20m and 20n.

A vertical transverse bulkhead or partition wall 24 is formed as a part of and integral with casting 20 in position located spaced a distance to the rear of the front bridgehead 20m. Wall 24 extends across the interior of the casting between the opposite side wall structures 20a and 20b, the bottom wall 20d and the top wall structure 23.

The horizontally disposed upper or top wall structure 23 is formed with the central portion thereof of increased thickness to provide the relatively narrow rib 25 projecting upwardly above the general horizontal plane of the upper surfaces of the top wall structure 23, and the opposite side, laterally extended lower level rail forming portions 26 and 27 extending therealong for the full length of central rib member 25. The central rib 25 and lower level rail portions 26 and 27 extend longitudinally of the knee casting 20 from front to rear thereof. Thus, the central portion of the top wall structure 23 provided by the central rib 25 and the opposite side rail forming portions 26 and 27, forms in effect a central bridge extending longitudinally of the knee from front to rear thereof, connecting and extending across the front and rear bridgeheads 20m and 20n of the knee casting frame structure.

The central rib 25 forms a relatively narrow guide rail which together with the opposite, lower level guide rails 26 and 27, provides a horizontal slideway having multiple bearing and slide surfaces extending longitudinally across the knee K from front to rear thereof for slidably receiving and mounting a complementary multiple surface slideway at the under side of saddle S. The upstanding rib or rail 25 provides a horizontal bearing and slide surface 25a and opposite side edge vertical or lateral slide and bearing surfaces 25b and 25c, respectively, which are parallel with each other and located in vertical planes at right angles to the horizontal plane of the upper slide surface 25a. The opposite side, lower level rails 26 and 27 are formed on the upper sides thereof to provide the horizontal slide surfaces 26a and 27a, respectively, laterally extended from the opposite lower longitudinal edges of the vertical slide surfaces 25b and 25c, respectively, of the rib or rail 25. Slide surfaces 26a and 27a are, in this example, disposed in the same horizontal plane with such plane parallel with the horizontal plane of the slide surface 25a along the upper side of rib 25.

In the preferred construction of the present example, the central, longitudinal bridge portion of the top wall structure 23 which provides the rails 25, 26 and 27, constituting the central longitudinal slideway, is formed integral with the knee casting 20, and such rails are suitably treated and machined to very close tolerances to provide thereon the bearing and slide surfaces 25a, 25b, 25c, 26a, and 27a, respectively. In this instance, it is to be noted, that such central longitudinal slideway forming bridge structure 25—26—27, is extended at its forward end a distance forwardly beyond the general vertical plane of the front surfaces of the front wall forming flange 20e, so that, this forwardly projecting end will extend over and across the upper edge of the removable front plate structure 22 when the latter structure is in mounted position secured over and closing the knee front opening 21.

The opposite longitudinal edge portions of the top wall structure 23 which extend laterally beyond the knee main frame structure, are formed to provide the opposite rails 28 and 29, parallel with each other and with the central longitudinal slideway formed by the rail portions 25, 26, 27. Each of these opposite rails 28 and 29 extends between and over and across the adjacent side portions of the front and rear bridgeheads 20m and 20n, respectively, of the main frame structure of the casting, so that in effect, each of these rails 28 and 29 is "outrigged" or "flying" from the main frame structure. The rails 28 and 29 are thus spaced laterally outwardly a considerable distance from the adjacent rails 26 and 27, respectively, of the central slideway. As each rail 28 and 29 is "outrigged" from the intermediate, narrower width portion of the main frame by the front and rear bridgeheads 20m and 20n, it follows that each of the rails 28 and 29 between its supporting bridgeheads, is spaced laterally outwardly from the adjacent portions, respectively, of the opposite side wall structures 20a and 20b located below the rails. Referring now to Figs. 2, 3, 8 and 9, of the drawings, the invention by this design and construction of the knee casting 20, and of the slideways on the upper side of the top wall structure 23, with the opposite side rails 28 and 29 "outrigged" from the main frame, provides openings O through the top wall structure 23 between the inner edges of the rails 28 and 29, and the adjacent side wall structures 20a and 20b, respectively, and the front and rear bridgeheads 20m and 20n. These openings O provide for chip clearance disposal between the saddle S in mounted position on the knee K, and thus reduce the possibility of chips collecting between the top wall structure 23 of the knee and the saddle S mounted thereon.

The upper side and the outer under side, of the outrigged rail 28, are each suitably treated and machined to close tolerances to provide the upper side horizontal slide surface 28a, and the outer, under horizontal slide surface 28c. The opposite outrigged rail 29 is similarly treated to provide the upper side horizontal slide surface 29a and the outer, under longitudinal slide surface 29c. Slide surfaces 28a and 29a are in the same horizontal plane, and the horizontal, under side longitudinal slide surfaces 28c and 29c are in the same horizontal plane parallel with the plane of surfaces 28a and 29a. The vertical longitudinal edge slide surfaces 28b and 29b are in parallel vertical planes, respectively, which in this instance are parallel with the vertical planes of surfaces 25b and 25c of the central slideway. These vertical surfaces 28b and 29b are not bearing surfaces, as will be explained hereinafter.

The upper wall structure 23 of the knee casting 20 thus provides a system of multiple horizontal and vertical bearing surface slideways for slidably mounting and constraining the saddle S on the knee K to straight line cross feed movements in a horizontal plane. Due to the width of the top wall structure of the knee and the "outrigging" of the opposite side slideway forming rails 28 and 29, these latter rails are widely spaced laterally outwardly from opposite sides, respectively, of the central slideway 25—26—27, and of the narrow guide 25b—25a—25c provided by such central slideway, so that wide lateral bearings surfaces with a narrow central guide are provided for the saddle S, which obtains a high degree of rigidity and stability in saddle mounting with a minimum possibility of deflection or deviation of the saddle from the desired straight line path of cross feed movements on the knee K.

While I have shown a knee design and construction in which the central rails 25—26—27, and the opposite, laterally spaced rails 28 and 29, are formed integral with the knee casting 20, it is to be understood that my invention is not under all conditions limited to such integral formation. If desired or found expedient in any particular instance or embodiment, such rails may be formed as separate elements, or portions thereof may be so formed, suitably secured and attached in position on and to the casting frame structure, while retaining the basic features and advantages, including the wide lateral spacing and the provision for the chip clearance disposal openings O of the integral form of the invention of the selected example.

The rear vertical wall structure 20c of the knee casting 20 is formed with a vertically disposed, inset, multiple bearing surface slideway indicated generally by the reference character 20s. This slideway 20s is centrally located in rear wall structure 20c and extends vertically throughout the height or depth of the rear wall structure for slidably mounting and receiving a complementary multiple surface vertical slideway generally indicated by the reference character 10s, on the forward side of the column structure 10, as will be clear by reference to Figs. 1, 2, 7 and 8. The vertical, complementary slideways 20s and 10s are of the type of my invention as explained above in connection with the central slideway 25—26—27 of the knee, in that a narrow central guide is provided which forms the only side or lateral bearing surfaces of the multiple longitudinal surface slideway.

The lower or bottom wall 20d of the knee casting 20, referring now to Fig. 7 of the drawings, is formed with a circular opening or vertical bore therethrough surrounded by a vertically disposed annular flange 20r, for receiving and through which the mounting post or column for the knee K is received and extends as will be referred to hereinafter.

*The knee mounting*

The knee K, referring to Fig. 7, is mounted and supported in horizontally disposed position on the base 11 at the forward side of the column structure 10 by means of an externally threaded elevating feed screw E. Feed screw E is rotatably mounted and coupled at its upper end to the top wall structure 23 of the knee, and is threaded downwardly through an internally threaded feed screw nut NE which is mounted in upward axial continuation of a fixed post or column 11a mounted and attached at its lower end to the base 11.

Knee supporting post 11a is, in this instance, of tubular form having a flanged lower end by which the post is rigidly attached to the upper side of base 11 by machine screws or the like 11b, with the post extending upwardly from base 11 in position with its longitudinal axis perpendicular to the horizontal plane of the base. The upper end of post 11a has an inwardly turned flange which surrounds the upper end opening of the post, and the elevating feed screw nut NE which is of tubular or sleeve form has an outwardly flanged lower end by which the nut is rigidly attached in position on the upper end flange of post 11a by machine screws or the like 11c. The nut NE is internally threaded throughout the length of the bore therethrough with this threaded bore in axial alignment with the post 11a. The knee K is mounted over its supporting post 11a with the post extending upwardly through the flange 20r which surrounds the opening in the knee bottom wall 20d, post 11a having an external diameter less than the internal diameter of flange 20r so as to provide an annular clearance space around and between these elements.

The upper end of the knee elevating feed screw E is rotatably coupled to the central, thick porton of the knee top wall structure 23 which provides the narrow guide rail 25, by means of a suitable rotatable coupling generally indicated by the reference character 15 in Fig. 7, with the feed screw E thus depending downwardly through the interior of the knee for rotation about its vertical axis independently of knee K while being movable vertically upwardly and downwardly bodily with the knee as a unit. The feed screw coupling 15 includes a suitable anti-friction thrust bearing or bearings 15a and a bevel gear 16 which is fixed or keyed to the upper end of the feed screw in position below and immediately adjacent the underside of knee top wall structure 23.

In mounted position of the knee K with the elevating feed screw E supported from post 11a, the feed screw E is threaded down through the feed screw nut NE with the external threading of the feed screw in operative engagement with the internal threading of the nut, so that rotation of the feed screw in one direction will feed the screw upwardly through the nut NE to raise knee K, while rotation of the feed screw in the opposite direction will cause the screw to feed downwardly through the nut and lower the knee K.

If desired a suitable enclosing casing 11d may be provided surrounding post 11a with the feed nut NE mounted and supported at the upper end of the post, such casing extending downwardly through flange 20r and being secured at its lower end to the underside of that flange. Casing 11d extends upwardly over nut NE into and within the depending annular toothed portion of the bevel gear 16 to thus effectively prevent leakage of oil from within the knee structure to the outside.

The knee K in mounted position is constrained to straight line vertical movements by the slidable engagement of the vertical slideway 10s on the forward side of column 10, in the complementary slideway 20s formed in the rear wall 20c of the knee K. The knee K is constrained and held to its straight line path of movement against movement or deflection forwardly or rearwardly that is, "in" or "out" relative to column structure 10 by the vertically disposed inwardly projecting opposite rails 20t (see Fig. 8) for slidably engaging at their forward faces, the rear complementary faces, respectively, of laterally outwardly projected flange 10t of the column slideway 10s.

The saddle and its mounting

The saddle S is slidably mounted and supported on the slideways at the upper side of the upper side of the knee top structure 23 in position disposed transversely over and across the knee for cross feed movements longitudinally of the knee "in" and "out" relative to the column structure 10 of the machine. The saddle S, referring to Figs. 1, 7 and 9, is comprised of a body 30, which as in this example, may be in the form of a generally rectangular block casting having a length, that is, the dimension transversely relative to knee K, slightly greater than the width of the knee, and a width, that is a dimension longitudinally of the knee, considerably less than the length of the knee at the upper side from front to rear thereof. The saddle body 30 is formed at its opposite ends with the depending vertically disposed parallel flanges 31 and 32 positioned at and along the outer side edges of the opposite side "outrigged" rails 28 and 29, respectively, which rails form and provide the widely laterally spaced saddle supporting slideways of the system of multiple slideways provided at the upper side of the top wall structure 23 of the "wide" knee K.

The saddle body 30, as will be clear by reference to Figs. 1, 7 and 9, has the bottom or lower wall thereof formed at its under side with the slideway generally indicated by the reference character 33, disposed transversely thereacross and centered on the transverse center of the body with this slideway 33 being of a shape in cross section to provide multiple, horizontal and vertical surfaces complementary to and which slidably seat on and engage with the slide surfaces 26a, 25b, 25a, 25c, and 27a, respectively, of the central, longitudinal slideway 26—25—27 of the knee K.

The opposite, longitudinal side "outrigged" or "flying" rails 28 and 29 of the wide knee K provide the widely laterally spaced slideways for mounting and slidably supporting thereon the opposite ends, respectively, of saddle S. In this instance, the opposite end portions of saddle body 30 which extend across the "outrigged" rails 28 and 29, are suitably treated and machined to close tolerances to form the transversely disposed bearing and slide surfaces 30a and 30b, which extend transversely across the under side of body 30 and are complementary to and in slidable engagement on and with the upper side slideway surfaces 28a and 29a, respectively of the rails 28 and 29. The inner vertical side edges of the depending opposite end flanges 31 and 32 of saddle body 30, are suitably machined to provide for clearance between the vertical edge surfaces 31a and 32a thereof which face the outer vertical longitudinal edge slide surfaces 28b and 29b, respectively of the opposite side "outrigged" rails 28 and 29. Such clearance may, for example, be of the order of one thirty-second of an inch ($\frac{1}{32}''$).

The opposite ends of the saddle S are constrained against vertical upward displacements from accurately seated position supported on the slideways, including the slideways provided by the outrigged rails 28 and 29, by rail forming bars 34 and 35 which are secured on and along the lower side edges of the flanges 31 and 32, respectively, and which extend horizontally and laterally inwardly under the "outrigged" rails 28 and 29, respectively of the knee K. The upper sides of the inwardly projected portions of rail forming bars 34 and 35 are suitably machined to close tolerances to provide the upper side, horizontal slide surfaces 34a and 35a, which have slidable bearing and saddle constraining engagement with the slide surfaces 28c and 29c, respectively, at the under sides of the rails 28 and 29, as clearly shown by Fig. 6 of the drawings.

A laterally movable gib 33a, referring to Fig. 9, is in this instance, mounted in the slideway 33 of saddle S in position forming the complementary surface of the slideway engaged by the vertical surface 25b of the narrow rib or guide rail 25 of the central slideway of the knee K. This gib 33a is longitudinally tapered from end to end thereof and has as its main function to provide for the adjustment of the fit between the vertical edge surface 25b of rail 25 and the adjacent inner vertical edge surface of the gib. The gib 33a also functions to clamp the saddle against movements on the knee K. Suitable actuating means including a rod 33b, operable from a hand lever 33c (see Fig. 1) mounted on the front of the saddle at the left hand end thereof, is provided for actuating and releasing this laterally movable, longitudinally tapered gib, to and from position clamping the saddle against movements.

The saddle body 30 is formed with the spaced, vertically disposed slideways 30e and 30f therein, extending longitudinally of the body from end to end thereof and opening through the upper surface and the opposite ends of the body. The forward slideway 30e is inclined downwardly and forwardly while the rear slideway 30f is inclined downwardly and rearwardly to form these slideways as in effect undercut and together providing with the body 30, a general dove-tail type of slideway for slidably mounting the work table T on the upper side of saddle S.

In this instance, a laterally movable gib 30g, referring to Fig. 7, is mounted in and forms the forward wall of slideway 30e. This gib 30g is longitudinally tapered from end to end thereof and is mounted to be laterally movable to and released from position clamping table T against movement on and relative to the saddle S. The primary purpose of tapered gib 30g is to provide for the adjustment of the fit between the adjacent and complementary surfaces of the gib and the slide 30m of the table T, as referred to hereinafter. The gib 30g is laterally movable by means of a horizontally disposed actuating shaft 30h extending forwardly through the saddle body to the forward side thereof where it mounts an operating hand lever 30i located at the forward side of the saddle S in position readily accessible to the operator.

The design and construction of the saddle body 30 embodies several important features of my invention, one of which is, referring to Figs. 11 and 14 of the drawings, the provision of the transverse rib or web members 53', 54', 82a and 82b. These ribs are formed or cast integral with the casting constituting the saddle body 30, and are in general parallel relation with the ribs 53' and 54' spaced apart and grouped as a pair at the left hand side and the ribs 82a and 82b spaced apart and grouped as a pair at the right hand side of saddle body 30. These ribs are formed as continuous integral structure and add substantially to the essential transverse stiffness of the saddle.

The construction of the saddle body 30 is such that the laterally spaced bearing surfaces 30a and 30b which slidably support saddle S on the surfaces 28a and 29a, respectively, of the "outrigged" rails 28 and 29 of the knee K, are formed as transversely extended through the medium of the rearward extensions 30R from the saddle body 30. Due to the wide or full width of knee K relative to column 10 and to the wide spacing laterally of the rails 28 and 29, it is possible to provide these extensions and space them a sufficient distance apart to clear the column 10 when the saddle S is in positions moved inwardly on knee K. In such inwardly moved positions, the extensions 30R are located at opposite sides of column 10 with ample clearance between the extensions and the column. The provision of such extended transverse bearings, widely spaced apart laterally, adds further to the inherent stability of the assembled structure.

In order to further increase stability of the saddle S in mounted assembled position, I have provided a forward extension 30F at the central, intermediate portion of saddle body 30 which permits of and provides for forward extension of the bearing surface of the central slideway 33, as will be clear by reference to Figs. 4, 9 and 11.

By another feature of the saddle construction of my invention, I have provided a design and arrangement which provides a continuous, uninterrupted work table bearing surface 30T throughout the longitudinal length of saddle S at the upper side thereof. This is made possible by a construction of the saddle body 30 which provides a cored opening 30B extending longitudinally through the body adjacent the rear side thereof and beneath the table bearing surfaces 30T, in which opening 30B, the coolant return tube 30C is provided. Such arrangement of the coolant return tube 30C in the opening 30B of saddle body 30, is clearly shown in Figs. 7 and 11.

*Saddle cross feed screw and nut*

The saddle S is moved "in" and "out" on the knee slideways for cross feeding of the work table T by an externally threaded, horizontally disposed cross feed screw C mounted in position extending longitudinally inwardly through the knee K below the top wall structure 23 thereof, and being threaded into and through an internally threaded cross feed screw nut NC which is carried by saddle S supported in fixed position therebelow and within knee K with the axis of the nut aligned with the axis of the cross feed screw C. In this instance, the cross feed screw C is located to the right of the narrow guide 25 and the longitudinal center of knee K and is mounted and journaled in position extending longitudinally rearwardly through the knee below the top wall structure 23 beneath the right hand opening O through such structure, by a forwardly extended smooth surfaced shaft forming portion 40 thereof, which extends forwardly through and is suitably mounted and journaled in the front plate structure 22 of the knee. The outer end length 40a of the shaft portion 40 of screw C is in this example formed of reduced external diameter and projects outwardly beyond the forward side of plate structure 22 where it mounts the hand wheel HC for manual rotation of the feed screw C. The mounting and journaling of the feed screw shaft portion 40—40a in the plate structure 22 will be referred to and described more in detail hereinafter.

The mounting and positioning of the cross feed screw nut NC on and supported in position depending from the saddle S provides advantageous features of my invention. Referring now to Figs. 8, 11, 14 and 15, there is provided cast integrally with the saddle body 30, a bracket 41 located at the underside of the body between the right hand slide rail forming flange 32 and the central slideway 33 in position depending downwardly therefrom through the opening O in the right hand side of knee top wall structure 23. This depending integral bracket 41 at the lower or underside thereof is provided with a wide slot or keyway 41a thereacross and disposed transversely thereof relative to the knee K, as shown particularly in Figs. 12 and 15. The cross feed screw nut NC is formed of a generally L-shaped casting providing the nut body proper 42 which forms one arm of the L, and a flat, wide plate portion 42a which forms the other arm of the L.

The nut NC is removably mounted and positioned on the depending bracket 41 with the nut body 42 vertically positioned at and against the inner, vertical side 41b of the bracket 41 and with the horizontally disposed plate portion 42a thereof seated and received in the transverse slot 41a at the underside of bracket 41 with a sliding fit, so that, plate 42a functions as a wide key of considerable length, locking and securing nut NC against displacement by the action of the thrust forces exerted thereon by the cross feed screw C. Cross feed nut NC is secured and attached in such mounted position on the saddle bracket 41 by a screw 42b which is extended horizontally and transversely through the lower end portion of the bracket and of nut body 42 from the outer side of the bracket and nut assembly. The nut body 42 provides the internally threaded bore 42c extending horizontally therethrough from front to rear thereof above the mounting screw 42b, in axial alignment with and for receiving in threaded engagement therethrough the externally threaded feed screw C.

It is to be here noted that the horizontal plate portion 42a provides a key having considerable length and width, so that, when this key is seated in the correspondingly wide and long keyway 41a of bracket 41, it will, due to its length, prevent any cocking action of the nut NC under a thrust load, and due to its width, will take the shearing action of the load. Thus, with key 42a taking such loads only one screw 42b is required in order to hold the nut against the face 41b. This screw 42b is in effect, unloaded, and performs the primary function of holding the nut in position so as to prevent it from dropping downward under gravity. By forming the feed screw nut mounting bracket 41 integral with the saddle body 30, the difficulties heretofore encountered with the fastening of a separate element to the saddle body proper due to the eccentric thrust thereon applied thereto by the feed screw C, are eliminated. Further, due to the removable mounting of the feed nut NC on the saddle bracket 41, it is possible by removing but the single fastening screw 42b, to drop feed nut NC from the bracket. Hence, it is unnecessary to remove the cross feed screw from the knee in order to remove the saddle from the knee.

With the foregoing design, construction and arrangement of the saddle S, nut NC and cross feed screw C, by rotating the cross feed screw in one direction the nut NC with bracket 41 is fed inwardly along the screw C to thereby slide the saddle S inwardly on the knee. Rotation of the cross feed screw C in the opposite direction will feed the nut NC and bracket 41 outwardly to cause outward cross feeding movement of saddle S on the knee K. During such "in" and "out" cross feeding movements of the saddle S, the depending, cross feed nut mounting bracket 41 moves longitudinally of the knee and finds operating clearance in the knee chip disposal opening O through which the bracket depends at the right hand side of the knee top wall structure 23.

The table and its mounting

The work table T, referring now to Figs. 1, 7 and 9, is, in this example, of generally rectangular form in plan and in cross section, as will be clear by reference to the transverse cross section therethrough of Fig. 7 and the longitudinal side elevation thereof of Fig. 9. Table T is slidably mounted and confined on and disposed transversely across the upper side of saddle S for longitudinal movements in either direction along a straight line path to the right and left of the machine for longitudinal feeding movements thereof independently of the saddle. Such mounting of table T is effected in this instance, by providing the spaced vertically disposed, outwardly divergent slides 30m and 30n depending from the lower side and being extended longitudinally from end to end of the table. Table T is mounted with the slides 30m and 30n slidably received and confined in the slideways 30e and 30f, respectively, in the saddle S. Thus, table T is slidably mounted and constrained by the slides 30m and 30n in the saddle slideways 30e and 30f to straight line movements in either direction transversely of the saddle and longitudinally of the machine, and for bodily movements in either direction transversely thereof "in" and "out" relative to the machine by cross feed movements of the saddle S.

Table T, referring to Fig. 9 is provided at the opposite ends thereof with the end plates 51 and 52, respectively. Plates 51 and 52 are bolted or otherwise secured to the respective opposite ends of the table in vertically disposed position depending a distance below the plane of the underside of the table and of the horizontal plane of the upper side of the saddle S, with the table in mounted position on the saddle (see Fig. 1). A longitudinal feed screw L is mounted and journaled at its opposite ends in bearings carried by the end plates 51 and 52, with this feed screw L extending longitudinally over and beneath table T between the end plates and transversely through the saddle S (see Figs. 9 and 14). The longitudinal feed screw L is mounted and supported from and extending between the end plates 51 and 52 in position with its axis in a horizontal plane disposed perpendicular to the axis of the cross feed screw C mounted therebelow in knee K, and in this instance, feed screw L is positioned with its axis spaced a distance forwardly of the longitudinal center of table T (see Fig. 11).

Referring now to Figs. 24 and 25, the left hand end 51a of screw L is of reduced external diameter having a smooth surface and is rotatably mounted and journaled in a combined radial and thrust roller bearing 51b mounted in the left hand end plate 51 of the table. The right hand end 52a of feed screw L is also of reduced diameter having a smooth external surface and is rotatably mounted and journaled in a radial bearing 52b, mounted and carried in the right hand end plate 52 of the table. In this instance, the feed screw L is externally screw threaded throughout its length between the opposite reduced diameter bearing end portions 51a and 52a.

The table T referring to Fig. 14, is translated longitudinally by rotation of the feed screw L in and through a feed screw nut assembly NL mounted in fixed position in the saddle S and through which nut assembly feed screw L extends with the external threading thereof in operative engagement with internal threading provided by the nut assembly. In this example, the nut assembly NL embodies an adjustable nut comprised of two nut sections 53 and 54, each being of tubular, sleeve form having an internally threaded axial bore therethrough for receiving in threaded engagement therewith the longitudinal feed screw L. These nut sections 53 and 54, are mounted in horizontally disposed position in axial alignment in and extending through the transverse ribs 53' and 54' of the saddle body 30, for receiving the longitudinal feed screw L, as will be clear by reference to Figs. 11 and 14. In this instance, the feed screw nut assembly NL is of an adjustable type in which one of the nut sections, say for example, the section 53, is rotatably mounted in the transverse rib 53', so that, it can be rotated on and relative to feed screw L in one direction or the other to cause the engaged threading of the screw and the threading of the nut section to move or displace the feed screw L axially relative to the nut section to thereby adjust or "take-up" the nut sections relative to the feed screw L to compensate for undesirable play between the engaged external threads of the screw and the internal threads of the nut sections. Selective rotation of the movable nut section 53 is effected through the medium of a longitudinally slidable horizontally disposed rod 53a mounted in and extending forwardly through saddle S from the front side thereof to a position below the inner end of the nut section 53. The inner end of nut section 53 is formed with teeth 53b therearound and the inner end of the adjusting rod 53a is formed with rack teeth 53c on the upper side thereof in operative mesh with the teeth 53b formed around the nut section. Thus, by selective movement of the rod 53a inwardly or outwardly, nut section 53 can be rotated in the required direction to adjust or take-up nut section 53 to compensate for play between the internal threading of the sections 53 and 54 and the external threading of feed screw L.

Referring to Fig. 13, the outer end of the adjusting rod 53a at the exterior of the forward side of the saddle S is provided with external threading on which a pair of nuts 53d are threaded. A cap 53e is removably secured on the forward side of saddle S over and receiving therewithin the outer end of the rod and the nuts 53d thereon. Adjustment of the movable nut section 53 is made by removing cap 53e and taking up the required amounts on the nuts 53d and then securing rod 53a in such adjusted position by jamming or locking the nuts 53d. The cap 53e is then replaced and secured in position receiving and locking the nuts against the saddle body 30 to prevent any endwise movement of rod 53a and resulting rotation from adjusted position of the movable nut section 53. In order to eliminate all backlash between the teeth 53c of rod 53a and the teeth 53b of nut section 53, the rod 53a is sprung downwardly when assembled into position in the saddle S.

In the example machine, the work table T may be hand fed by manually rotating the feed screw L in either direction through the medium of the hand wheel HL which is mounted on a reduced diameter outer and extension 51c (see Fig. 9) of the feed screw L. This hand wheel HL is mounted on the outer end extension 51c of the feed screw for rotation of the feed screw independently of the hand wheel but with clutching means being provided for positively engaging the hand wheel with the feed screw for manual feeding, as will be described hereinafter.

Power transmission to feeds

The knee K, the saddle S, and the work table T, may be selectively power fed from the motor M which is mounted on the knee as a component of the self-contained knee, saddle and table assembly.

The motor M which in this instance is located at the left hand side of the knee K when facing the machine, is mounted with the motor shaft m in horizontal position disposed transversely of knee K. Referring to Figs. 7, and 16, the motor shaft m or an extension thereof or coupled therewith, extends a distance into the knee K and is mounted and journaled at its inner end in an annular, anti-friction bearing assembly 55 mounted in a bearing and shaft carrier 55a formed integral with and extending rearwardly from the vertical transverse partition wall 24 of knee casting 20. The inner end of shaft m extends outwardly from bearing carrier 55a and mounts thereon a bevel pinion gear 56 which is splined to the shaft and which is located, in this example, with the vertical plane of its outer side approximately in the vertical plane of the longitudinal center of the knee K. A relatively large diameter bevel gear 57 is keyed on the rear outer end of a horizontal stub shaft 57a mounted in and extending through partition wall 24 and being journaled in an annular anti-friction bearing assembly 57b mounted in such wall. Bevel gear 57 is engaged by and in mesh with the pinion bevel gear 56 for driving gear 57 from the motor or power shaft m. At the front side of wall 24, the stub shaft 57a mounts and has fixed thereon for rotation therewith a relatively small diameter spur gear 58. In this manner, power is transmitted from motor m through bevel gears 56 and 57 and the shaft 57a to the spur gear 58 at the forward side of wall 24, which latter gear provides the power input gear to a change speed and rapid transverse gear organization indicated generally by the reference character FB. Such organization is formed to provide a self-contained, removable feed box or unit through which the power feeds to the knee K, saddle S and work table T may be selectively driven from motor M at different rates of speed and the work table T may be selectively traversed under the control of the operator.

Power is delivered by gear 58 into the feed unit FB and, referring now to Figs. 9, 10 and 16, is delivered from that unit by the vertically disposed gear 59 to power feed the knee, saddle or table at rates of speed of feed selectively determined under the control by the operator of the change speed and rapid traverse gear unit FB. The power output or delivery gear 59 of unit FB is, in this instance, located in the upper forward right hand side of the unit FB, with the toothed periphery of the gear accessible through the upper side of the unit, as will be clear by reference to Fig. 9. The construction, arrangement and functioning of the change speed and rapid traverse gear organization and of the selective controls therefor making up the unit FB, will be described and explained hereinafter in detail.

The power output gear 59 of the feed unit FB engages and is in driving mesh at the upper side thereof with the underside of a vertically disposed idler spur gear 59a. This idler gear 59a is, in this example, mounted and supported on structure at the rear or inner side of the removable front plate structure 22, with the idler gear in position above gear 59 for rotation about a horizontal axis parallel with the axis of the cross feed screw C thereabove. Thus, feed power is transmitted from motor M by shaft m to the bevel gears 56—57; the shaft 57a and gear 58 to and through the feed unit FB to power output gear 59 of that unit; and from gear 59 to idler gear 59a, from which latter gear feed power is selectively distributed to the knee, saddle and table feeds, respectively.

Power cross feed of the saddle

Either power or hand cross feed of the saddle S on knee K "in" and "out" relative to the machine, is effected through the medium of the single saddle cross feed screw C. As previously referred to, the cross feed screw C is mounted and journaled in and extending through the front plate structure 22 of the knee by the forwardly extended shaft forming sections 40 and 40a of the screw.

The removable front plate structure 22 of the knee includes a box-like frame or cage structure which extends rearwardly from the inner or rear side thereof and a distance into the forward portion of the interior of the hollow knee K when the plate structure 22 is in mounted position on the knee. Referring to Figs. 7 and 8, this rearwardly extended box-like structure at the inner side of front plate 22 includes a rearwardly horizontally disposed wall element or elements 22a, a vertically disposed rear wall element or elements 22b spaced a distance to the rear of plate 22 and extending upwardly from and across the rear side of element or elements 22a and transversely of knee K, and the opposite side, vertically disposed wall elements 22c extending between the opposite ends, respectively, of rear wall element 22b and the inner side of the front plate 22. Such box or cage-like structure formed by the elements 22a, 22b and 22c, is generally centrally located on and extending rearwardly from the inner side of plate 22, and may, if desired, be formed integral with front plate 22, but whether formed integral therewith or as a separate structure attached thereto, it provides a part of such front plate structure which is removable and replaceable therewith as a unit from and to mounted position on the knee K.

The shaft portion 40—40a of cross feed screw C extends forwardly through rear wall element 22b and front plate 22 with the shaft section 40 extending through a fixed sleeve member 40b secured in and extending forwardly from rear wall 22b, and with the forward reduced diameter shaft section 40a mounted and journaled in an annular, anti-friction bearing assembly 40c of the combined radial and thrust type which is secured in a suitable bearing carrier mounted on and in plate 22.

A spur gear 60 is rotatably mounted on an annular, roller bearing assembly 60a on shaft section 40 at the forward end thereof adjacent the inner side of the bearing assembly 40c mounted in plate 22, so that this spur gear 60 is freely rotatable on and independently of rotation of feed screw C and the shaft sections 40—40a thereof, as will be clear by reference to Fig. 8. This gear 60 is positioned above and is in constant mesh with the idler gear 59a therebelow and hence, gear 60 is continuously rotated in one direction by and from idler gear 59a during rotation of the latter gear from the power output gear 59 of the feed unit FB. A similar gear 61 is rotatably mounted on the sleeve 40b, which is mounted in vertical rear wall 22b and which receives and through which the shaft section 40 of feed screw C extends. This gear 61 is thus rotatable on sleeve 40b independently of but about feed screw shaft section 40 as an axis. As will be explained hereinbelow, gear 61 is driven from a gear of the power elevating feed for the knee, for continuous rotation during operation thereof on feed screw C in a direction opposite the direction of rotation of the forward gear 60. In this example, forward gear 60 is always rotated in one direction, namely, counterclockwise while the gear 61 is always rotated in the reverse direction, that is, clockwise when facing the front of the knee.

A clutch spool 62 is splined to the shaft section 40 of feed screw C between the gears 60 and 61 and is provided at opposite ends thereof with annular series of clutch teeth 62a and 62b, respectively, concentric with shaft section 40. The inner side of gear 60 is formed with an annular series of clutch teeth 60b therearound for clutching engagement with the adjacent clutch teeth 62a of clutch spool 62, and the inner side of gear 61 is formed with a similar annular series of clutch teeth 61a therearound for clutching engagement with the adjacent clutch teeth 62b of the clutch spool 62. Clutch spool 62 is slidable axially of shaft section 40 between a forward position with the teeth 62a thereof in clutching engagement with the teeth 60b of gear 60, so that clutch spool 62 and feed screw C are then power driven from gear 60 in a counterclockwise direction; to a position moved rearwardly on shaft section 40 with the clutch teeth 62b of the spool engaged with the clutch teeth 61a of gear 61, so that the clutch spool 62 and cross feed screw C are then power driven from gear 61 in the reverse or clockwise direction; and to a neutral position as shown in Fig. 8, intermediate the gears 60 and 61 with the clutch teeth of the spool 62 completely disengaged from the clutch teeth of both gears 60 and 61, so that, the clutch spool and the cross feed screw C to which it is splined, are then disengaged from the power feed and at rest.

*Power cross feed operator control*

A manually actuated operator control is provided for selectively actuating clutch spool 62 to either a position in clutching engagement with gear 60 to drive the cross feed screw C and cross feed saddle S outwardly on knee K in a counterclockwise direction away from column 10, or to a position in clutching engagement with gear 61 to power drive the feed screw C in the reverse or a clockwise direction and thereby cross feed saddle S inwardly on the knee, or to neutral position declutched from both gears 60 and 61 to thus disengage the feed screw C from the power drive. Such operator control in the example embodiment hereof, referring particularly to Figs. 8, 9 and 10, includes a horizontal rock shaft 63 mounted in position at the right hand side of knee K adjacent the front thereof, shaft 63 being journaled in a suitable bearing boss 63a cast integral with knee casting 20. The hand lever PC is secured on the outer end of shaft 63 in position upstanding therefrom for selective operation by the operator to rock shaft 63.

Shaft 63 is located in a general horizontal plane which passes below clutch spool 62, and in a vertical plane which traverses the clutch spool. The inner end of the shaft 63 terminates in a head 63b spaced outwardly from and at the right hand side of the clutch spool. The inner end of head 63b is formed with a radially disposed slot 63c thereacross, as will be clear by reference to Fig. 10. A shifter fork 64 is slidably mounted on a rod 64a disposed horizontally and parallel with the axis of clutch spool 62, with this work extending inwardly to and slidably engaged in a fork groove 62g formed around the clutch spool, so that, sliding of the fork inwardly or outwardly on rod 64a will move the clutch spool 62 into clutching engagement with gear 61 or with gear 60, respectively. A cross feed shifter bar 65 (see Figs. 7, 9 and 10) is mounted in horizontally disposed position extending transversely across the interior of the knee in position above feed unit FB. This bar 65 is provided with upwardly extended arms 65a and 65b at opposite ends thereof by which the bar is pivotally suspended for swinging about a horizontal axis, as will be clear by reference to Fig. 9 in particular. Arm 65a is at the left hand end of bar 65 when facing the machine, and provides a horizontally disposed boss 65c having a bore therethrough by which the left hand end of the bar is pivotally mounted on the frame work of front plate structure 22.

Arm 65b at the right hand end of bar 65, referring now to Fig. 10 in particular, is provided at its outer side with a forwardly extending pin 65d having a radially disposed extension thereacross providing a key 65e removably received and seated in groove 63c at the inner end of head 63b of shaft 63. Thus, key 65e and groove 63c form a "slip" joint of the self-releasing and self-coupling type, for coupling shaft 63 and arm 65b of shifter bar 65. The inner side of arm 65b is provided at the upper end thereof with an inwardly projected slide block 65f pivotally mounted thereon for rotation about a horizontal axis, and a vertically disposed groove 64b is provided at the outer side of the slide body of fork 64 for slidably receiving and seating therein the slide block 65f. Thus, movement of hand crank PC rearwardly will shift the clutch spool 62 rearwardly into clutching engagement with gear 61 for "in" cross feed of saddle S, while forward rocking of lever PC will shift clutch spool 62 to forward position in clutching engagement with gear 60 for "out" cross feed of the saddle. Rocking of lever PC from either forward or rear position to its intermediate position, will shift clutch spool 62 to neutral position disengaged from both gears 60 and 61.

Power feed of the knee

Either power or hand vertical feed upwardly and downwardly of the knee K is effected through the medium of the elevating feed screw E, referred to hereinbefore. The power feed of elevating feed screw E is accomplished, referring now to Figs. 7, 8 and 10, in particular, by a horizontal drive shaft formed of the axially aligned, releasably coupled, forward section 70 and rear section 71, extending longitudinally inwardly into the knee parallel with but spaced a distance from cross feed screw C at the inner or left hand side thereof. The shaft 70—71 is located with its horizontal axis in the same horizontal plane in which is located the horizontal axis of the cross feed screw C, with the forward section 70 thereof mounted and journaled in and extending through the front plate 22 and rear vertical wall element 22b of the plate structure, and the rear section 71 extending rearwardly through knee partition wall 24 to the forward side of the elevating feed screw E adjacent the upper end thereof. Rear section 71 is mounted and journaled in spaced, anti-friction bearing assemblies 71a and 71b mounted in the forward and rear ends, respectively, of a tubular bearing carrier 71c. Carrier 71c is mounted in a hollow boss structure 71d forming a horizontal, rearwardly extended portion of the partition wall, in this particular instance. The rear end of rear shaft section 71 mounts thereon in driving relation therewith, a bevel gear 72 which is engaged and in mesh with the bevel gear 16 keyed onto the upper end of the elevating feed screw E (see Fig. 7). Rear shaft section 71 extends forwardly a distance beyond front bearing 71a, such forwardly extended end of the shaft being suitably longitudinally splined.

The forward shaft section 70 is mounted and journaled at its forward end in an inwardly extended bearing sleeve 70a which is mounted in the front wall structure 22, and is mounted and journaled at its rear end in a forwardly extended bearing sleeve 70b, which is secured in mounted position in and extending through rear wall 22b of wall structure 22. (See Figs. 7 and 8.) The rear end of forward shaft section 70 extends rearwardly beyond wall 22b and the rear end of bearing sleeve 70b, such rearwardly extended end being suitably longitudinally splined. In this instance, the adjacent splined forward end of rear shaft 71 and rear end of forward shaft 70, are releasably coupled into driving, continuous shaft forming relation by the rearwardly extended coupling sleeve forming hub portion 73a of a spur gear 73. Sleeve forming hub 73a of gear 73 is internally splined and gear 73 and such hub 73a thereof are mounted in position splined on the rear end of shaft 70. The hub 73a extends rearwardly over and receives therein in splined driving relation therewith, the forward splined end of rear shaft section 71. There is thus provided a "slip" coupling of the self-releasing and self-coupling type for connecting the shaft sections 70 and 71 in driving relation as a continuous shaft for transmitting power to elevating feed screw E through the engaged bevel gears 16 and 72.

An integral bevel and spur gear unit 74 is mounted and journaled on and over the forward bearing sleeve 70a. The peripheral portion of gear unit 74 forms the spur gears 74a while the inner bevelled portion forms the bevel gear 74b. This gear unit 74 is mounted for free rotation on sleeve 70a about the shaft section 70 as an axis. Gear unit 74 is positioned with the spur gear 74a thereof in constant mesh with the gear 60 on shaft section 40 of cross feed screw C. An identical integral bevel and spur gear unit 75 is mounted on the rear bearing sleeve 70b in position thereon at the forward side of wall 22b with the peripheral portion thereof forming the spur gear 75a and the inner bevel portion forming the bevel gear 75b facing the bevel gear portion 74b of gear 74. Gear 75 is mounted on sleeve 70b for free rotation thereon about the shaft section 70 as an axis, and is so located that the spur gear portion 75a thereof is in constant engagement with the gear 61 on cross feed screw shaft section 40 adjacent thereto. The mounting and positioning of the bevel gears 74 and 75 is such that they are spaced apart at their inner sides to provide a space therebetween in which there is located a clutch spool 76 splined on shaft section 70 for movement axially thereon between the gears 74 and 75.

Referring to Figs. 7, 8 and 9, a reversing bevel gear 77 is mounted beneath the spaced bevel gears 74 and 75 and the clutch spool 76 therebetween, with the bevel gear 77 horizontally disposed for rotation about a vertical axis and being in constant engagement at diametrically opposite sides thereof with the bevel gear portions 74b and 75b, respectively, of gear units 74 and 75. The reversing bevel gear 77 may be suitably journaled and supported on horizontal wall structure 22a of the rearwardly projected cage forming frame of plate structure 22 (see Figs. 7 and 9). Gear 60 on cross feed screw shaft section 40 is power driven from the idler gear 59a, so that, gear unit 74 is power driven from gear 60 and in turn drives the reversing bevel gear 77 which thus drives the gear unit 75 in the reverse direction of rotation from that at which gear unit 74 is driven by gear 60. As gear unit 75 is in driving engagement with the gear 61 on cross feed shaft section 40, it follows that gear 61 is power driven in a direction of rotation the reverse of the direction of rotation at which gear 60 is driven by gear unit 74.

The clutch spool 76 which is splined on shaft section 70 between gear units 74 and 75, is provided with an annular series of clutch teeth 76a around the forward end thereof and with a similar annular series of clutch teeth 76b around the rear end thereof. The inner end of gear unit 74 provides an annular series of clutch teeth 74c therearound for engagement with clutch spool teeth 76a, while the forward end of gear unit 75 is provided with an annular series of gear teeth 75c therearound for clutching engagement with clutch teeth 76b at the rear end of clutch spool 76. Thus, the clutch spool 76 is slidable axially of shaft section 70 to a position moved forwardly thereon with the teeth 76a in clutching engagement with the teeth 74c of gear 74, so that the clutch spool 76 and shaft 70—71 are then power driven from gear 74 in a clockwise direction; to a position moved rearwardly on shaft section 70 with the clutch teeth 76b of the spool engaged with the clutch teeth 75c of gear unit 75, so that the clutch spool 76 and the shaft 70—71 are then power driven from the gear unit 75 in the reverse or counterclockwise direction; and to a neutral position as shown in Fig. 8, located intermediate the gears 74 and 75 with the clutch teeth of the clutch spool 76 completely disengaged from the clutch teeth of the gears 74 and 75, so that the clutch spool 76 and the shaft 70—71 to which the spool is splined, are then disengaged from the power feed and at rest.

When clutch spool 76 is in forward clutched engagement with and driven from gear 74, shaft 70—71 drives the bevel gears 16—72 to rotate the knee feed screw E in a direction to feed knee K upwardly. When clutch spool 76 is in rearward position in clutching engagement with gear unit 75, shaft 70—71 is rotated in a counterclockwise direction to drive bevel gears 16—72 to rotate feed screw E in a direction to feed knee K downwardly. Power feed of knee K upwardly or downwardly can be arrested and stopped at any desired vertically adjusted position of the knee by moving clutch spool 76 to neutral position.

*Power elevating feed operator control*

A manually actuated operator control is provided for selectively actuating clutch spool 76 to either a position in clutching engagement with gear unit 74 to rotate feed screw E in a direction to raise knee K, or to a position in clutching engagement with gear unit 75 to rotate the feed screw E in the reverse direction to thereby power feed knee K downwardly, or to neutral position declutched from both gears 74 and 75 to thus disengage the elevating feed screw E from the power drive with the knee K at rest.

In the machine of the present example, referring to Figs. 1, 8, 9 and 10, such operator control includes a horizontal rock shaft 78 located at the left hand side of knee K adjacent the front thereof when facing the knee. Shaft 78 is mounted and journaled in position disposed transversely of the knee in a suitable bearing forming boss or journal box 78d formed, in this instance, integral with the knee casting 20. The inner end of rock shaft 78 mounts thereon a radially disposed forwardly extended arm 78a which provides at its outer end an inwardly extended transversely slotted finger 78b in generally horizontally disposed position. (See Figs. 8, 9 and 10.)

The arm 78a, referring to Fig. 10 in particular, is provided at the inner lower side thereof below the axis of shaft 78 with an inwardly extended horizontally disposed crank pin 78c for operative association with the automatic power trip mechanism to be hereinafter described. A shaft 79 is mounted and journaled in horizontal position extending through the end wall element 22c of the box or cage forming frame of plate structure 22, with this shaft 79 in axial alignment with and spaced inwardly from rock shaft 78. A yoke or clevis-like member 79a is positioned with its opposite depending legs pivotally mounted on shaft 79, so that, this member 79a straddles or bridges wall element 22c, with operating clearance.

The outer leg of member 79a is provided with an outwardly projected arm 79b having at its outer end a tongue 79c which fits into and is received in the adjacent forked end of finger 78b of arm 78a on the shaft 78. There is thus formed a releasable "slip" coupling of the self-releasing and self-coupling type forming an operative connection between rock shaft 78 and the yoke member 79a for rocking the latter member by rocking of the shaft 78. Yoke member 79a at its inner side is provided with an inwardly extended projection forming a generally vertically disposed key 79d at the inner side thereof.

A shifter fork 64'; similar to the fork 64 for shifting clutch spool 62 of the cross feed power drive, is slidably mounted on a horizontal rod 79e disposed longitudinally of the knee and parallel with the shaft 70—71. Fork 64' extends inwardly to and is slidably received in a fork groove 76c formed around clutch spool 76 for shifting the clutch spool forwardly and rearwardly by forward and rear movements of shifter fork 64' on the rod 79e. At the outer side thereof, shifter fork 64' provides a vertically disposed slot 79f therein which receives the key 79d of rockable yoke member 79a. Thus, a releasable "slip" coupling of the self-releasing and self-coupling type is provided for operatively connecting yoke member 79a with the shifter fork 64', as will be clear by reference particularly to Fig. 10 of the drawings.

Rocking of hand lever PE will thus rock slotted finger 78b to correspondingly rock yoke member 79a on shaft 79 and thus cause key 79e engaged in shifter fork groove 79f to slide the shifter fork 64' on the rod 79e forwardly or rearwardly in accordance with the direction in which shaft 78 is rocked by lever PE. The arrangement is such that when hand lever PE is rocked upwardly, shifter fork 64' is moved inwardly to shift the clutch spool 76 into clutching engagement with gear unit 75 to cause rotation of elevating feed screw E in a direction to power feed the knee K upwardly, while downward rocking of hand lever PE will result in shifting clutch spool 76 forwardly to position in clutching engagement with gear unit 74 so that the clutch spool and shaft 70—71 are then driven in a direction to cause rotation of elevating feed screw E to power feed the knee downwardly. Rocking lever PE upwardly or downwardly the required distance will shift clutch spool 76 from either position engaged with gear unit 74 or with gear unit 75, to its intermediate, neutral position disengaged from both gear units.

Any suitable position stop or detent means may be provided for releasably holding lever PE in each of its three (3) positions of adjustment of the clutch spool 76. For example, as shown in Fig. 8, a spring loaded detent plunger 79g may be slidably mounted at the rear side of and in radially disposed position relative to rock shaft 78 for releasably engaging at its forward end in any one of a series of three (3) transverse grooves formed across the rear side of the hub of lever PE, only one of such transverse grooves 79h being shown in Fig. 8.

*Power longitudinal feed of the table*

The work table T is selectively power fed in either direction longitudinally or right and left of the machine, that is, along a straight line path transversely of and at right angles to the straight line path of cross feed of saddle S, by a power drive to the table feed screw L from the spur gear 60 which is mounted at the forward end of shaft section 40 of the cross feed screw C. The spur gear 60 with motor M operating, is continuously power driven about shaft section 40 as an axis in a counterclockwise direction, as referred to hereinbefore.

Referring now to Figs. 8, 10, 11, 12, 13, 14, and 15, a horizontally disposed drive shaft 80 is mounted and journaled extending longitudinally inwardly through knee K parallel with but spaced at the outer side of cross feed screw C. Drive shaft 80 is mounted in position with its axis located in the same horizontal plane in which are located the axes of cross feed screw C and the elevating feed screw drive shaft 70—71 (see Fig. 9). The shaft 80 extends forwardly over and above the right hand end wall element 22c of the rearwardly extended box-like frame of front plate structure 22, and is mounted and journaled at its forward end in an end bearing assembly 80a removably mounted in a bore or bearing receiving opening formed transversely through front plate 22. A removable plate 80b (see Fig. 8 in connection with Fig. 1) is releasably attached in position on the forward outer side of plate 22 for retaining and holding bearing assembly 80a and shaft 80 against outward displacement from mounted position.

A spur gear 81 is keyed on to the forward end of shaft 80 in position in continuous engagement with gear 60. Hence, with power on, gear 81 is continuously driven from gear 60 to continuously drive or rotate shaft 80 in a clockwise direction as will be clear by reference to Figs. 8, 9 and 10.

The drive shaft 80 extends rearwardly through a horizontal bore 43 extending through the integral, depending bracket 41 of saddle S, with operating clearance between the bracket and the shaft for movement of the bracket longitudinally of the shaft and for rotation of the shaft in the bore relative to the bracket. The rear section of the bore 43 which receives shaft 80, is formed of enlarged internal diameter to provide a chamber 43a within which there is mounted and secured a flanged bearing sleeve 43b having an axial bore therethrough of greater internal diameter than the external diameter of shaft 80 which extends rearwardly therethrough. The length of sleeve 43b within chamber 43a is less than the depth of the chamber, so that, there is provided a space within the chamber between the inner edge of sleeve 43a and the inner end of the chamber. Shaft 80 is provided with longitudinal splines 80s thereon extending therealong to the rear end of the shaft, and a bevel gear 44 having a rearwardly extended bearing sleeve forming hub 44a is mounted and journaled by such hub in the bearing sleeve 43b with the gear 44 rotatably mounted and located within the chamber 43a at the inner end thereof. Gear 44 and its hub 44a are splined on shaft 80 for rotation of the gear by the shaft. Gear 44 is movable with the depending, integral saddle bracket 41, axially in either direction along the splined section of shaft 80 while maintaining driving relation between shaft 80 and gear 44.

Referring now to Figs. 12 and 15, a vertical bore 45a is formed extending downwardly through depending bracket 41 with its axis located in a vertical plane spaced forwardly from the vertical plane passing through bevel gear 44 on shaft 80. Bore 45a extends upwardly and opens through the upper side of the horizontal bottom or base wall of saddle casting 30, and a bearing sleeve 45b is mounted extending downwardly through bore 45a. Sleeve 45b is of a length less than the depth of this bore, so as to provide a gear receiving space at the lower end of the bore. The rear side wall of depending bracket 41, referring now to Fig. 12, is provided with a horizontal opening 45c therethrough opposite the upper side of bevel gear 44 on shaft 80. A bevel gear 46 having an upwardly extended bearing sleeve forming hub 46a, is rotatably mounted in the lower end of bore 45a by the upwardly extended sleeve forming hub 46a which is journaled in the bearing sleeve 45b. A vertical shaft 47 is mounted in and extends downwardly through upwardly extended hub 46a of the bevel gear 46 and is splined in the gear hub for rotation of shaft 47 by rotation of gear 46. Bevel gear 46 at the rear side thereof extends through opening 45c into mesh with the adjacent upper side of bevel gear 44 on shaft 80. Shaft 47 extends a distance upwardly above the adjacent upper side of the lower wall of saddle casting 30 and mounts thereon a horizontally disposed bevel gear 48 which is splined thereto for rotation thereby.

The continuous transverse ribs 82a and 82b of the saddle body 30, referring now to Figs. 11 and 15, which are located extending across the saddle body spaced from opposite sides of the bevel gear 48, are provided with the horizontal, axially aligned bores 82c and 82d therethrough, respectively. These bores 82c and 82d are located in positions in the transverse ribs 82a and 82b with their aligned axes parallel with the axis of feed screw L and located in the vertical plane in which lies the vertical axis of the splined shaft 47.

A bearing sleeve 83a is retractably mounted in bore 82c of rib 82a by means of a set screw or the like 83d. In mounted position the bearing sleeve extends inwardly above the left hand side of bevel gear 48 and provides a reduced diameter portion upon which there is rotatably mounted and journaled an integral spur and bevel gear unit 83. Gear unit 83 comprises the spur gear 83b and the bevel gear 83c which latter gear is in constant mesh with the horizontal bevel gear 48 therebelow on the vertical drive shaft 47.

A bearing sleeve 84a is retractably mounted in and extending through the bore 82d of the transverse rib 82b, by means of a set screw or the like 84e. An integral spur and bevel gear unit 84 is rotatably mounted and journaled in the bearing sleeve 84a by means of an extended hub or stub shaft 84d integral with the unit with gear unit 84 being positioned at the inner side of rib 82b facing gear unit 83. Gear unit 84 comprises the spur gear 84b and the bevel gear 84c, which latter gear is in constant mesh with the horizontal bevel gear 48 therebelow on shaft 47. Bevel gear 84c of gear unit 84 is in mesh with bevel gear 48 at a point or location diametrically opposite the point of mesh of gear unit 83 with bevel gear 48. Gear unit 84 is formed with an axial, splined bore 84f which extends completely therethrough including the hub or stub shaft 84d, splined bore 84f being axially aligned with the axial bore through the bearing sleeve 83a.

Thus, the bevel gears 83c and 84c, of the gear units 83 and 84, respectively, are in constant mesh with bevel gear 48 on vertical shaft 47 at diametrically opposite sides of the gear 48, so that rotation of shaft 47 and gear 48 will cause rotation of the gear units 83 and 84 in opposite directions, respectively. As shaft 80 is continuously driven by gear 81 from gear 60, which latter gear is driven counter-clockwise, it follows that shaft 80 and the bevel gear 44 thereon will be driven clock-wise so that shaft 47 and bevel gear 48 will be driven clock-wise. With gear 48 continuously driven clockwise, gear unit 83 will be driven clockwise, while gear 84 will be driven counter-clockwise. The directions of rotation of the above identified elements are indicated by arrows in Fig. 11 of the drawings.

The arrangement of bevel gears 46 and 48 as two separate units with the spline shaft 47 connecting these gears as a third and separate unit, makes it possible to provide the transverse ribs 82a and 82b of saddle body 30 as continuous, integral structure across and transversely stiffening the saddle body. Referring to Fig. 15, when this gear and shaft arrangement is assembled, the bevel gear 48 is slipped sideways into mesh with the bevel gears 83 and 84 and then the spline shaft 47 is dropped into position rigidly connecting bevel gear 48 and its drive bevel gear 46. The bevel gear 83 may as in the example hereof have a retractable bearing sleeve 83a to assist in the assembly of the bevel gear train as hereinbefore described.

The continuous, transverse and integral stiffening ribs 53' and 54' of the saddle body 30 which are located on the saddle spaced to the left of ribs 82a and 82b may be provided, as in the example hereof, with clearance bores 53'' and 54'' therethrough (see Figs. 11 and 15) which bores are in axial alignment with each other and with the axes of the bores through the bearing sleeve 83a and the splined bore 84f of gear unit 84. If desired or found expedient, the work table T may mount and journal a suitable shaft (not shown) in position extending through and in splined, driven relation with the splined bore 84f of gear unit 84, through the smooth surfaced, aligned bore of the bearing sleeve 83a, and through the clearance bores 54'' and 53'' in the transverse ribs 53' and 54' of the saddle body. Such a shaft (not shown) thus is rotatably driven from gear unit 84 but is freely movable axially or longitudinally with the table and may provide a driving means for operating a suitable table mounted organization such as a dividing head or rotary table (not shown), as will be readily understood by those familiar with this art.

The table feed screw L which is located spaced forwardly relative to the countershaft 82 extends through axially aligned bores formed through the forward sections of the transverse ribs or webs 82a and 82b, as will be clear by reference to Figs. 11, 12 and 14. A spur gear 85 having an extended sleeve forming hub 85a is mounted on and over feed screw L by journaling the extended hub 85a in the bore through rib 82a with the gear 85 positioned adjacent the inner side of the rib. Gear 85 and its extended hub 85a are thus mounted and journaled in rib 82a for rotation therein on and independently of feed screw L with the feed screw extending through the gear and its hub for axial and rotational movements relative thereto and independently thereof, a spur gear 86 identical with gear 85, and having an extended sleeve forming hub 86a is mounted on and over feed screw L by journaling the extended hub 86a in the bore through rib 82b with the gear 86 positioned adjacent the inner side of rib 82b, opposite, spaced from and axially aligned with the gear 85. Gear 86 and its extended hub 86a are mounted and journaled for rotation in and independently of the feed screw L with the feed screw extending through the gear and its hub for axial and rotational movements relative thereto and independently thereof.

The spur gears 85 and 86 are positioned aligned and in constant engagement at their rear sides with the forward sides of the spur gears 83b and 84b, respectively, of the gear units 83 and 84 mounted on the countershaft 82. Thus, with power on, the continuously reversely rotated gear units 83 and 84 continuously reversely rotate the spur gears 85 and 86, respectively, mounted on the table longitudinal feed screw L for independent rotation about the feed screw as an axis. As gear unit 83 is continuously rotated in a clockwise direction, it follows that gear 85 is continuously rotated in an anti-clockwise direction, and as gear unit 84 is continuously rotated in a counterclockwise direction, gear 86 with which it is in driving engagement will be continuously rotated in a clockwise direction. Gears 85 and 86 are thus continuously rotated on the lead screw L in opposite directions of rotation, respectively. Gear 85 at the inner side thereof facing and spaced from gear 86, is formed with an annular series of clutch teeth 85b therearound concentric therewith. Gear 86 is formed with a similar annular series of clutch teeth 86b therearound concentric therewith and located on the inner side thereof facing and spaced from gear 85 and the gear teeth 85b (see Figs. 11, 12 and 15).

A clutch spool 87 is mounted on the table feed screw L in the space thereon between gears 85 and 86, as will be clear by reference to Figs. 11, 12, and 14. The feed screw L is provided with a longitudinal keyway 87a along one side thereof extending throughout the externally threaded length of the screw (see Figs. 12 and 14), and clutch spool 87 is provided with a key 87b slidably received in the keyway 87a, so that, the feed screw L is rotatable by rotation of clutch spool 87, while the feed screw is axially slidably movable in either direction through the clutch spool. The clutch spool is provided at one end thereof with clutch teeth 87c for clutching engagement with the adjacent clutch teeth 85b of gear 85 when the clutch spool is moved to the left on feed screw L, and at the opposite end is formed with clutch teeth 87d for clutching engagement with the adjacent clutch teeth 86b of gear 86 when the clutch spool is moved to the right on feed screw L.

With the clutch spool 87 in the position shown in Fig. 11, intermediate gears 85 and 86 and the opposite end clutch teeth of the clutch spool are disengaged from the adjacent clutch teeth of gears 85 and 86, respectively, the clutch spool 87 is in a neutral non-driving position with the feed screw L disengaged from the power feed and at rest. With clutch spool 87 shifted to the left and the teeth 87c thereof engaged with the teeth 85b of gear 85, the feed screw L is then power rotated counterclockwise in the direction of rotation of the gear 85. When clutch spool 87 is shifted to the right into position with the clutch teeth 87d thereof engaged with clutch teeth 86b of gear 86, the feed screw L is then power rotated by the gear 86 in the reverse direction, that is, clockwise.

*Power longitudinal feed operator control*

A shifter fork 88 is slidably mounted on a horizontally disposed slide rod 88a mounted in fixed position across the forward side of clutch spool 87, referring now to Figs. 11, 14, and 15, with the shifter fork extending rearwardly to and slidably engaged in a fork groove 87e formed around the spool. The shifter fork 88 is provided with a horizontally disposed forwardly extending arm 88b which terminates at its forward end extended into a vertically disposed casing 88c formed on the front of the right hand side of saddle S (see Figs. 1, 9, 11, and 12).

A vertically disposed stub shaft 89 is mounted and journaled in the casing 88c at the front of saddle S and mounts at the upper end thereof the forwardly extended, horizontal table power feed control lever PL. The lower end of stub shaft 89 mounts a crank member 89a having a crank block 89b, pivotally mounted on the under side thereof, eccentrically relative to the axis of shaft 89. The outer end of the arm 88b of shifter fork 88 is formed with a groove 88d therein for slidably receiving crank block 89b.

When hand lever PL is swung to the left by the operator, shifter fork 88 is moved on rod 88a to the left and thus shifts clutch spool 87 to the left into position with the teeth 87c thereof engaged with the teeth 85b of gear 85, so that, feed screw L is then rotated in a direction to feed work table T longitudinally to the left. When hand lever PL is swung to the right, arm 88b of shifter fork 88 is forced to the right to slide the shifter fork on rod 88a to shift clutch spool 87 to the right into position with the clutch teeth 87d thereof engaged with the clutch teeth 86b of gear 86, so that, the feed screw L is then rotated in a direction to feed the work table T on saddle S to the right. With hand lever PL swung to an intermediate position such as shown in Fig. 11 of the drawings, this clutch spool 87 is moved by shifter fork 88 to its neutral position disengaged from both the gear 85 and the gear 86.

A position stop or detent means is provided for releasably holding shaft 89 and control lever PL in each of its three (3) positions of adjustment in which clutch spool 87 is moved to the left in engagement with gear unit 85; position moved to the right in engagement with gear unit 86, or an intermediate position disengaged from both the gear unit 85 and the gear unit 86, respectively. Such means may as in the example hereof, be expressed by a plate 89c fixed on shaft 89 in position extending radially and rearwardly thereof. The outer or rear edge of plate 89c is provided with a series of three (3) positioning notches 89d and a spring loaded dog 89e is pivotally mounted in position with its outer free end slidably engaged against the outer or rear notched edge of plate 89c so that the dog snaps into the notches 89d in accordance with the position of adjustment of clutch spool 87, as will be clear by reference to Fig. 11.

*Power elevating feed trip mechanism*

Mechanism is provided for automatically tripping out power feed of the knee K upwardly or downwardly at predetermined points in the path of vertical travel of the knee. Such mechanism as in the example hereof, referring now to Figs. 8 and 10, in particular, may include a stub shaft 90 mounted and journaled in horizontal position transversely of the knee through the left hand side of the rear bridgehead 20n of the knee casting 20 as will be clear by reference to Fig. 8. The outer end of shaft 90 at the exterior of the knee mounts a hub member 90a which provides a rearwardly projecting trip lever or finger 90b disposed radially of the hub and a forwardly projecting hand operating lever 90c. The inner end of stub shaft 90 is operatively coupled to the rear end of a push-pull rod 91. This rod 91 extends forwardly through the knee and is suitably slidably mounted in and extending through the forward and rear mounting and bearing bosses 91a and 91b which may be formed as integral structure of the knee casting 20. Any suitable form of coupling 91c may be provided between the rear end of push-pull rod 91 and the inner end of the stub shaft 90, so that rocking of the shaft 90 by upward swinging of trip lever 90b will pull the push-pull rod 91 rearwardly while downward swinging of the lever 90b will push the push-pull rod forwardly.

Rod 91 extends forwardly to the crank pin 78c which projects inwardly from the arm 78a of the operator control mechanism for the elevating power feed. The forward end of rod 91 is provided with a vertical groove 91d therein (see Fig. 10) at the outer side thereof which groove slidably receives and confines therein, the crank pin 78c. Thus, forward movement of rod 91 will rock crank 78a forwardly and through the associated mechanism hereinbefore described will shift fork 64' forwardly to shift clutch spool 76 forwardly from position clutched with gear unit 75, to neutral position, while rearward movement of rod 91 will rock arm 78a rearwardly to cause shifter fork 64' to shift clutch spool 76 rearwardly from position clutched with gear unit 74, to neutral position.

A trip block rod indicated by the reference character 90d in Fig. 8 is mounted in vertically disposed position on and from the left hand side of column structure 10 and mounts thereon suitable vertically adjustable trip blocks 90e, only one of which is indicated, for engagement by trip lever 90d for rocking of that lever to trip out the power elevating feed. Preferably, hub 90a is formed as shown in Fig. 8, so that the hub can be drawn outwardly on shaft 90 by hand lever 90c to a position with trip lever 90b laterally outwardly displaced to clear the trip blocks on rod 90d. Suitable fixed limit stops (not shown) are provided at the upper and lower ends, respectively, of trip rod 90d for engagement by trip lever 90b when the latter is in outward, trip block clearing position, to trip out power feed upwardly or downwardly of the knee K, as will be readily understood by those familiar with this art.

It is to be noted that by the foregoing arrangement of automatic trip mechanism for the power feed of the knee K, the hand lever 90c becomes a "duplicate" functionally of the knee power feed control hand lever PE, and thus provides a duplicate rear control lever by which the operator can selectively control power feed of the knee in the same manner as such control is effected by the hand lever PE located at the front of the knee.

*Power cross feed trip mechanism*

A trip mechanism is also provided for automatically disconnecting the power from the cross feed screw C after the desired extent of travel "in" or "out" of the saddle S on the knee K by power drive of the cross feed screw.

In the example hereof, referring now to Figs. 8, 9 and 10, this trip mechanism includes a stub shaft 92 mounted on the left hand side of the knee in horizontal position extending transversely through and being suitably journaled in the left hand side of the forward bridge head 20m, as clearly shown by Fig. 8. Shaft 92 has secured at the inner end thereof, the forwardly extended, arm or crank member 92a having the generally horizontally disposed transverse groove 92b across the outer, forward end thereof (see Fig. 10). Crank member 92a has the forward grooved end thereof located adjacent the rear side of the mounting boss 65c of the cross feed shifter bar 65, and this boss 65c is provided with a rearwardly extended tongue 92c which extends into and is pivotally received by the groove 92b at the forward end of crank arm 92a. Thus, rocking of shaft 92 in either direction will swing crank member 92a upwardly or downwardly to correspondingly rock the cross feed shifter bar 65 forwardly or rearwardly. Rocking of bar 65 by crank arm 92a will rock arm 65b at the right hand end of the bar forwardly or rearwardly to actuate shifter fork 64 to shift clutch spool 62 to positions controlling the power feed of the cross feed screw C.

At the rear of the left hand side of the knee on the outer side of the bridgehead 20n of knee casting 20, an upstanding forked crank arm 93 (see Fig. 8) is pivotally mounted on a stub shaft or pivot pin 93a fixed in the knee casting. On the outer end of the stub shaft 92, there is fixed an upstanding forked crank arm 94, generally similar to the rearwardly mounted forked crank arm 93, and a trip actuated rod 95 is mounted in horizontally disposed position extending between and pivotally coupled at its opposite ends in the forked crank arms 92 and 93, respectively. Suitable trip blocks 95a are adjustably mounted on the trip rod 95 for adjustment axially of the rod to desired positions thereon.

Suitable trip means are provided on and depending from the left hand end of saddle S for engaging the forward trip block 95a after the desired extent of forward cross feed of the saddle and for engaging the rear trip block 95a after the desired extent of inward cross feed of saddle S has been effected by the power cross feed. Thus, engagement of the forward trip block 95a by outward movement of saddle S will move rod 95 forwardly and rock shaft 92 to swing crank arm 92a downwardly and thus rock arm 65b rearwardly to shift clutch spool 62 rearwardly to neutral position disengaged from gear 60 to thus arrest outward cross feeding of saddle S. Engagement by a trip on saddle S of the rear trip block 95a will cause rearward swinging or rocking of shaft 92 with upward swinging of crank arm 92a to thus cause shifting of the clutch spool 62 forwardly to neutral position disengaged from gear 61 to thus arrest forward cross feeding of saddle S.

Referring to Figs. 4 and 8, a gib 96, which is longitudinally tapered from end to end thereof, is mounted in vertically disposed position to form one bearing surface of the vertical slideway 30s in the rear wall of knee K. This gib is mounted for lateral displacement to adjusted positions relative to the adjacent surface of the narrow guide rail or slide 10s of column 10, to enable adjustment of the fit between these surfaces to maintain the very minimum clearance, and so that, the bearing may be taken up in the event of wear. Gib 96 is also laterally displaceable inwardly to position clamped against the adjacent slide surface of the narrow guide 10s in order to clamp knee K in a vertically adjusted position. In this instance, gib 96 is displaced laterally inwardly to an adjusted or to a clamping position, by a rod 96a which is actuated by a shaft 96b mounted in a horizontal position disposed longitudinally of knee K at the left hand side thereof. This shaft 96b is rocked or rotated in either direction by a depending link 96c which is pivotally coupled to the outer end of a crank arm 96d which extends radially outwardly from and which is fixed on a horizontal shaft 97 suitably mounted and journaled at the exterior of the left hand side of knee K, shaft 97 being mounted in position above but parallel with the shaft 96b. At its forward end, shaft 97 mounts a hand lever 98 which extends radially therefrom in position disposed generally outwardly and downwardly at the exterior of the left hand side of the knee in position readily accessible to an operator for rocking shaft 97 to clamp and release gib 96.

*Removable feed unit*

An important feature of my invention resides in the design, construction and arrangement of the change speed gear organization and speed selection mechanism therefor of the power feeds and of the rapid traverse gear and clutch organization, to provide a self-contained unit capable of bench assembly, that is, assembly as a separate unit, which can be readily assembled or mounted in and readily removed from position in the knee in operative association with and as a component of the power feeds for the knee, table and saddle.

Such a unit embodying the principles and features of my invention is disclosed herein and has been referred to hereinbefore as the "feed unit FB." Purely for convenience and brevity of expression, such removable unit will be in some instances referred to hereinafter as the "feed unit." When the unit is designated by this term, it is to be understood that the term includes all of those elements and parts of the change speed gear organization and speed selection mechanism therefor, the rapid traverse gear and clutch organization and the control therefor, which form a part of and are assembled and removable and replaceable with the unit as a self-contained entity.

The feed unit FB of the present example, referring now to Figs. 7, 16, 17 and 18, embodies a generally rectangular box-like frame 99 comprising the opposite, spaced side vertical walls 99b and 99a and the opposite, spaced vertical front and rear walls 99c and 99d joining the side walls 99a and 99b. As shown in Figs. 16 and 17 in particular, the opposite side walls 99a and 99b are provided with the mounting and supporting sleeves or hangers 99e and 99f, respectively, by which the unit is removably mounted and supported in position in the knee K. Each of these sleeves 99e and 99f is formed or provided on the frame 99 in position projecting upwardly and outwardly from its respective side wall of the frame, with the sleeves parallel and provided with longitudinal bores therethrough for receiving spaced mounting pins located within the knee. In this particular form of frame 99 and the mounting sleeves 99e and 99f, the sleeves are located at their forward ends at the front or forward wall 99c but terminate at their rear ends spaced forwardly a distance from the rear wall 99d of the frame.

The knee K is provided with the spaced, parallel and horizontal mounting pins or rods 100 and 101 which are removably mounted at their inner ends with a push fit in sockets provided by inwardly extending, horizontal bores formed in bosses 100a and 101a (see Fig. 2) extended forwardly from partition wall or web 24 along the adjacent side wall structures 20a and 20b, respectively, of the knee casting 20. In this instance, these bosses are formed as integral portions of the knee casting 20. The mounting pins 100 and 101 extend forwardly through the knee K to the front plate 22 with their forward ends preferably removably seated and received in recesses at the inner side of such plate, as will be clear by reference to Figs. 7 and 23. As shown in Fig. 16, the mounting pins 100 and 101 have the forward lengths thereof of reduced external diameter to provide the seating shoulders 100b and 101b therearound, respectively, spaced a distance forwardly from wall 24.

The feed unit FB is removably mounted in position on the mounting rods 100 and 101 when the front plate structure 22 of the knee is removed, by inserting the unit through the front opening 21 of the knee with the mounting rods 100 and 101 received in the rear ends of the bores of the mounting sleeves 99e and 99f, respectively, and then sliding the unit rearwardly on the rods until the rear ends of sleeves 99e and 99f abut and are seated against the shoulders 100b and 101b which thus form positioning stops for the unit, so that, the operator is required to make no positioning adjustments of any kind whatsover. The front plate structure 22 may then be mounted in its position on the front of the knee K. All that is necessary to remove the unit FB from mounted position in the knee is first to remove the front plate structure 22 and then merely slide unit FB outwardly on the mounting rods 100 and 101 until the unit has cleared the rods and can be lifted out through the knee front opening. As will be hereinafter explained, all operative couplings between mechanism of the unit FB with associated mechanisms in the knee are of the self-coupling and self-uncoupling types, so that it is unnecessary for the operator to connect or disconnect any mechanisms in mounting or removing unit FB in and from the knee K.

The feed unit FB mounts as a self-contained component thereof, the change speed gear trains by which feed power is delivered from the gear 58 through the unit to the power output or take-off gear 59 from which the knee, saddle and table feeds are driven at selected rates of feed. The unit FB also mounts and contains as a self-contained component thereof, the rapid traverse gear trains and clutches by which the work table T may, under the selective control of the operator, be rapidly traversed from the position at the end of a feeding movement of the table to position for starting the next feeding movement thereof.

In this instance, referring to Figs. 7, 10, 16, and 18, power from the driving gear 58 is delivered into the unit FB at two (2) separate input points, namely, the driving shaft 102 and the driving shaft 103. Shaft 102 provides the primary or driving shaft for the change speed gear organization for the power feeds. In this instance, shaft 102 is mounted in horizontal position extending across and between the front and rear walls 99c and 99d of frame 99 at the upper left hand side thereof when facing the front of the unit, with the forward end of the shaft journaled in a suitable bearing (not shown) in front wall 99c. Shaft 102 extends rearwardly through rear wall 99d and is journaled in a suitable bearing (not shown) mounted in the rear wall.

A relatively large diameter driving gear 104 having a rearwardly extended, internally splined hub 104a is mounted and journaled by such hub 104a in an anti-friction bearing assembly 104b mounted in a horizontal bore through the transverse wall or partition structure 24 of the knee casting 20. Gear 104 is thus mounted in vertical position for rotation about a horizontal axis which is aligned with the horizontal axis of shaft 102. The rearwardly extended end 102a of shaft 102 is splined and extends inwardly through the gear 104 and hub 104a thereof, so that, gear 104 is splined to the shaft 102 for rotating such shaft while being itself journaled and supported by the hub 104a in the wall 24 (see Fig. 16). The gear 104 is in constant mesh with the gear 58 which is located at one side thereof. Hence power drive of the shaft m causes rotation of the gear 104 and the change speed gear primary or driving shaft 102 is driven thereby.

The shaft 103 provides the driving shaft for the rapid traverse gear train of the unit FB, and is mounted in horizontal position extending across and between the front and rear walls 99c and 99d of frame 99. The forward end of shaft 103 is mounted and journaled in a suitable bearing (not shown) in the front wall 99c, and the rear end of the shaft extends through rear wall 99d and mounts on the extended rear end thereof, the gear 105 which is positioned in constant mesh with the driving gear 58 at the side of gear 58 opposite the side thereof engaged by gear 104 of shaft 102. Thus, during power drive of gear 58 from shaft m, gear 105 and rapid traverse drive shaft 103 are continuously rotated thereby.

*Change speed gear organization of the feed unit*

The change speed gear organization of unit FB for power feeding knee K, saddle S and work table T at selected rates of speed, is, in this particular example, designed to provide a series of sixteen (16) different feed speed steps, any one of which may be selectively set up by the operator through the medium of the feed selector mechanism to be hereinafter described, which mechanism also forms a component of the removable feed unit FB. This sixteen (16) feed step change speed gear organization is driven from the primary or driving shaft 102.

The shaft 102 is longitudinally splined and mounts thereon in splined driven relation therewith for selective sliding axially thereof, the gear cluster 107 on the forward length of the shaft and the gear cluster 108 positioned on the rear length of the shaft between cluster 107 and the rear wall 99d of frame 99. The forward gear cluster 107 comprises the spur gear 107A and the spur gear 107B, gear 107B being of smaller diameter than gear 107A. A shifter fork groove 107C is formed around cluster 107 at the outer side of gear 107B. The gear cluster 108 comprises the rearwardly located spur gear 108A and the forwardly located spur gear 108B together with a shifter fork receiving groove 108C therearound adjacent the inner side of gear 108B. Gear 108A is of smaller diameter than gear 108B.

A shaft 109 is mounted in horizontal position spaced to the right of and parallel with shaft 102, extending across and between front and rear walls 99c and 99d of frame 99 with its opposite ends mounted and suitably journaled in such walls, respectively. This shaft 109 is provided at its forward end within frame 99 with a pinion gear 110 which may, as in the example hereof, be formed integral with the shaft. Shaft 109 is longitudinally splined from adjacent the inner side of pinion gear 110 to the rear end thereof and mounts thereon in splined, driving relation therewith, a spur gear 111 having an inwardly extended hub 111a; a gear couplet 112 comprised of a forward spur gear 112A, and a rear spur gear 112B having a rearwardly extended hub 112h, gear 112A being of smaller diameter than gear 112B, a spur gear 114 of greater diameter than gear 112B, is splined on shaft 109 at the inner end thereof between the inner end of hub 112h of gear couplet 112 and the rear wall 99d of frame 99. The gear 111, gear couplet 112 and gear 114 are splined on shaft 109 and mounted and secured in position thereon against movement axially on the shaft relative to each other. Shaft 109 is driven from shaft 102 through selective engagement of gears on the respective shafts.

A shaft 115, referring now to Figs. 10, 16 and 17, is mounted in horizontal position in frame 99 below shafts 102 and 109 but with its axis lying in a vertical plane intermediate the latter shafts, as will be clear by reference to Fig. 17.

Shaft 115 is parallel with shafts 102 and 109 and extends across and between the front and rear frame walls 99c and 99d with its opposite ends mounted and rotatably journaled in such walls, respectively. This shaft 115 has the forward section thereof splined and a gear cluster 116 is mounted thereon in splined, driving relation therewith but slidable thereon for shifting axially thereof. Gear cluster 116 comprises the inner spur gear 116A and the outer spur gear 116B integral and movable with the cluster as a unit, gear 116A being of smaller diameter than gear 116B. At the inner side of gear 116A the gear cluster 116 is provided with a shifter groove 116C therearound. Shaft 115 is provided at the inner end thereof adjacent the inner side of rear wall 99d with a pinion 117, which in this instance is formed integral with the shaft and is provided at the forward end thereof around shaft 115, with an annular series of clutch teeth 117t.

A range gear 118 of the spur type is mounted on shaft 115 adjacent the forward end of pinion 117 and is freely rotatable on and slidable axially of the shaft 115. Gear 118 provides an inwardly extended hub portion having a shifter fork groove 118A therearound. The extended hub portion of gear 118 is provided at the inner end thereof around shaft 115 with an annular series of clutch teeth 118t for clutching engagement with the clutch teeth 117t of pinion 117 to drive gear 118 from shaft 115 by the pinion 117.

A back gear shaft 119, referring now to Figs. 10 and 17, is mounted and journaled in horizontal position in and extending forwardly from rear wall 99d of frame 99 in position below primary driving shaft 102. Shaft 119 is located in position at the left hand side of shaft 109 and above the horizontal plane of shaft 115. A spur gear 120 is mounted on shaft 119 at the inner end thereof adjacent the forward or inner side of rear wall 99d, with gear 120 being in constant mesh with the pinion 117 on the shaft 115. At the forward end thereof, the back gear shaft 119 is provided with a pinion 121 for selective engagement and disengagement with the shiftable range gear 118 on shaft 115.

Thus, when range gear 118 is shifted rearwardly into clutched engagement with pinion 117 and thereby disengaged from back gear pinion 121 of shaft 115, range gear 118 is then driven from shaft 115, while gear 120 and pinion 121 are driven as idlers from the pinion 117. But, when range gear 118 is shifted forwardly on shaft 115 into declutched relation with pinion 117 and into mesh with pinion 121 on the back gear shaft, then range gear 118 is driven from the back gear shaft on and independently of shaft 115. Range gear 118 is in high range position when it is clutched with and driven from pinion 117 of shaft 115, and is in low range position when declutched from pinion 117 and driven from the back gear shaft pinion 121.

A shaft 122 is mounted in horizontal position below shaft 109 and to the right of that shaft and of the lower shaft 115, as will be clear by reference to Fig. 17. This shaft 122 is parallel with shafts 115 and 109 and is mounted and suitably journaled at its opposite ends in the front and rear walls 99c and 99d of the frame 99 of unit FB. On the inner end of shaft 122 there is mounted a drum gear 123. This drum gear 123 is mounted on shaft 122, preferably by suitable roller bearings, for rotation of the drum gear on and independently of the shaft, and is positioned opposite and in constant mesh with range gear 118. Range gear 118 is slidable axially of the drum gear 123 while maintaining constant mesh therewith as the range gear is shifted to and between its high range and low range positions.

A clutch unit 124 is splined or keyed on shaft 122 in position between the inner side of rear wall 99d and the inner end of the hub of drum gear 123. Clutch unit 124 is formed at the forward side thereof around shaft 122 with an annular series of clutch teeth 124t, and the rear end of drum gear 123 is formed with an annular series of clutch teeth 123t therearound for clutching engagement with the teeth 124t of clutch unit 124, in order to drive shaft 122 from rotation of drum gear 123 by the range gear 118. Spaced a distance forwardly along shaft 122 from drum gear 123 there is provided an annular shoulder 122a around the shaft and a heavy compression spring 125 is mounted around shaft 122 between shoulder 122a thereof and the forward end of drum gear 123. This compression spring 125 normally maintains the clutch teeth 123t of drum gear 123 in clutching engagement with the clutch teeth 124t of clutch unit 124, so that the drum gear is in driving relation with shaft 122. The clutch teeth 123t and 124t are of the angular type, having an included angle of about eighty degrees (80°), so that under severe torque conditions, the drum gear 123 will slide axially forwardly of shaft 122 and disengage the gear from clutch unit 124 and from driving relation with the shaft 122.

A spur gear 126 is splined on the forward end of a sleeve 126a which is mounted for free rotation on and independently of shaft 122. Sleeve 126a extends on shaft 122 between the forward side of shoulder 122a and the front wall 99c of frame 99. A shifter spool 127 is splined on sleeve 126a between gear 126 and shoulder 122a of shaft 122. The inner side of shifter spool 127 is provided with an annular series of clutch teeth 127t thereon around shaft 122 and the forward side of shoulder 122a is formed or is provided with an annular series of clutch teeth 122t therearound for clutching engagement by the teeth 127t of shifter spool 127 when the latter is shifted rearwardly to position engaging the clutch teeth 127t thereof with the clutch teeth 122t on shoulder 122a of shaft 122. The shifter spool 127 is formed with a shifter fork receiving groove 127a therearound.

The spur gear 59 which is the power take-off gear from the feed unit FB is mounted on the forward end of the rapid traverse driving shaft 103 for free rotation on and independently of that shaft and for clutching engagement with shaft 103 through a clutch unit. Gear 59 is in constant mesh with gear 126 on shaft 122 and is driven by gear 126 for free rotation on and independently of rapid traverse shaft 103 when gear 59 is declutched from driven relation with shaft 103.

*Rapid traverse organization of the feed unit*

Gear 59 in this example mounts or forms a part of the forward clutch section 128f of a clutch unit 128 which is associated with shaft 103, as will be clear by reference to Fig. 16. Thus, clutch section 128f is rotatable as a unit with gear 59 on and independently of rapid traverse shaft 103. The rear clutch section 128r of clutch unit 128 is mounted on shaft 103 for rotation therewith, and includes a clutch shifting spool 129 at the inner end of the unit for sliding movement axially of shaft 103 to forwardly moved position engaging clutch sections 128f and 128 thereof to thus connect gear 59 in driven relation with shaft 103, and to rearwardly moved position declutching such sections to disengage gear 59 from driving relation with shaft 103. Clutch shifter spool 129 includes a shifter fork groove 129a therearound for slidably receiving a shifter fork.

For rapid traverse of the work table T from the power driven rapid traverse shaft 103 and the power take-off gear on that shaft, clutch shifter spool 129 is moved forwardly to engage the clutch 128 and connect gear 59 into driven relation with shaft 103; and gear 59 is disconnected from driven relation with shaft 122 of the feed change speed gear organization by actuation of the clutch shifter spool 127 to disengage the clutch teeth 127t thereof from the clutch teeth 122t of shaft 122. Thus, gear 59 is then directly driven at rapid traverse rates of speed by shaft 103 from gear 105, while gear 126 which is in constant mesh with gear 59 is driven as an idler on shaft 122, with the remainder of the change speed gear trains being then inactive or driven in idling relation to the gears 126 and 59.

The shifting of rapid traverse clutch unit 128 to declutched position for rapid traverse and the shifting of the clutch spool 127 on shaft 122 to declutched position, and the reverse shifting of clutch unit 128 to declutched position and of clutch spool 127 to clutched position, as effected through the medium of a shifter fork unit 130. Referring now to Figs. 10, 17 and 18, shifter fork unit 130 is slidably mounted on a horizontal rod 131 mounted in frame 99 at the left hand side of shaft 122 and below the rapid traverse shaft 103. Shifter fork unit 130 includes a shifter fork 130T which extends upwardly therefrom and is slidably received in fork groove 129a of rapid traverse clutch shifter spool 129, and a shifter fork 130F spaced forwardly from fork 130T and extending inwardly and horizontally therefrom into the shifter fork groove 127a of shifter spool 127. When shifter fork unit 130 is moved forwardly, fork 130T thereof shifts shifter spool 129 of rapid traverse clutch 128 to clutched position and the fork 130F thereof shifts clutch spool 127 forwardly to declutch gear 126 from the shaft 122. On rearward movement of shifter fork 130 from the foregoing position, the rapid traverse clutch 128 is declutched and the clutch spool 127 is actuated to clutch gear 126 into driven relation with shaft 122.

The design and relationship of the shifter forks 130F and 130T to each other and to the clutch spool 129 of rapid traverse clutch unit 128 and to the clutch spool 127 for gear 126 on shaft 122 is such that the gear 126 is declutched from shaft 122 just in advance of the engagement of rapid traverse clutch 128. An on the reverse operation, that is the operation of disengaging rapid traverse clutch 128, the operation of clutch spool 127 is delayed so that the gear 126 is not clutched with shaft 122 until the clutch 128 is completely disengaged.

Rapid traverse operator control

The rapid traverse clutch 128 is selectively shifted to clutched and to declutched positions by an actuating mechanism controlled from a hand lever PT located on knee K at the right hand side thereof. A portion of such actuating mechanism is mounted on and forms a part of the self-contained, removable feed unit FB. Referring now to Fig. 10 in particular, at the inner end of shifter fork unit 130 there is provided a radially outwardly projecting fork member 130a in which there is slidably received and engaged a crank pin 130b extended inwardly from a crank plate 130c which is pivotally mounted in vertically disposed position for rocking about a horizontal axis on a pivot pin or stub shaft 130d mounted in the right hand side wall 99b of frame 99. In this instance, crank plate 130c is positioned at the outer side of wall 99b and the crank pin 130b extends inwardly through an opening in that wall into engagement with fork member 130a. Crank plate 130c at the rear side of pivot pin 130d is provided with a horizontal groove 130e therein disposed radially relative to pivot pin 130d. It will be apparent that rocking of plate 130c upwardly will swing crank pin 130b rearwardly and thus slide shifter fork 130 rearwardly to declutch clutch unit 128; while downward swinging of plate 130c will slide fork unit 130 forwardly to engage rapid traverse clutch 128.

The rapid traverse clutch 128 is selectively controlled by the operator from the hand lever PT which is mounted in generally horizontally disposed position along the right hand side of knee K extending forwardly from a stub shaft 132 mounted and journaled in horizontal position extending transversely through the side wall structure 20b of the knee. The inner end of shaft 132 mounts a depending crank arm 132a located within the knee and the lower end of this crank arm is pivotally connected by a forwardly extending link 132b with the lower end of the depending arm of a bell crank member 132c. This bell crank member is pivotally mounted by a horizontal stub shaft 132d which is journaled in the adjacent side wall structure of knee casting 20 in position opposite the outer side of crank plate 130c mounted on the feed unit side wall 99b. The horizontally disposed, rearwardly extended arm of bell crank member 132c is provided with an inwardly projected key 132e which is slidably received in the groove 130e of crank plate 130c to operatively connect that portion of the rapid traverse clutch mechanism which is mounted on the knee K with the portion thereof which is mounted on feed unit FB. There is thus provided a releasable coupling of the self-coupling and self-uncoupling type between crank plate 130c of the feed unit FB and the bell crank member 132c on the knee K.

The arrangement of the rapid traverse clutch actuating mechanism is such that upward swinging of hand lever PT by the operator will operate clutch 128 to clutched position for rapid traverse operation of work table T while downward swinging of lever PT will operate the clutch unit to declutched position to stop rapid traverse and throw in the normal feed. In the example machine, the clutch unit 128 and the above described mechanism therefor is primarily gravity loaded, so that, it is necessary for the operator to hold lever PT in raised clutch engagement position during rapid traverse. The clutch 128 and its actuating mechanism are so designed and arranged that the clutch will release instantly when the operator releases lever PT.

The sixteen (16) speed steps of the feed unit

In the feed unit FB of the present example, the feed change speed gear trains as hereinabove described, provide for sixteen (16) different rates of speed at which the knee, saddle and table may be selectively fed, that is, sixteen (16) different rates of speed at which the power take-off gear 59 may be driven from the feed power input gear 104.

With the range gear 118 in its low range position in mesh with pinion 121 on the back gear shaft 119 and declutched from pinion 117, so that the range gear is driven through the back gear shaft and in turn drives the drum gear 123 on shaft 122, the change speed gearing is then set to provide for eight (8) speed steps which may be selectively set up from the feed selection mechanism to be hereinafter described.

In the low range position of gear 118, the lowest speed step is obtained by shifting gear cluster 108 on shaft 102 to engage gear 108a thereof with gear 114 on shaft 109, and to disengage gear 108b thereof from gear 112b on shaft 109 while gear cluster 107 is shifted into inactive position with its gears 107a and 107b disengaged from gears 112a and 111, respectively.

In the above lowest speed step setting in the low range, gear cluster 116 is shifted forwardly on shaft 115 to engage gear 116b thereof with the pinion 110 on shaft 109. Hence, shaft 115 is then driven from shaft 109, and drives drum gear 123 and shaft 122 through the back gearing by way of pinion 121, gear 120, pinion 117, range gear 118 and drum gear 123. Drum gear 123 so driven, drives gear 126 which in turn drives at the lowest rate of speed the power take-off gear 59 at the lowest rate of speed.

The next highest speed step is provided by shifting gear cluster 108 to engage gear 108b thereof with gear 112b of gear cluster 112 on shaft 109. Such shift will disengage gears 108a and 108b.

For the next highest speed step, gear cluster 108 is shifted to position disengaging both of its gears 108a and 108b with the cluster in inactive position, and then shifting gear cluster 107 to engage gear 107b thereof with gear 111 on shaft 109.

The next highest speed step is effected with gear cluster 108 still in inactive position, and gear cluster 107 shifted to disengage gear 107b and engage gear 107a thereof with gear 112a of gear cluster 112.

For the next four (4) successively higher speed steps in the low speed range, gear cluster 116 is shifted to engage gear 116a thereof with gear 111 on shaft 109, thus disengaging gear 116b from the pinion gear 110 on shaft 109, after which shift the gear clusters on shafts 102 and 109 are shifted progressively for step by step feed increases through the steps set forth above for the first four (4) successively increasing speed steps, respectively, of the low speed range.

The next eight (8) progressively increasing speed steps are obtained by shifting the range gear 118 on shaft 115 rearwardly to engage the clutch teeth 118t thereof with the clutch teeth 117t on pinion 117, so that the drum gear 123 on shaft 122 is then driven directly from shaft 115 through pinion 117 and range gear 118. In such high range position, the range gear 118 is disengaged from pinion 121 on the back gear shaft 119, so that the shaft 119 with the gear 120 and the pinion 121 thereon idling.

After shifting range gear 118 to high range position, the gear clusters on shafts 102, 109 and 115 are then selectively shifted progressively through the positions for the progressive speed steps above described for the low speed range. The sixteen (16) rates of speed at which the power take-off gear 59 of unit FB may be driven, are translated by the feeds driven thereby into feeding movements of the work table T in terms of inches per minute. In the present example, the sixteen (16) feeding rates at which work table T may be selectively fed through the unit FB are in inches per minute, as follows: ¾; 1; 1⁵⁄₁₆; 1¾; 2⅜; 3¼; 4¼; 6; 7½; 10¼; 13½; 17¾; 24½; 34; 42¾, and 60.

*Feed selection mechanism*

In accordance with my invention, a manual, operator controlling feed selection mechanism is provided for selectively shifting and setting up the change speed gears of unit FB for any one of the sixteen (16) speed steps provided by the unit, and this speed selection mechanism is combined in unit FB as a self-contained component thereof, except for the manually operated selector crank and feed indicator dial which are mounted on and form a self-contained component of the knee front plate structure or feed distribution unit 22.

Such feed selection mechanism in the example hereof, referring to Figs. 10, 16, to 21, includes a horizontal shifter fork slide rod 133 mounted in and extending from front to rear of frame 99 in position spaced to the left of the feed driving shaft 102 in parallel relation with that shaft. A shifter fork 134 is slidably mounted on rod 133 and extends inwardly to and is slidably received in the fork groove 107c of gear cluster 107 on shaft 102. A fork unit 135 is slidably mounted on rod 133 between the rear wall 99d of frame 99 and the forwardly located fork unit 134. This fork unit 135 extends forwardly to and is slidably received in the fork groove 108c of gear cluster 108 on shaft 102.

A shifter fork slide rod 136 (see Fig. 17), is mounted in horizontal position at the lower side of frame 99 extending between the front and rear walls 99c and 99d of the frame and being located in position parallel with, below but spaced from shaft 115 along the left hand side thereof. A shifter fork 137 is mounted on rod 136 adjacent the outer end thereof, which fork extends inwardly to and is slidably received in the fork groove 116c of the gear cluster 116 on shaft 115. A shifter fork 138 (see Figs. 17 and 18), is slidably mounted on rod 136 at the inner side of fork 137 and this fork 138 extends inwardly to and is slidably received in the fork groove 118a of range gear 118. Thus, by selective operation of the shifter forks 134, 135, 137 and 138, in the proper sequence and directions, respectively, the change speed gearing can be selectively set up for rotation of the power take-off gear 59 in any one of the sixteen (16) speed steps provided by the feed unit FB.

As will be clear by reference to Fig. 16, the hanger or mounting sleeve 99e at the left hand side of unit FB is formed with the depending bearing boxes 139a and 139b at the forward and rear ends thereof and a worm shaft 139 is mounted and journaled at its opposite ends in such bearing boxes, respectively, with the shaft extending thereacross and therebetween. A worm 140 is fixed on shaft 139 adjacent the inner or rear side of the front bearing box 139a. A horizontal stub shaft 141 is mounted and journaled in frame 99 disposed transversely through the left hand side wall 99a of the frame, with the outer end of this shaft mounting thereon a spiral or worm wheel 142 which is engaged and in mesh at the upper side thereof with the worm 140 thereabove on shaft 139.

The inner end of shaft 141 has mounted thereon an intermittent gear 143. Intermittent gear 143 mounts or includes as an integral part thereof, a cam disc 144 concentric with intermittent gear 143. Cam disc 144 is formed on the inner side thereof with an endless cam groove 144a therearound generated about the axis of the disc. A gear 145 is mounted on a shaft 145a for intermittent driving engagement by intermittent gear 143, gear 145 being positioned at the rear side of the intermittent gear 143, as will be clear by reference to Fig. 18. Shaft 145a mounts thereon for rotation therewith an intermittent gear 146 positioned at the inner side of wall 99a of the unit frame 99. A gear 147 is mounted on a horizontal shaft 147a positioned in and transversely of side wall 99a to the rear of gear 146 for intermittent engagement by gear 146.

Shifter fork 134 is provided with a shifter arm 134a which depends therefrom below rod 133 and extends laterally outwardly in position at the rear side of cam disc 144. Shifter arm 134a mounts at the outer end thereof, a cam follower 134b which is slidably or rotatably received in the cam groove 144a at the inner side of cam disc 144. The shifter fork unit 135 is provided with a generally similar shifter arm 135a which depends from the unit below slide rod 133 and extends laterally outwardly to position at the inner side of cam disc 144 at the forward side of shaft 141. The outer end of arm 135a mounts thereon a cam follower 135b which extends into and is slidably or rotatably received in the cam groove 144a at a location spaced to the rear of shaft 141. Thus, as cam disc 144 is rotated, the shifter forks 134 and 135 will be moved forwardly and rearwardly on slide rod 133 to shift gear clusters 107 and 108 respectively, on shaft 102, in accordance with the radial distances of the cam groove from the axis of the cam disc at the locations of the cam followers 134a and 135a in the cam groove at opposite sides of the shaft 141, as the cam groove is rotated past the opposite cam followers 134b and 135b, respectively.

The shifter forks 137 and 138 which are slidably mounted on the slide rod 136 at the lower or under side of the unit FB, are located on the inner length of rod 136 opposite the gears 146 and 147, respectively. Shifter fork 137 is provided with an outwardly and rearwardly extended shifter arm 137a having an upwardly projected portion 137b which is provided at the outer side thereof facing gear 146 with a vertical slide groove therein. A slide block 146a is pivotally mounted at the inner side of gear 146 in eccentric relation to the axis of the gear. Slide block 146a is slidably received and confined in the vertical groove of member 137b of shifter arm 137a. Hence, as gear 146 is rotated, slide block 146a will shift fork 137 forwardly and rearwardly on rod 136 to thus shift gear cluster 116 forwardly and rearwardly on shaft 115.

Shifter fork 138 is provided with an outwardly extended shifter arm 138a having an upwardly projected portion 138b which is provided at the outer side thereof facing gear 147 with a vertical slide groove therein. A slide block 147b is pivotally mounted at the inner side of gear 147 in eccentric relation to the axis of the gear, and is slidably received and confined in the vertical groove of member 138b of shifter arm 138a. Hence, as gear 147 is intermittently rotated from the intermittent gear 146, slide block 147b will shift fork 138 forwardly and rearwardly on rod 136 to thereby shift range gear 118.

The ratio between shaft 139 and the intermittent gear 143 is 4:1, so that the intermittent gear 143 makes one-fourth ($\frac{1}{4}$) of a revolution for each revolution of shaft 139. Gears 145 and 146 being on the same shaft 145a, it follows that these two (2) gears may be considered as a unit, and in the particular example hereof, the gears 145 and 146 make one-half ($\frac{1}{2}$) of a revolution for each complete revolution of the intermittent gear 143. The gear cluster 116 is shifted by the gears 145 and 146, such gear cluster 116 functioning as a primary range gear.

Gear 146 is a partial or intermittent gear, gear 147 which is engaged thereby being provided with the usual diametrically opposite dwell points thereon, and is engaged by gear 146 to make one-half ($\frac{1}{2}$) of a revolution for each revolution of the gear 146. The gear 147 actuates the shifter fork 138 to shift gear 118, such latter gear functioning as a back range gear, as referred to hereinabove.

The cam groove 144a in cam disc 144 and the intermittent gear 143 with the gears 145, 146, and 147 driven thereby, are so timed and synchronized that the selector mechanism and the feed change speed gear trains set for the lowest speed step, rotation of shaft 139 in the speed step increasing direction, in this example a clockwise direction, will shift gear cluster 108; gear cluster 107; gear cluster 116; and gear 118, in proper sequence to progressively set up the gear trains for each one of the sixteen (16) speed steps. The ratio of selector mechanism actuating shaft 139 to intermittent gear 143, cam disc 144 and cam groove 144a, and the gears 145, 146 and 147, is such that one (1) revolution of shaft 139 effects and completes one (1) increment of speed change, that is, to say, one (1) speed step. Hence, starting with the gear train set in the lowest speed step, sixteen (16) revolutions of shaft 139, will progressively set up, revolution by revolution, the sixteen (16) speed step settings with the highest speed step being set up by the sixteenth (16th) revolution. Obviously rotation of shaft 139 in the reverse or speed decreasing direction in this instance a counterclockwise direction, will progressively set up the gear trains in progressively decreasing steps from the highest to the lowest of the range of sixteen (16) steps of which the change speed gearing is capable. And by selective rotation in one direction or the other of shaft 139, an operator may set up any desired step within the range of sixteen (16) steps.

Selector mechanism operator control and feed indicator dial

The feed selector mechanism is operated selectively from a hand crank HF which is mounted on the outer end of a horizontal shaft 150 mounted and journaled extending inwardly through the front knee plate 22 at the left hand side thereof with the shaft 150 axially aligned with the selector mechanism actuating shaft 139, which latter shaft forms an element of and is carried by the feed unit FB. Hand crank HF is thus located on the front side of plate structure 22 in position readily accessible to the operator, with such hand crank and its actuated shaft 150 being carried by and forming elements of the removable front plate structure or feed distribution unit 22. In this instance, the forward end of shaft 139 on the feed unit FB is provided with a transverse key 139a, while the rear or inner end of shaft 150 which is carried by the removable feed distribution unit 22 is provided with a transverse slot or keyway 150a into which the key 139a of shaft 139 fits when units FB and 22 are in mounted positions in and on the knee K. Thus, shaft 150 is coupled to shaft 139 to form in effect, a continuous shaft by a self-coupling and self-uncoupling type of connection.

A feed indicator dial FD of circular, disc form is rotatably mounted and journaled in vertically disposed position for rotation about a horizontal axis provided by a stub shaft 151 which is journaled in a mounting plate 152 secured on the forward side of knee front plate structure 22. Mounting plate 152 and dial shaft 151 are positioned at the exterior of knee front plate 22 in position above shaft 150 with the axis of shafts 151 and 150 being located in the same vertical plane. The mounting plate 152 for the feed dial FD is recessed at the forward side thereof to receive therein the feed dial and a spur gear 153 which is secured on shaft 151 at the rear side of the dial. An idler gear 154 is mounted on the rear end of a horizontal stub shaft 155 which is journaled in mounting plate 152 with the gear 154 located at the rear side of mounting plate 152 within the recess in the knee front plate 22. Shaft 155 extends forwardly through plate 152 and mounts at the forward end thereof, a pinion 156 which is in mesh with the spur gear 153 on dial FD. A pinion 157 is fixed on shaft 150 in position in mesh with the idler gear 154. Thus, rotation of hand crank HF rotates shaft 150 and pinion 157 to in turn rotate gear 154 and pinion 156 and thereby rotate feed dial FD.

The compound gear train comprised of the pinion 150, gear 154, pinion 156 and feed dial gear 153, provides a ratio between shaft 150 and hand crank HF thereon, and the feed dial FD of 16:1, so that, one (1) revolution of the hand crank HF (representing one (1) speed step or increment of speed change) will rotate the feed dial FD through one sixteenth ($\frac{1}{16}$) of a revolution.

As will be clear by reference to Fig. 6, the face of the feed dial FD is divided into sixteen (16) sectors, which bear consecutively therearound the sixteen (16) rates of feed, respectively, in terms of inches per minute of movement of work table T. With the 16:1 ratio between shaft 150—139 and the hand crank HF, it follows that one (1) revolution of the hand crank will rotate dial FD one-sixteenth ($\frac{1}{16}$th) of a revolution, and thus move the next feed rate sector to the index line or mark 158, which in this instance is provided in the form of a horizontal line or rib at the left hand side of the feed dial mounting plate 152 as will be clear by reference to Fig. 6.

In the example hereof, it will be noted that I have employed a hand crank HF for selective operation of the feed selector mechanism of a type in which the crank HF is formed at the outer end thereof with a spring loaded latching pin for releasably latching the hand crank in an axial recess formed at the outer side of dial FD, upon the completion of each speed step changing revolution of the hand crank.

Thus, the feed selection hand crank HF with shaft section 150 and the feed indicator dial FD, together with the compound gear train by which the dial is rotated from shaft 150, are all mounted on the removable front plate structure or feed distribution unit 22, and as self-contained elements of that unit are removable and replaceable therewith and are uncoupled from and coupled with the actuating shaft 139 of the feed selection mechanism solely by the act of removing or replacing unit 22. This is made possible through the provision of the "slip" coupling provided between shaft 139 and shaft 150.

*Knee, saddle and table hand feeds*

A hand feed is provided for manual operation to raise and lower the knee K by rotation of the elevating feed screw E when the power feed controlled by hand lever PE is disengaged and inactive. Referring to Fig. 8, in connection with Figs. 10, and 22, this knee hand feed in the form of the present example, includes a shaft 160 mounted and journaled in horizontal position in and extending rearwardly or inwardly through front plate structure 22 at the left hand side of and parallel with shaft section 70 of the knee power feed. Shaft 160 is suitably journaled at its forward end in and extending outwardly through front plate 22 and at its rear or inner end is suitably journaled in and extending inwardly through rear wall element 22b of the front plate structure or unit 22. At its inner end shaft 160 mounts a spur gear 161 which is in mesh with the spur gear 73 on power driven shaft sections 70 and 71. Thus, with power off, hand rotation of shaft 160 will rotate shaft 70—71, and, through the engaged bevel gears 72—16, will rotate the elevating feed screw E. The shaft 160 is rotated by manual rotation of hand crank HE which is located at the front of the knee for operative association with shaft 160.

As gears 161 and 73 are in mesh continuously, it follows that upon power rotation of shaft 70 and the gear 73, shaft 160 will be power driven and hence, if hand crank HE is in operative association with shaft 160, it would be constantly power rotated with the attendant dangerous conditions, hence; I provide an interlock between hand crank HE and shaft 160 which is positively actuated to disengage hand crank HE from shaft 160 by operation of hand lever PE to throw in the power drive to elevating feed screw E by power rotation of the shaft 70—71.

In the example embodiment of such an interlock, shaft 160 is formed with an axial bore therethrough in which there is slidably mounted an actuating rod 162 (see Fig. 8) extending forwardly therethrough and a distance outwardly therefrom at the forward side of knee front plate 22. Hand crank HE is freely rotatably mounted on the outer end of actuating rod 162, and a clutch unit 163 is keyed on shaft 160 between the inner end of the hub of crank HE and the front plate 22. Clutch unit 163 at the outer side thereof is formed with an annular series of clutch teeth 163t therearound and the inner end of the hub 164 of hand crank HE is provided with an annular series of clutch teeth 164t therearound for clutching engagement with and disengagement from clutch teeth 163t. Actuating rod 162 is axially slidable through and relative to clutch unit 163 so that by forward movement of rod 162, hand crank HE is moved outwardly to position with the teeth 164t thereof disengaged from the teeth 163t of unit 163, thus disengaging the hand crank from shaft 160 on which the clutch unit 163 is keyed.

Actuating rod 162 extends inwardly beyond the inner end of shaft 160 and is formed to provide a rounded, outwardly projected inner end. A horizontally disposed camming arm 165 extends radially inwardly from the inner or rear side of the outer leg of the yoke member 79a which is mounted on shaft 79 (see Fig. 8) and arm 165 is curved or bent inwardly to provide a camming head 165a positioned extending over and across the inner, rounded end of actuating rod 162. Camming head 165a is formed with a conical socket in and opening through the forward side thereof in which is received the rounded inner end of rod 162. The inclined wall forming the socket 165b provides a camming surface for engaging the rounded inner end of actuating rod 162 when arm 165 is swung or rocked radially in any direction relative to and across rod 162 by downward or upward swinging of hand lever PE from neutral position to "throw in" the power elevating feed. When power elevating feed control lever PE is in neutral position with the power drive disengaged from shaft 70—71, then camming socket 165b is in axial alignment with rod 162 and the operator may force hand crank HE and rod 162 rearwardly into clutched engagement with clutch unit 163, so that, by rotation of crank HE the knee K may be hand fed upwardly or downwardly. However, when hand lever PE is swung either upwardly or downwardly to throw in the power feed, actuating rod 162 is forced or cammed outwardly by the resulting movement of camming head 165a across the inner end of the rod to thus immediately force rod 162 forwardly to move hand crank HE to declutched position, so that shaft 160 may then rotate under power independently of hand crank HE and without positive rotation of that crank.

The saddle S may be hand fed inwardly and outwardly by manual rotation of the cross feed screw C from the hand wheel HC located at the front of the knee K. In this instance, the forward shaft section of feed screw C is provided with an axial bore extending inwardly thereinto from the outer end thereof, and an actuating rod 170 is axially slidably mounted therein with its outer end extending outwardly beyond the outer end of the forward shaft section of cross feed screw C. The hand wheel HC is freely rotatably mounted and confined on the outer end of the actuating rod 170. Shaft section 40 of cross feed screw C is provided with a transverse bore extending diametrically therethrough with its axis aligned with the shifter fork groove in the clutch spool 62. The inner end of rod 170 is formed with oppositely bevel surfaces which engage complementary bevel surfaces formed by a V groove across the forward side of a camming pin 171 slidably mounted in the transverse bore in shaft section 40. Hence, movement of pin 171 in either direction from a position with the oppositely bevelled end of rod 170 fully seated in the V groove in the pin, will cam rod 170 outwardly. The clutch spool 62 is formed with a V groove around the inner side thereof surrounding the axial bore therethrough, and the camming pin 171 is provided with oppositely bevelled surfaces in camming engagement with complementary oppositely bevelled surfaces, respectively, provided by such bevel groove, so that, movement of clutch spool 62 forwardly or rearwardly on shaft section 49 to throw in the power feed of cross feed screw C will cause axial movement of camming pin 171 and thus force actuating rod 170 outwardly.

A clutch unit 172 is keyed on the outer end of shaft section 40a for rotation therewith and is formed at its outer side with an annular series of clutch teeth 172t therearound. The inner end of the hub of hand wheel HC is provided with an annular series of clutch teeth 173t therearound for clutching engagement with clutch teeth 172t of unit 172 when actuating rod 170 and hand wheel HC are moved inwardly relative to shaft section 40a of cross feed screw C.

When cross feed power control lever PC is in neutral position with clutch spool 62 disengaging the power drive from cross feed screw C, the bevelled inner end of rod 170 may be forced inwardly by the operator to fully seated position in the transverse V groove in camming pin 171, so that, hand wheel HC is then moved inwardly with rod 170 to position in clutching engagement with clutch unit 172 for hand rotation in either direction to rotate cross feed screw C to hand feed saddle S inwardly or outwardly. When hand lever PC is swung upwardly or downwardly to move clutch spool 62 forwardly or rearwardly to engage the power drive with the cross feed screw C, rod 170 is positively cammed outwardly to disengage hand wheel HC from clutch unit 172 and thus permit power rotation of the shaft sections of cross feed screw C independently of hand wheel HC without thereby positively power rotating the hand wheel by power rotation of the cross feed screw C.

The work table T, referring now to Fig. 24 of the drawings, may be fed longitudinally by manual rotation of the feed screw L from the hand wheel HL located in this instance at the left hand end of the table. The smooth surfaced left hand end 51a of feed screw L is extended outwardly beyond the bearing assembly 51b in the end plate 51, and mounts thereon a clutch unit 175. The outer end of clutch unit 175 is provided with an annular series of clutch teeth 175t therearound. The hand wheel HL is freely rotatably mounted on a forward reduced diameter extension 51c of feed screw L, and the inner end of the hub 176 of this hand wheel is provided with an annular series of clutch teeth 176t therearound for clutching engagement with and disengagement from the teeth 175t of clutch unit 175.

Hand wheel HL is designed and mounted for movement axially on shaft section 51c inwardly to clutched engagement with clutch unit 175 and outwardly to position declutched therefrom. The hand wheel HL is normally cammed or forced outwardly on shaft section 51c into declutched position. In order to manually rotate feed screw L, the operator must force hand wheel HL inwardly and hold the same into clutched position with the clutch unit 175. In this example, shaft section 51c is provided with a groove therearound having an annular surface 177 inclined axially rearwardly and outwardly thereof, and a spring loaded ball 178 is mounted and confined in the wheel hub 176 in rolling engagement with the annular camming surface 177. Thus, the spring loaded ball 178 acting on the annular inclined surface 177 formed around shaft section 51c, acts to force and maintain hand wheel HL in its outermost position with the clutch teeth 176t thereof disengaged from the clutch teeth 175t of clutch unit 175. In order to hand feed the table, the operator forces hand wheel HL inwardly to clutched position. Upon release by the operator of the inwardly acting forces applied to the hand wheel, the forces exerted by the spring loaded ball acting on the inclined surface 177, will then automatically force the hand wheel outwardly and return the same to declutched position. In Fig. 24, hand wheel HL is shown in its inwardly forced, clutched position for hand feeding of the work table T. With the hand wheel HL in its normal outer position on shaft section 51c, declutched from clutch unit 175, the feed screw L when power driven for power feed of table T, will rotate independently of hand wheel HL, so that the hand wheel will not be positively power rotated by and from power rotation of the feed screw L.

Removable feed distribution unit

The removable front plate structure hereinbefore referred to as the structure 22, which includes the knee front plate 22 and the rearwardly extended cage-like frame 22a—22b—22c, forms and provides what may be aptly termed a feed distribution unit, in that it mounts as self-contained components of the removable unit, the gear trains and the shafts driven thereby, by which the power is distributed from the feed unit FB to the feeds for the knee K, saddle S and work table T, respectively. Such unit will therefore be hereinafter referred to generally as the "feed distribution unit DU," and when the term is used, unless specifically qualified by the accompanying context, it is intended to include all structure, components and elements which are self-contained in and removable with the front plate structure 22 from mounted operative position on and closing the forward or front side of the knee K.

In order to remove the feed distribution unit DU from the knee, it is only necessary to remove the machine screws 22h (see Figs. 1 and 6) by which the front plate 22 is secured in position on the rib 20f of front wall 20e of knee K, and then pull or draw unit DU forwardly from seated position on the knee. In actual practice, the unit DU is usually removed by first locking the saddle S on the knee slideways by operation of hand lever 33c (see Fig. 1) to clamp gib 33a (see Fig. 14), next removing the screws 22h, and then rotating the hand wheel HC to rotate the cross feed screw C in the feed nut NC to thereby force the unit DU forwardly and outwardly from the knee. The feed distribution unit DU is shown in Fig. 22 of the drawings in position moved outwardly from the knee. With unit DU in the partially removed position of Fig. 22, it is only necessary to continue rotation of cross feed screw C until that screw is threaded from the cross feed screw nut NC to completely disconnect and separate the unit from the knee. It is to be noted particularly that the cross feed screw C and the drive shaft 80 of the work table feed are removed with and as components of the unit DU, and further that all of the feed control levers mounted on the sides of knee K, that is the levers PE, PC and PT, remain in mounted position on the knee.

In the case of the knee elevating feed control lever PE, the separation is made possible by the self-operating coupling 78b—78c between lever PE for the knee elevating feed and the control mechanism actuated by that lever which is mounted on and removed with the unit DU.

In the case of the cross feed control lever PC, the uncoupling of the feed distribution unit mounted portion of the control mechanism from the knee mounted portion thereof which is connected with lever PC, is effected by the self-operating coupling 63c—65e, as shown particularly by Fig. 10.

In the case of the rapid traverse control lever PT and the control mechanism actuated thereby, the uncoupling of the feed distribution unit mounted portion of such mechanism from the knee mounted portion thereof is effected by the self-operating coupling 130e—132e, as will be clear by reference to Fig. 10.

The trip rod 95 and stub shaft 92 connected therewith, together with the crank member 92a of the power cross feed trip mechanism, remain in mounted position on knee K when feed distribution unit DU is removed. Separation of such knee mounted elements from the cross feed shifter bar 65 mounted on and removable with unit DU is effected at the "slip" coupling formed between the grooved end of crank member 92a and the tongue 92c of boss 65c on the shifter bar 65.

As pointed out above, the work table feed drive shaft 80 is mounted in and is removed with feed distribution unit DU as a self-contained component thereof, but the knee elevating feed drive shaft 70—71 has the forward section 70 thereof mounted in and removable with unit DU. The separation of the forward shaft section 70 from the knee mounted rear shaft section 71, is effected by the self-operating "slip" coupling provided by the rearwardly extended, internally splined sleeve forming hub 73a of the gear 73. The shaft 70 with gear 73 and hub 73a are removed with unit DU, sleeve 73a merely sliding forwardly from engagement on the forward splined end of rear section 71 of the shaft.

The feed selection hand crank HF and the feed indicator dial FD, together with the gear train for actuating the dial by operation of the hand crank, remain in mounted position on the front plate 22 and are removed as components of the feed distribution unit DU. This is made possible by the key and slot coupling 150a—139a provided between the inner end of feed distribution unit mounted shaft 150 and the shaft 139 of the feed selection mechanism which is mounted on and carried as a component of the feed unit FB, as clearly shown in uncoupled position by Fig. 10 of the drawings. Like the front plate mounted hand crank HF on the feed distribution unit DU, the front plate mounted elevating hand feed crank HE and the front plate mounted hand cross feed wheel HC, remain and are removed with the unit DU as components thereof.

Aside from the operative connection of shaft 150 with shaft section 131 of the feed selection mechanism, the only other operative connection between the feed unit FB and the feed distribution unit DU is the engagement of the power take-off gear 59 with gear 60 on the cross feed screw shaft section 40a, by which the power is delivered from the feed unit to the feed distribution unit. Gear 60 remains mounted on and as an element of unit DU, but is disengaged from gear 59 merely by the act of drawing the feed distribution unit DU forwardly from mounted position in the operation of removing such unit from the knee K.

When the feed distribution unit DU is completely removed from mounted position on the front of the knee K, the interior of the knee is open and accessible through the front opening 21 thereof and the feed box or unit FB is thus completely exposed, the plate 22 of unit DU having been unseated from the forward ends of mounting pins 100 and 101 to thus leave such ends completely exposed and unobstructed.

The feed distribution unit DU is mounted in operative position on the front of the knee K without the necessity of any separate coupling operations for the various elements thereof with their associated members, respectively, of the knee K of the feed unit FB. As hereinbefore described, all the operative couplings are of the "slip" type and are coupled solely by the act of positioning the unit DU on the front of the knee. In mounting the feed distribution unit DU, as the unit reaches final mounted position on the front of the knee, arm 78c slips over on finger 78b in coupled engagement therewith; tongue 92c of boss 65c seats in the grooved end of crank member 92a; hub 73a of gear 73 slides rearwardly over and into splined relation with the forward end of shaft 71; key 65e seats in groove 63c of head 63b of the cross feed power control shaft 63; key 132e seats in groove 130e of the rapid traverse control mechanism; key 139a on selector mechanism shaft 139 seats in coupling engagement into slot 150a at the inner end of shaft 150; and gear 60 slides into meshing engagement with the power off-take gear 59 of the feed unit FB. And all of the foregoing couplings are effected solely by the act of mounting and securing the feed distribution unit DU in final mounted position on and closing the front of knee K.

The feed unit FB as hereinbefore explained, is a completely self-contained unit which is removable and replaceable as a unit from and to mounted position in the knee, and which not only includes the feed change speed and rapid traverse gear trains but also the complete feed selection mechanism by which such gear trains are selectively set up. Thus, when the feed distribution unit DU has been removed from mounted position on and closing the front of the knee, the feed unit FB is completely exposed and all that it is necessary to do to remove unit FB, is to pull the unit forwardly from the mounting rods 100 and 101 until the unit has cleared these rods and can be lifted out through the front opening 21 of the knee. Thus, in the event of breakage or failure in the unit FB, it is only necessary to remove the unit and replace it with another unit, thus eliminating the necessity of maintaining a machine out of service awaiting repairs.

The removal of a feed unit FB does not require the disconnection as separate operations, of any couplings of any kind. Once the feed distribution unit DU is removed, it is only necessary for the operator to grasp feed box FB and pull it forwardly from its mounting pins, as, after the removal of unit DU the only points of connection remaining between the feed unit FB and associated knee mounted mechanisms are at the power input gears 104 and 105 with the knee mounted power gear 58. As the outward movement of unit FB is along a path parallel with the teeth of the gears 104, 105 and 58, gears 104 and 105 merely slide from engagement with the gear 58 for removal of unit FB.

The mounting of the feed unit FB in operative position in the knee K is carried out by merely sliding the unit inwardly onto its knee mounted supporting rods 100 and 101 until the power input gears 104 and 105 thereof are engaged and in mesh with power gears 58 at the opposite sides, respectively, of the latter gear. The accurate operative mounted position of unit FB on the mounting rods 100 and 101 is determined by the engagement of the inner ends of the mounting sleeves 99e and 99f of the unit with the shoulders 100b and 101b, respectively, of the mounting rods. The feed distribution DU may then be mounted in position on the front of the knee and the forward side of unit FB will be engaged by unit DU to maintain the feed unit against forward displacement from operative position on its mounting rods.

The design and construction and the relative arrangement and mounting of the removable feed distribution unit DU and feed unit FB, is such that the unit FB can be removed in the manner referred to hereinbefore and then the feed distribution unit DU can be restored to mounted position, so that, the knee, a saddle and table are then operable by the manual or hand feeds from the manual controls provided by hand crank HE, hand wheel HC and hand wheel HL. For example, referring to Fig. 23, the feed distribution unit DU may be pulled forwardly a sufficient distance but without complete removal from the knee, to permit of the feed unit FB being then independently removed as a separate unit from mounted position within the knee. After removal of feed unit FB, the feed distribution unit DU may be then pushed back and secured in its normal mounted position with the manual feeds fully operative. Thus, in the event that it becomes necessary to remove a feed unit FB for repair or replacement, the machine is not completely removed from service as the knee, saddle and table may in an emergency be hand fed pending repair and/or replacement of the removed feed unit FB.

By reference to Fig. 8 in particular, it will be noted that by the design and mounting of the work table longitudinal feed drive shaft 80, this shaft can be removed from the knee K without removing the feed distribution unit DU. It is only necessary to remove the cap 80b and then draw shaft 80 with its bearing assembly 80a outwardly through front plate 22. And similarly, the cross feed screw C and its assembly mounted in the feed distribution unit DU can be separately removed without removing the unit DU from mounted position on the knee, an opening of suitable diameter being provided in front plate 22.

The construction, arrangement and mounting of the saddle S and of the table longitudinal feed screw L and the drive shaft 82 which is mounted spaced to the rear and parallel with feed screw L, is such that feed screw L and the shaft 82 require no caps for their mounting.

*Knee, saddle, and table assembly bearing surface arrangement*

The design of the knee K is such as to provide the full width upper side thereof with the opposite side, laterally spaced outrigged rails 28 and 29 positioned spaced apart a distance greater than the overall width of column 10 at and above knee K, so that, these rails may be projected inwardly along opposite sides of the column structure 10 to thereby provide extended length, widely laterally spaced saddle bearing surfaces 28a and 29a. By this construction and arrangement, the transverse, widely laterally spaced complementary bearing surfaces 30a and 30b for slidable engagement on knee surfaces 28a and 29a may be extended by providing the rearward extensions 30R to thus substantially increase the length and extent of these saddle bearing surfaces 30a and 30b.

Increased stability is further obtained by the arrangement which provides the narrow guide rail 25 along the longitudinal center of the knee with this narrow guide rail providing by its opposite vertical edges, the lateral or side bearing surfaces 25b and 25c as the sole lateral or side bearing surfaces of the arrangement of saddle bearing surfaces on the knee.

The knee K is vertically slidably guided on and from the column 10 by an arrangement of bearing surfaces which also provides a narrow guide rail 10s in a multiple system of bearing surfaces with this narrow guide rail providing by its opposite vertical edges, the sole lateral or side bearing surfaces of the system, and further with this guide rail positioned along the longitudinal center of the rear side of knee K, with its longitudinal axis in the vertical plane in which lies the longitudinal axis of the narrow guide rail 25 of the arrangement of saddle bearing surfaces on the knee K.

The construction of the saddle S by which the continuous table bearing surface 32 is provided on and throughout the length of the upper side of the saddle for slidably receiving and mounting thereon the work table T, provides an extremely stable mounting for the table T throughout its longitudinal feeding movements, so that, with the increased stability resulting from the knee and column bearing surface arrangement and the saddle and knee bearing surface arrangement, a high degree of stability is obtained in operation of the machine for the work table T in a knee, saddle and work table assembly of my invention.

In the foregoing description and explanation of the invention and the various features thereof, and in the hereinafter appended claims, the terms "knee," "saddle" and "work table" or "table," are used in a broad, generic sense and not in their strict literal sense as limited or restricted to the particular physical expressions of the knee, saddle and table of the example embodiment; hence, these terms are to be considered and interpreted primarily from the broad standpoint, except where associated context specifically limits the terms, to include slide elements, or relatively movable elements by which a work table or broadly equivalent member may be universally, laterally movable in a single plane and may be bodily movable in either direction along a straight line path perpendicular to the plane of universal lateral movement. And except where specifically called for, the use alone of either the term "knee," or the term "saddle," or the term "work table" or "table," does not include necessarily the combination therewith of any one of the other or all of the other elements of the knee, saddle and table assembly.

It is also evident that various other forms, designs, arrangements and constructions of parts, elements and organizations, as well as combinations of such parts, elements, and organizations might be resorted to without departing from the broad spirit and scope of my invention, hence I do not desire to limit my invention in all respects to the exact and specific disclosures hereof.

What I claim is:

1. In a machine tool, in combination, a knee, a saddle and a work table mounted for feeding movements relative to each other; a motor mounted on said knee; feeds to said knee, saddle and table including a feed distribution unit providing reversible driving members for said feeds respectively, said members being mounted as self-contained components of said unit; a power transmission from said motor to said reversible driving members; a separable connection between said transmission and said feed distribution unit; separable connections between said reversible driving members and said feeds, respectively; manual control mechanisms mounted on said knee for selective control of said reversible feed driving members, respectively, of said feed distribution unit; separable connections between said knee mounted manual control mechanisms and said driving members; and said feed distribution unit including said driving element components thereof being removable and replaceable as a separate unit from and to mounted position on said knee in operative connection with said power transmission, feeds and manual control mechanisms.

2. In a machine tool, in combination, a hollow knee; a slide member mounted on said knee for feeding movements relative thereto in either direction along a straight line path; a bracket structure integral with said slide member and being extended into said knee; an internally threaded nut member removably secured in position at one side of said bracket member, said nut member provided with an internally threaded bore therethrough positioned with its axis parallel to the path of feeding movements of said slide member; said bracket member at the inner end thereof being provided with a transverse slot thereacross having its longitudinal axis angularly disposed relative to the axis of said nut member bore; and said nut member being provided with a laterally extended key member slidably engaged in said slot.

3. In a machine tool, in combination, a hollow knee; a slide member mounted on said knee for feeding movements relative thereto in opposite directions along a straight line path; a bracket structure on said slide member extending into said knee; a nut member detachably mounted in position at one side of said bracket structure within said knee, said nut member being provided with an internally threaded bore therethrough having the axis thereof parallel with the path of feeding movements of said slide member; a feed distribution unit removably mounted on said knee and including as a self-contained component thereof an externally threaded feed screw mounted and journaled therein in position extending into said knee through and in threaded engagement with said bracket carried nut member; and said feed distribution unit with said feed screw as a self-contained component thereof being removable and replaceable as a unit from and to mounted position on said hollow knee.

4. In a machine tool, in combination, a hollow knee providing slideways at the upper side thereof; a saddle slidably mounted on said slideways for feeding movements thereon in opposite directions along a straight line path; a work table slidably mounted on said saddle for feeding movements thereon in opposite directions along a straight line path at an angle to the path of feeding movements of said saddle; a bracket structure on said saddle extending into said knee; a nut member on said bracket structure within said knee and being provided with an internally threaded bore therethrough having the axis thereof parallel with the path of feeding movements of said saddle; an externally threaded feed screw mounted and journaled on said knee extending through and in threaded engagement with said bracket carried nut member; said bracket structure being formed with a bore therethrough parallel with the internally threaded bore of said nut member; a bevel gear having an internally splined axial bore therethrough rotatably journaled in said bracket structure with the bore thereof axially aligned with the bore through said structure; a driving shaft mounted and journaled in said knee extending thereinto through the aligned bores in said bracket structure and said gear, the inner end length of said shaft being splined and in driving engagement with said gear, said gear being slidable axially of said driving shaft with feeding movements of said saddle and bracket structure; a nut member mounted on said saddle and having an internally threaded bore therethrough parallel with the path of feeding movements of said table; an externally threaded feed screw mounted and journaled on said work table and being extending through and in threaded engagement with said saddle mounted nut member; and driving connections between said gear on said bracket structure and said table feed screw for rotating the latter.

5. In a machine tool, in combination, a knee; a saddle mounted on said knee for feeding movements in opposite directions along a straight line path; a work table mounted on said saddle for feeding movements in opposite directions along a straight line path at an angle to the path of feeding movements of said saddle; a nut member mounted on said saddle and having an internally threaded bore therethrough parallel with the path of feeding movements of said table; an externally threaded feed screw mounted and journaled on said table in position therebelow extending longitudinally thereof with its axis parallel with the path of feed of the table, said feed screw being extended through and in threaded engagement with said saddle mounted nut member; a shaft mounted on said saddle in position parallel with said feed screw; spaced driving gears on said shaft; means for rotating said gears in opposite directions; spaced driven gears having axial bores therethrough mounted and journaled on said saddle with the bores thereof in axial alignment, said feed screw being extended through the axially aligned bores of said driven gears for rotation of said gears independently of said feed screw; a clutch member splined on said feed screw in position between said driven gears for axial movements in either direction to positions in clutching engagement with one or the other of said driven gears, respectively; and manual control mechanism mounted on said table for selectively shifting said clutch member.

6. In a machine tool, in combination, a hollow knee; a saddle mounted on said knee for feeding movements thereon in opposite directions along a straight line path; a work table mounted on said saddle for feeding movements thereon in opposite directions along a straight line path at an angle to the path of feeding movements of said saddle; a bracket structure on and carried by said saddle extending into said knee; a nut member on said bracket structure within said knee and being provided with an internally threaded bore therethrough having the axis thereof parallel with the path of feeding movements of said saddle; an externally threaded feed screw mounted and journaled on said knee extending through and in threaded engagement with said bracket carried nut member; said bracket structure being formed with a bore therethrough parallel with the internally threaded bore of said nut member; a driving shaft mounted and journaled in said knee extending thereinto through said bore in said bracket structure; a nut member mounted on said saddle and having an internally threaded bore therethrough parallel with the path of feeding movements of said table; an externally threaded feed screw mounted and journaled on said work table and being extended through and in threaded engagement with said saddle mounted nut member, and driving connections between said knee mounted driving shaft and said table feed screw, said driving connections including a driven member on said bracket structure in splined driving relation on said driving shaft for sliding movements in either direction axially of said driving shaft by feeding movements of said saddle.

7. In a machine tool, in combination, a hollow knee mounted for feeding movements; a spindle mounted on said knee for feeding movements relative thereto; a work table mounted on said saddle for feeding movements relative thereto; feeds for said knee, saddle and work table, respectively; a change speed unit removably mounted in said hollow knee in driving connection with said feeds; separable connections between said unit and said feeds, respectively, said unit being selectively operable to drive said feeds at different rates of speed; a power transmission on said knee in driving connection with said unit; a separable connection between said unit and said power transmission; a speed selection mechanism mounted on said unit as a self-contained component thereof for selectively operating said change speed unit; manually operable means mounted on said knee for selectively actuating said selection mechanism; a separable connection between said knee mounted means and said unit mounted selection mechanism; and said change speed feed unit with said selection mechanism as a self-contained component thereof being removable and replaceable as a separate unit from and to mounted position in said knee.

8. In a machine tool, in combination, a hollow knee having one side thereof open and being mounted for feeding movements; a saddle mounted on said knee for feeding movements relative thereto; and a work table mounted on said saddle for feeding movements relative thereto; feeds for said knee, saddle and work table, respectively; a feed distribution unit operatively connected with said feeds for selectively feeding said knee, saddle and table, respectively; said feed distribution unit being separably connected with said feeds being mounted on said knee in position closing said knee side opening; said feed distribution unit being also mounted for removal and replacement as a unit from and to mounted position on said knee; a change speed feed unit mounted in said knee in separable driving connection with said feed distribution unit; and said change speed feed unit being mounted for removal and replacement as a unit from and to mounted position in said knee through said knee side opening independently of said feed distribution unit when the latter unit is removed from mounted position on and closing said opening.

9. In a machine tool, in combination, a hollow knee mounted for feeding movements; a saddle mounted on said knee for feeding movements relative thereto; a work table mounted on said saddle for feeding movements relative thereto; feeds for said knee, saddle and work table, respectively; a feed distribution unit removably mounted in said knee in separable driving connection with said feeds; said feed distribution unit being removable and replaceable as a separate unit from and to mounted position in said knee; a change speed feed unit removably mounted in said knee in separable driving connection with said feed distribution unit; a power transmission on said knee in separable connections between said change speed unit and said power transmission and between said change speed unit and said feed distribution unit; and said change speed feed unit being removable and replaceable as a separate, independent unit from and to mounted position in said knee.

10. In a machine tool, in combination; a hollow knee, a saddle, and a work table mounted for feeding movements relative to each other; feeds for said knee, saddle and work table, respectively; a feed distribution unit removably mounted in said knee in separable driving connection with said feeds; a change speed feed unit removably mounted in said hollow knee in separable driving connection with said feed distribution unit; said feed distribution unit being mounted for removal and replacement as a unit to and from mounted position in said knee; said change speed feed unit including as self contained components thereof a rapid traverse drive for said work table feed, and clutch means for engaging and disengaging said drive; a manual control mechanism mounted on said knee for selectively operating said clutch means to engage and disengage said rapid traverse drive; a separable connection between said knee mounted control mechanism and said clutch means on said change speed unit; and said change speed unit being removable and replaceable from and to mounted position in said knee as a separate unit from said feed distribution unit.

11. In a machine tool, in combination; a hollow knee, a saddle, and a work table mounted for feeding movements relative to each other; feeds for said knee, saddle and work table, respectively; a feed distribution unit removably mounted in said knee in separable driving connection with said feeds, respectively; said feed distribution unit being removable and replaceable from and to mounted position in said knee as an independent unit; a change speed feed unit mounted in said hollow knee and including a driving member in driving connection with said feed distribution unit; a rapid traverse drive for said work table mounted on said change speed unit as a self contained component thereof; clutch means mounted in said change speed unit as a self contained component thereof for selectively engaging or disengaging said rapid traverse drive; a manual control mechanism mounted on said knee independently of both said feed distribution unit and said change speed unit for selectively operating said clutch means; separable connections between said change speed unit and said feed distribution unit; separable connections between said knee mounted manual control mechanism and said clutch means on said change speed unit; said feed distribution unit being removable and replaceable independently of said change speed unit; and said change speed unit being removable and replaceable as a separate unit independently of said feed distribution unit when the latter unit is removed from said knee.

12. In a machine tool, in combination, a knee and a work table mounted for feeding movements relative to said knee; a feed for said work table; a feed distribution unit removably mounted on said knee in separable driving connection with said work table feed; said feed distribution unit being removable and replaceable from and to mounted position on said knee as a separate, independent unit; a change speed feed unit mounted in said knee in separable driving connection with said feed distribution unit; a speed selection mechanism mounted on said change speed unit in operative connection therewith; a rapid traverse drive for said work table feed mounted on said change speed unit as a self contained component thereof; means mounted on said change speed unit as a self contained component thereof and being selectively operable to engage said drive with said table feed and disengage said change speed unit from said feed distribution unit, or to disengage said drive from said table feed and engage said change speed unit with said feed distribution unit; a manual control mechanism mounted on said knee for selectively operating said rapid traverse drive engaging and disengaging means; manual means mounted on said feed distribution unit in separable connection with said selection mechanism on said change speed unit for selectively operating the latter; and said change speed feed unit being removable and replaceable from and to mounted position in said knee as a separate unit.

13. In a machine tool in combination; a knee and a work table mounted for feeding movements relative to said knee; a feed for said work table; a feed distribution unit removably mounted on said knee in separable connection with said work table feed; said feed distribution unit being removable and replaceable as a separate independent unit from and to mounted position in operative connection with said table feed; a change speed feed unit mounted in said knee in separable driving connection with said feed distribution unit; a speed selection mechanism mounted on said change speed unit as a self-contained component thereof in operative connection therewith; a rapid traverse drive for said work table mounted on and included in said change speed feed unit as a self-contained component thereof; means mounted on said unit as a self-contained component thereof for selective operation to engage said drive with and to disengage said drive from said feed distribution unit, or to disengage said drive from and engage said change speed unit with said feed distribution unit; manual control means mounted on said knee for selectively operating said rapid traverse drive engaging and disengaging means; manual operating means mounted on said feed distribution unit for separable operative engagement with said speed selection mechanism of said change speed unit when said feed distribution unit is in mounted position on said knee; and said change speed unit, including said speed selection mechanism and said rapid traverse drive and selectively operable means therefor as self-contained components thereof, being removable and replaceable from and to mounted position in said knee as a separate independent unit.

14. In a machine tool, in combination; a hollow knee having an open side; a work feeding element movably mounted on said knee; a feed mechanism in driving connection with said work feeding element; said feeding mechanism including a driven member for driving said mechanism; a feed distribution unit removably mounted on said knee in operative position closing the open side of said knee and being removable and replaceable from and to mounted position as a separate, independent unit through the open side of said knee; a power transmission in said knee; a change speed feed unit removably mounted in said knee between said power transmission and said feed distribution unit; said feed distribution unit including shafting in slidable separable driving connection with said driven member of said feed mechanism and also including a driven member for driving connection with said change speed feed unit; said change speed feed unit including a driven member in slidable separable connection with said power transmission and also including a driving member in slidable separable connection with said driven member of said feed distribution unit; said change speed unit being removable and replaceable through the open side of said knee as a separate self-contained unit from and to mounted position in said knee independently of said feed distribution unit when said latter unit is removed from mounted position on said knee closing said open side thereof; and said feed distribution unit with said change speed feed unit removed from said knee being adapted to be replaced to mounted position in said knee with said shafting in slidable separable driven connection with said driven member of said feed mechanism on said knee.

THEODORE F. ESERKALN.

References Cited in the file of this patent

UNITED STATES PATENTS

| Number | Name | Date |
|---|---|---|
| 1,966,888 | Dumser | July 17, 1934 |
| 2,019,774 | Woytych | Nov. 5, 1935 |
| 2,227,404 | Zimmermann | Dec. 31, 1940 |
| 2,327,107 | Hassman | Aug. 17, 1943 |
| 2,344,529 | Armitage | Mar. 21, 1944 |
| 2,399,187 | Jackson | Apr. 30, 1946 |
| 2,469,920 | Henkel | May 10, 1949 |
| 2,473,596 | LeBlond et al. | June 21, 1949 |